United States Patent [19]

Belady et al.

[11] 3,964,028

[45] June 15, 1976

[54] SYSTEM AND METHOD FOR EVALUATING PAGING BEHAVIOR

[75] Inventors: Laszlo A. Belady, Yorktown Heights, N.Y.; Frank P. Palermo, Los Gatos, Calif.

[73] Assignee: International Business Machines Corporation, Armonk, N.Y.

[22] Filed: Aug. 2, 1973

[21] Appl. No.: 385,223

[52] U.S. Cl. ............................................ 340/172.5
[51] Int. Cl.² ......................................... G06F 13/00
[58] Field of Search ...................... 340/172.5; 444/1

[56] References Cited
UNITED STATES PATENTS

| | | | |
|---|---|---|---|
| 3,541,529 | 11/1970 | Nelson | 340/172.5 |
| 3,577,185 | 5/1971 | Belady | 340/172.5 |
| 3,588,839 | 6/1971 | Belady et al. | 340/172.5 |

*Primary Examiner*—Raulfe B. Zache
*Attorney, Agent, or Firm*—Isidore Match; Roy R. Schlemmer

[57] ABSTRACT

The system and method disclosed herein are for use in data processing apparatus which is operated as a paging machine and wherein a program is considered a page reference string. The system and method effect the determination of the minimum memory capacities for the pages of the string. The data processing apparatus contains a first list which is a list of the names of the pages of the program and an integer associated with each page name, the integers each having one of the different discrete values of 1 to n wherein n is equal to the number of the pages in the program, the value of an integer associated with a page name being in accordance with the aforementioned LRU criterion. The novel system includes a second list and a method for utilization of such novel second list, this second list being an ordered sequence of addresses having the values of 1 to n, there being at each address an integer associated with a given page. The minimum memory capacity (MMC) stack distance is the smallest integer in the second list which is at or below the address position of a referenced page having the value of the LRU integer of the referenced page in the first list. To update the second list, the vaue of the integer at the address, *l*, in the second list which has a value equal to the LRU integer of the reference page in the first list is saved. The integers in the second list at addresses 2 to *l*-1 each have their addresses incremented by 1. The saved integer value is compared with the next lower address moving seuqentially down the second list below address *l*, until an address is encountered wherein the integer therein has a value less than the saved value. The saved integer is then placed in this encountered address and the integer value in the encountered address is saved. This process is continued until the bottom of the second list is reached. The resulting saved integer, i.e., which is the lowest integer value at or below address *l* in the second list is the OPT stack distance, i.e., the MMC for the referenced page. This latter integer is assigned address 2 in the second list.

5 Claims, 34 Drawing Figures

FIG. 2

|  |  |  | FIG. 2A | FIG. 2B |  |  |  |
|---|---|---|---|---|---|---|---|
|  | FIG. 2C | FIG. 2D | FIG. 2E | FIG. 2F |  |  |  |
| FIG. 2G | FIG. 2H | FIG. 2I | FIG. 2J | FIG. 2K | FIG. 2L |  |  |
| FIG. 2M | FIG. 2N |  |  |  |  | FIG. 2S | FIG. 2X |
|  |  |  |  |  | FIG. 2O | FIG. 2T | FIG. 2Y |
|  |  |  |  |  | FIG. 2P | FIG. 2U | FIG. 2Z |
|  |  |  |  |  | FIG. 2Q | FIG. 2V |  |
|  |  |  |  |  | FIG. 2R | FIG. 2W |  |

FIG. 5

| REGISTERS | LRU ADDRESS | OLD | NEW | FLIPFLOPS |
|---|---|---|---|---|
| 936 | 2 | 4 | 3 | 866 |
| 938 | 3 | 6 | 4 | 868 |
| 940 | 4 | 16 | 6 | 870 |
| 942 | 5 | 2 | 16 | 872 |
| 944 | 6 | 7 | 2 | 874 |
| 946 | 7 | 9 | 7 | 876 |
| 948 | 8 | 15 | 15 | 878 |
| 950 | 9 | 10 | 10 | 880 |
| 952 | 10 | 3 | 9 | 882 |
| 954 | 11 | 8 | 8 | 884 |
| 956 | 12 | 11 | 11 | 886 |
| 958 | 13 | 14 | 14 | 888 |
| 960 | 14 | 12 | 12 | 890 |
| 962 | 15 | 5 | 5 | 892 |
| 964 | 16 | 13 | 13 | 894 |

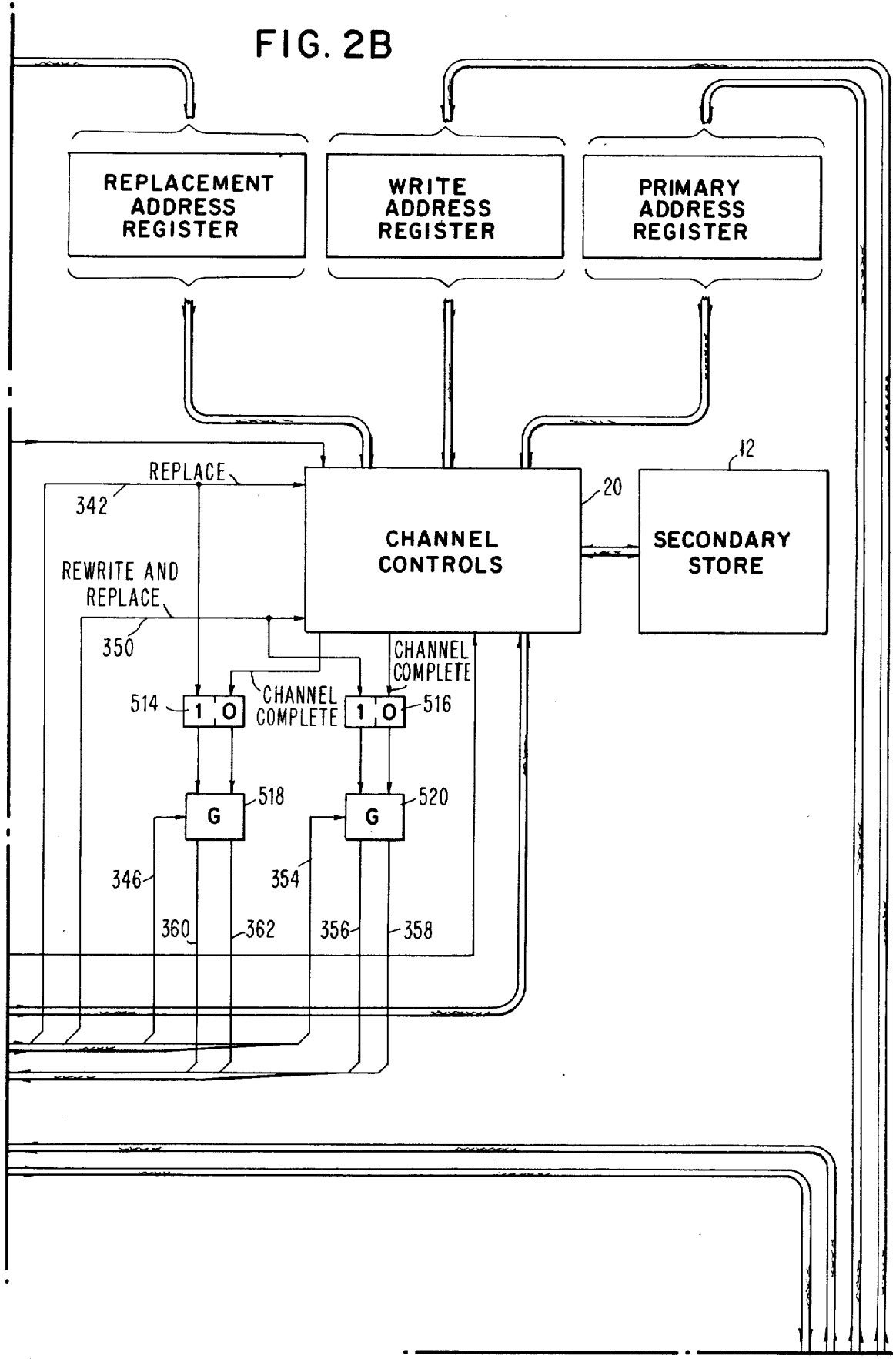

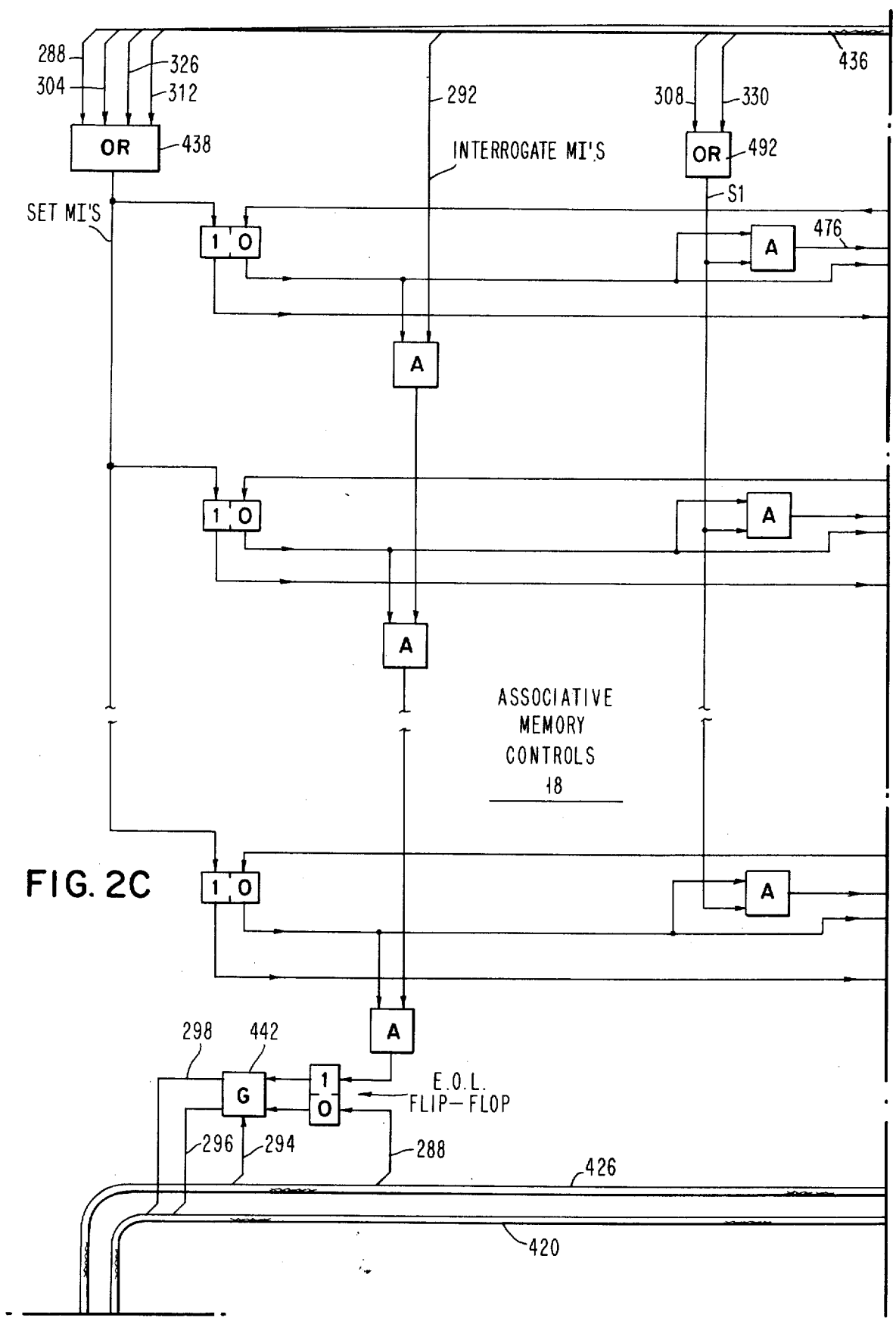

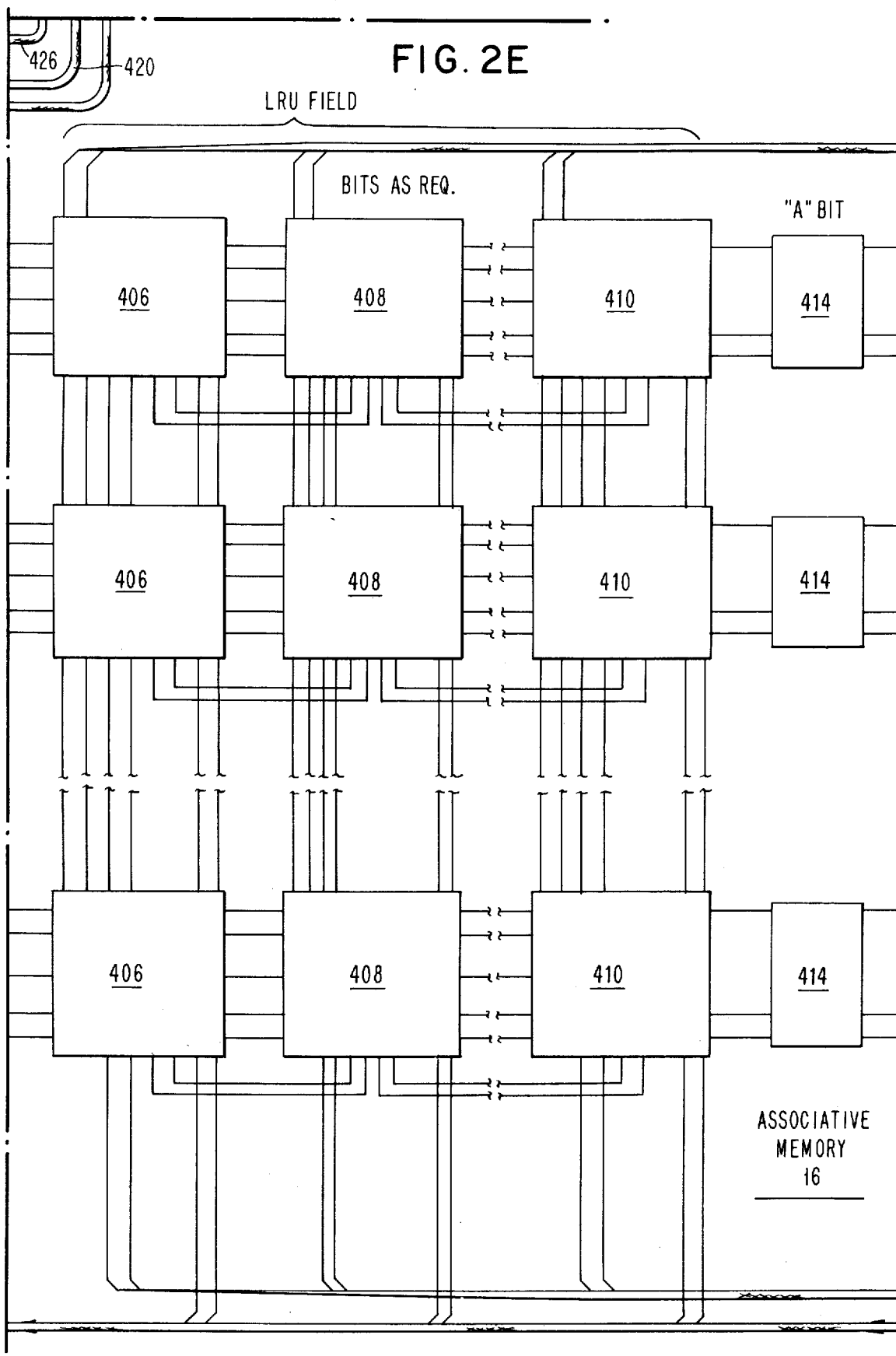

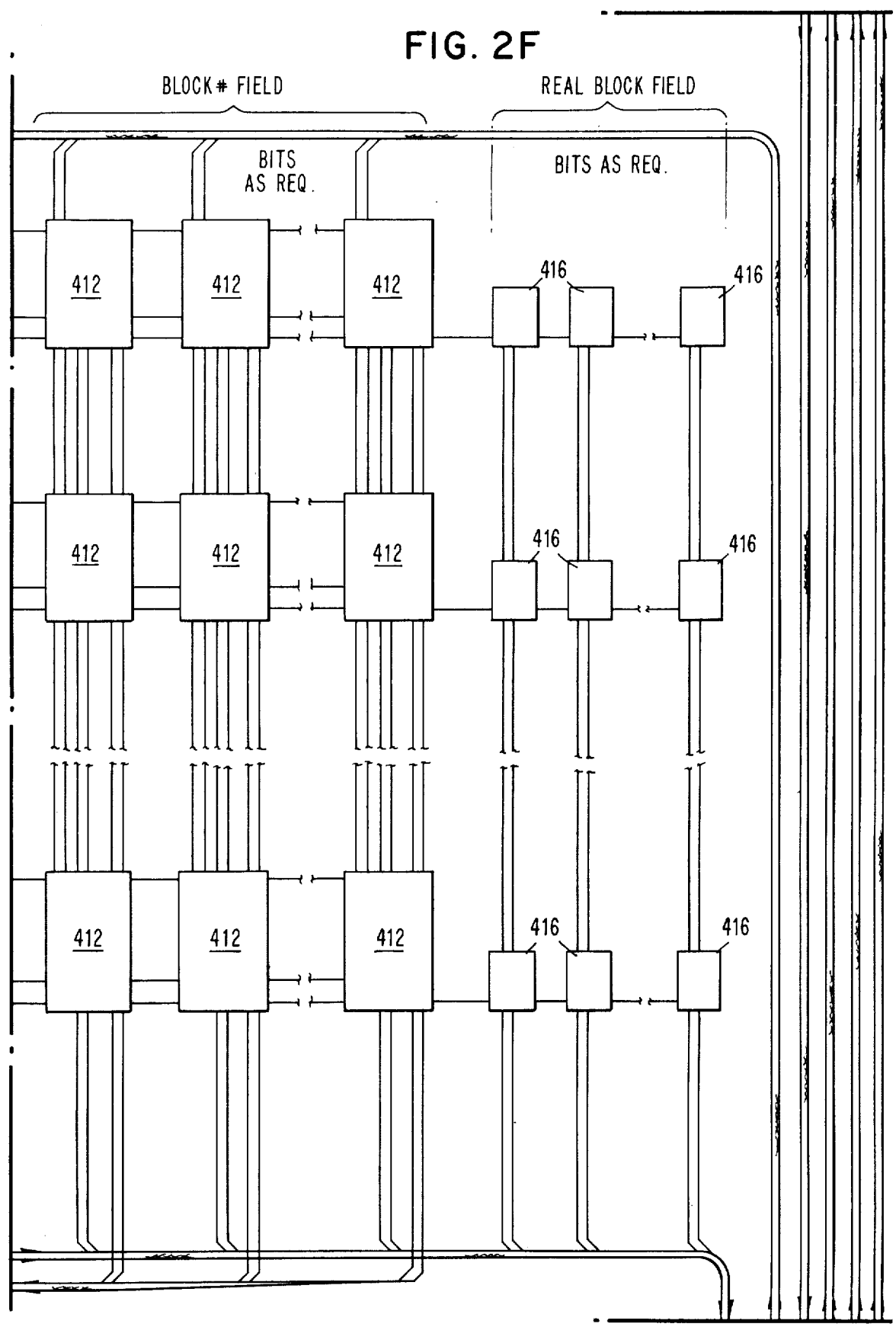

PULSE GENERATOR 24

PULSE GENERATOR 24

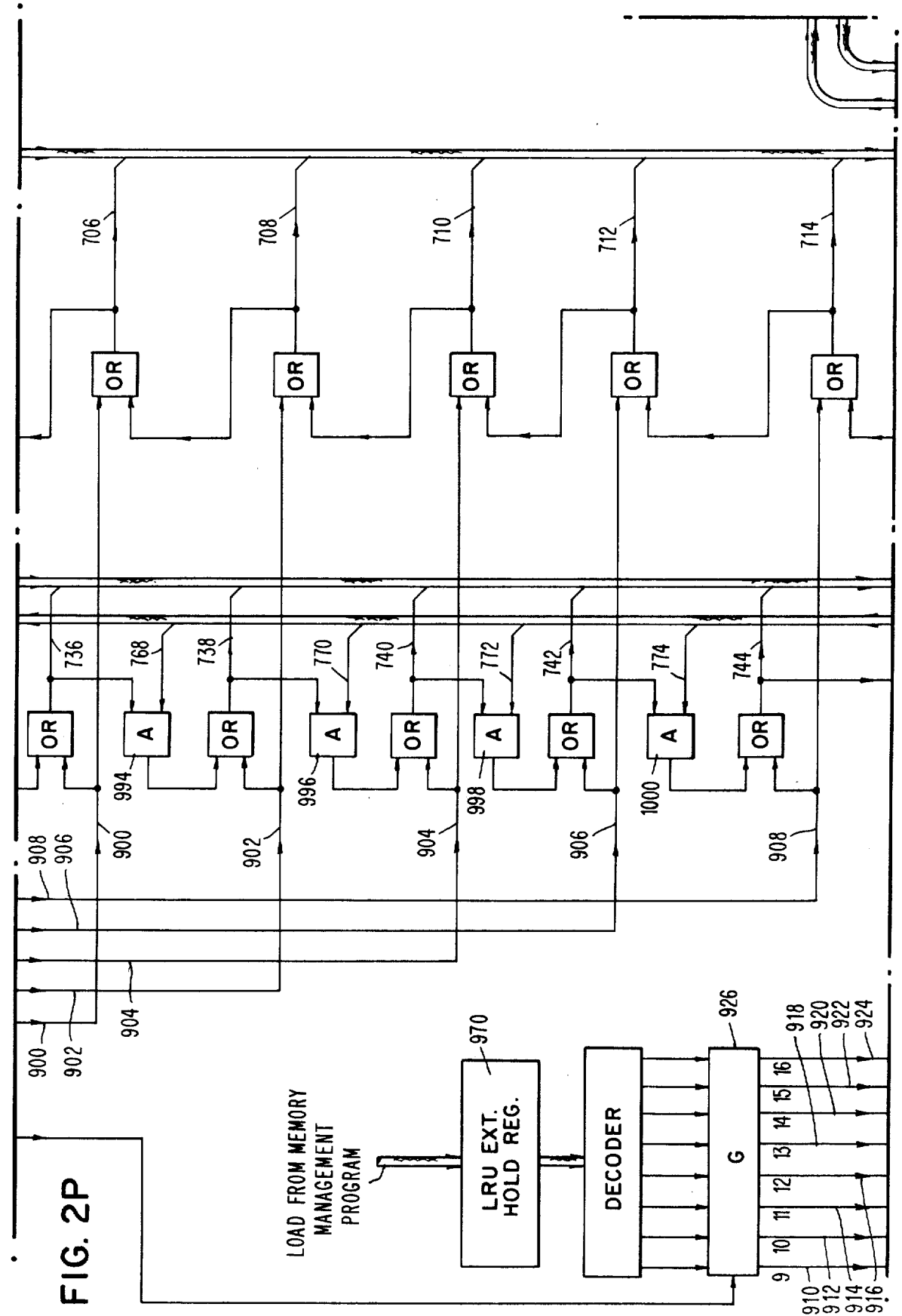

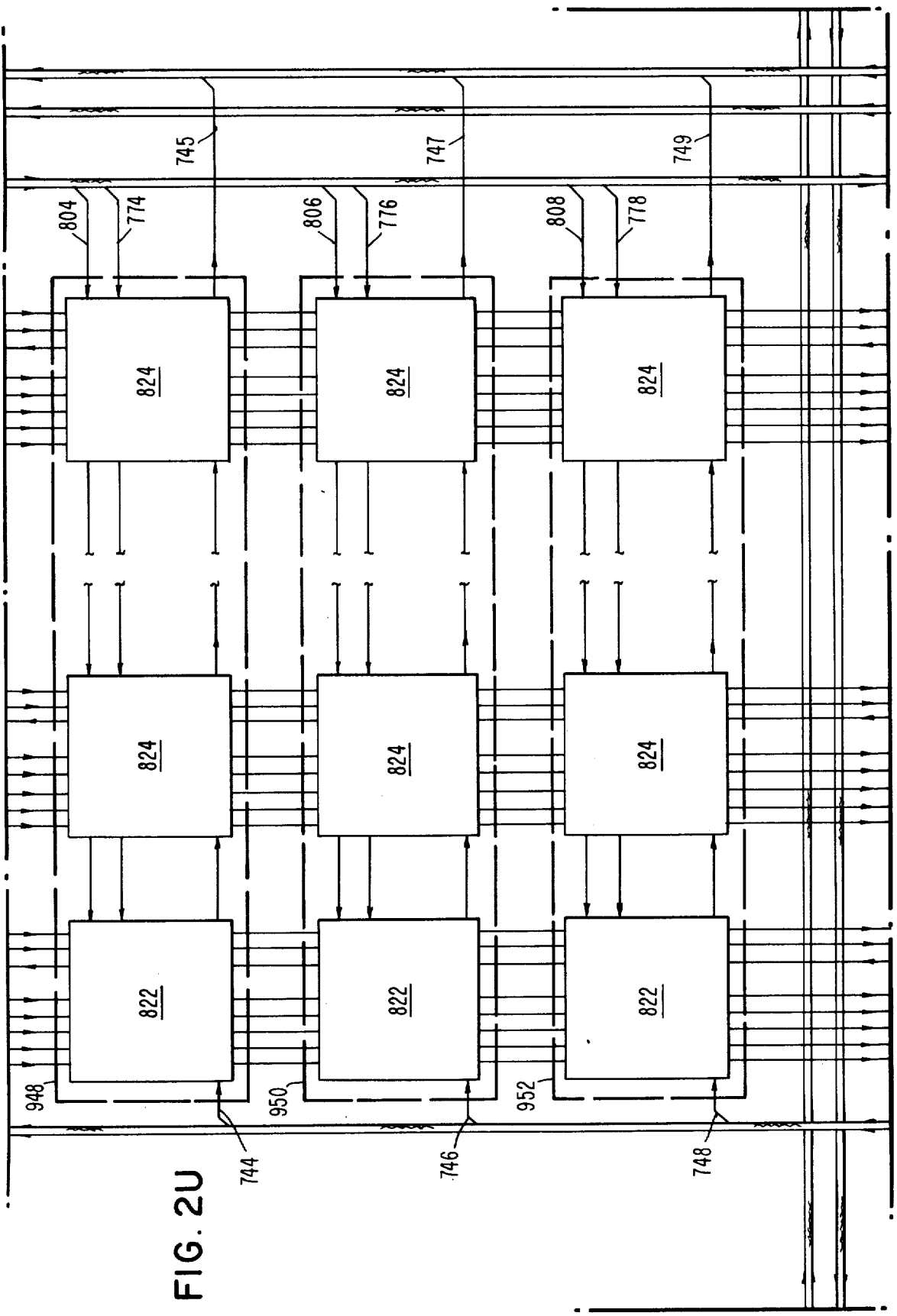

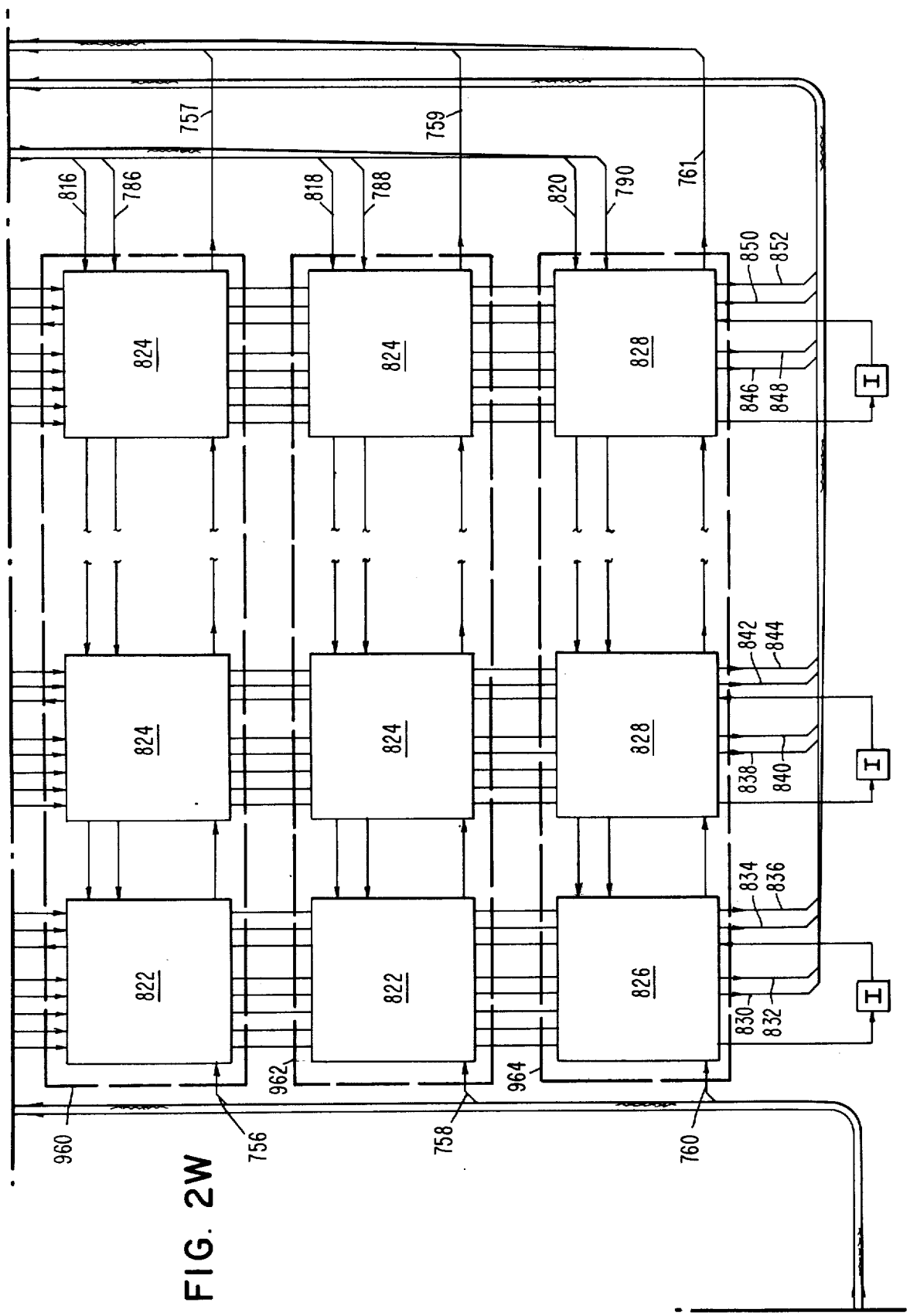

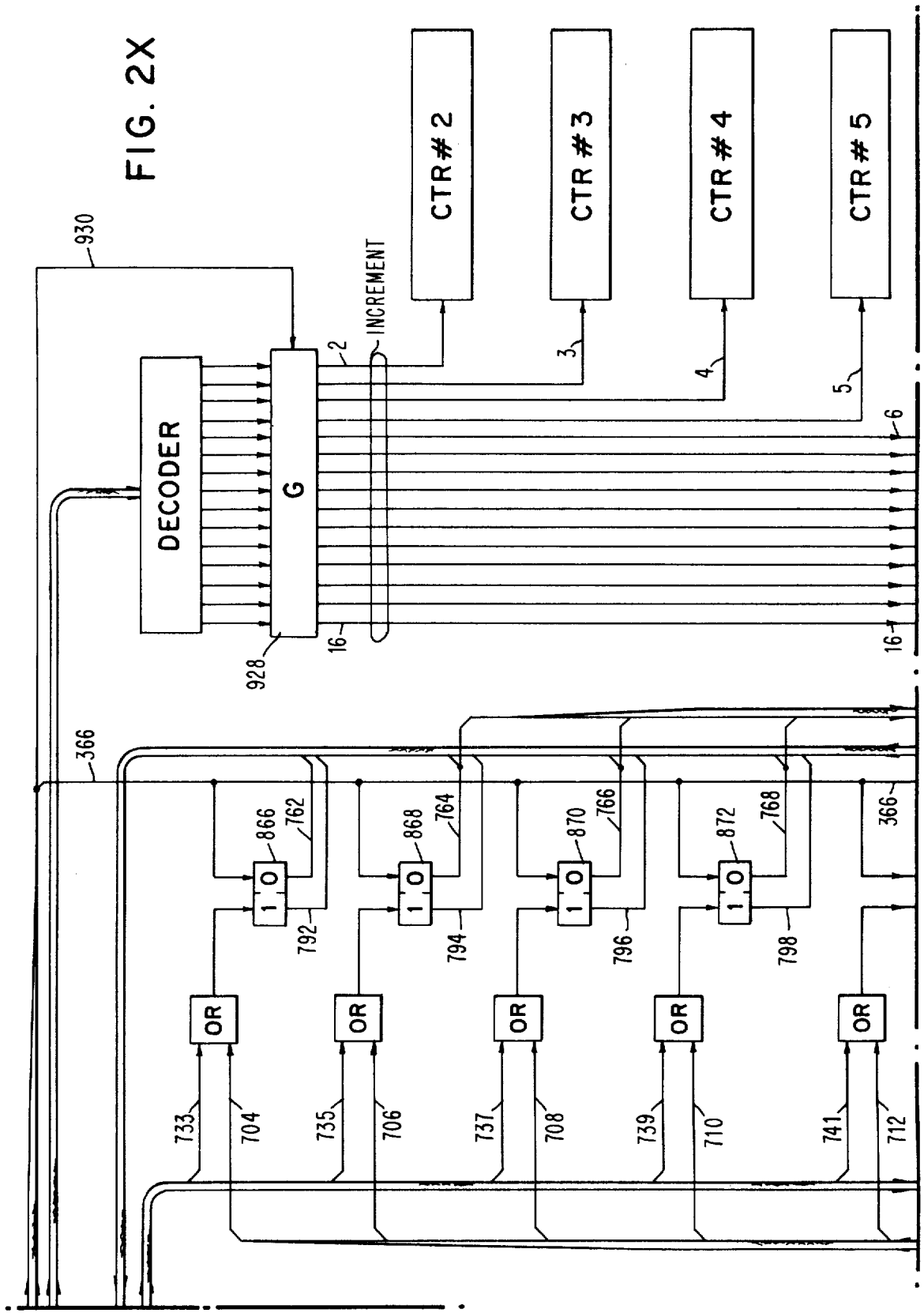

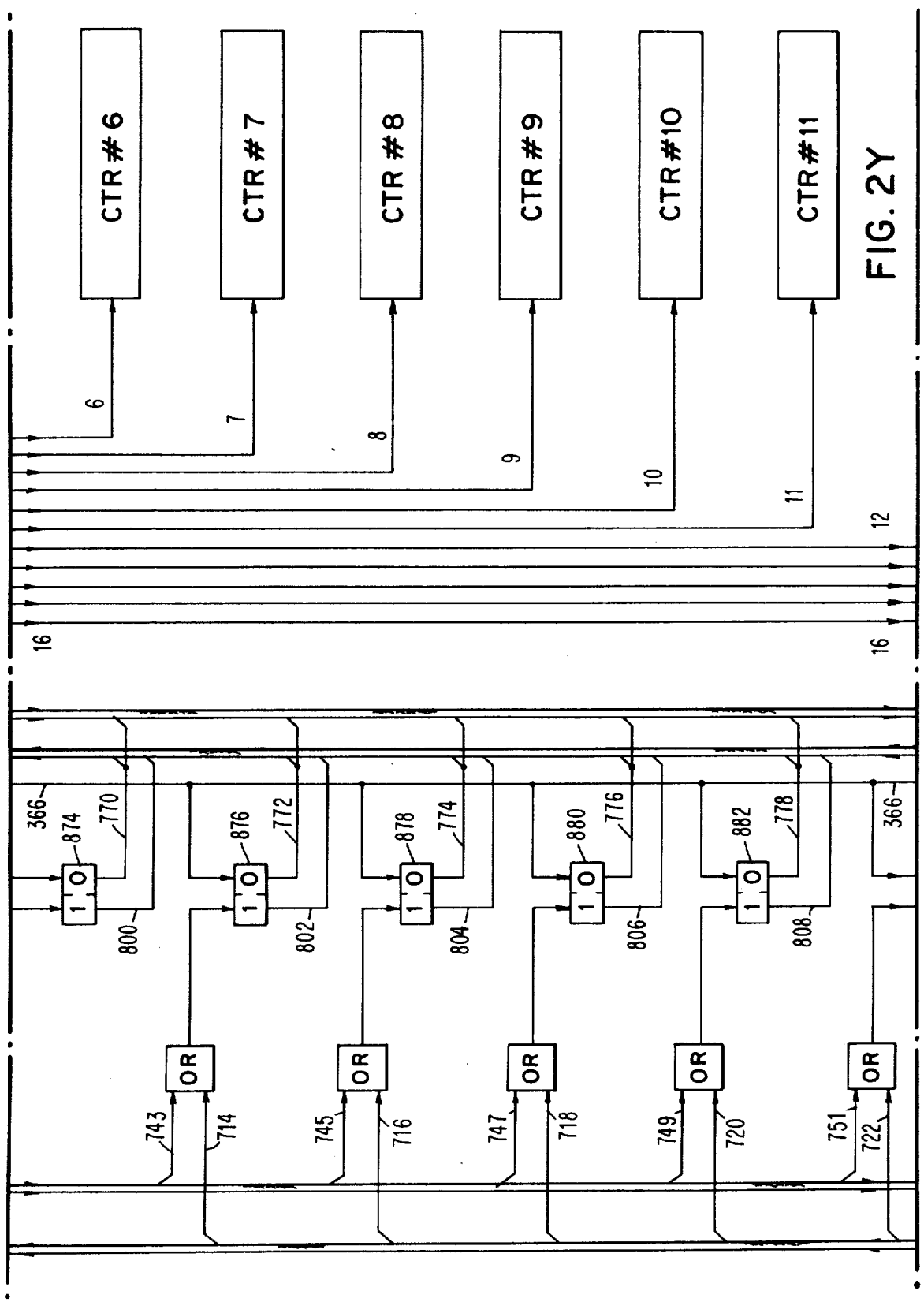

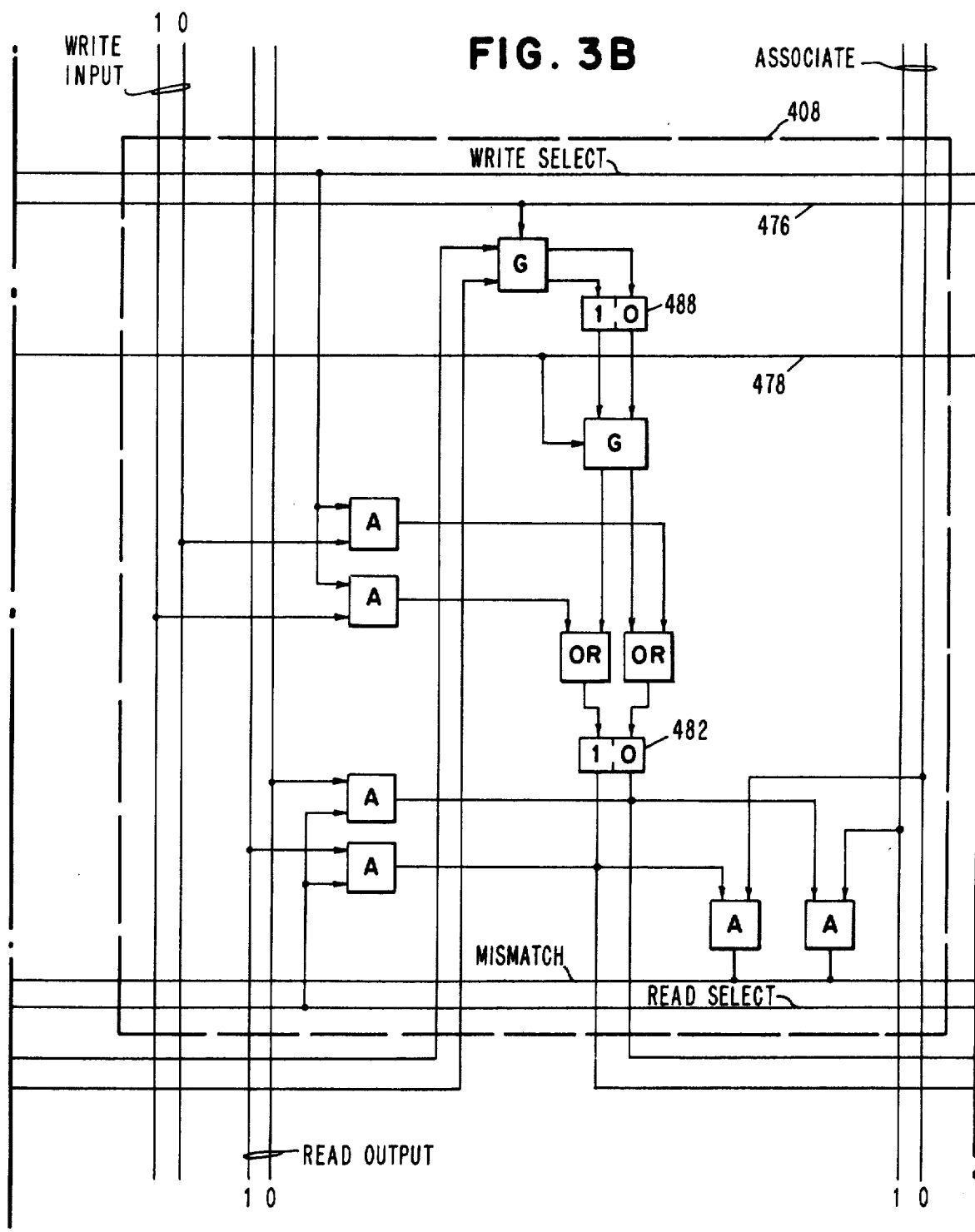

3,964,028

SYSTEM AND METHOD FOR EVALUATING PAGING BEHAVIOR

CROSS-REFERENCE TO RELATED APPLICATION

Application of Laszlo A. Belady and Robert I. Roth, for "System and Method for Evaluating Paging Behavior," Ser. No. 385,222, filed Aug. 2, 1973 to the IBM Corporation.

BACKGROUND OF THE INVENTION

This invention relates to data processing systems wherein the operating systems operate on the concept of virtual memory. More particularly, it relates to apparatus for managing and evaluating such memories in an operating environment.

In recent years, several types of data processing apparatus operate based upon the concept of a virtual memory, such memory employing a combination of a smaller high speed main storage, and a larger and relatively slower secondary storage. The virtual memory makes use of the secondary storage by giving it virtual addresses above the limits of the main storage. The operating system in a virtual memory machine operates as if the secondary storage is as an extension of the high speed main storage by the use of "paging." By "paging," there is meant the bringing of a page of information in secondary storage into main storage at the time that it is required.

Concomitantly with the development of virtual memories which employ a demand paging technique, there have been developed replacement algorithms which are utilized to determine which page is to be removed from main storage and placed back into secondary storage if main storage overflows. Such replacement algorithms have utilized various criteria for determining the choice of page removal, examples of such criteria being first-in first-out (FIFO), least recently used (LRU) and others. In a demand paging type of system, frequently a page which is required is not available in main storage; such unavailability being termed a "page fault."

Quite early in the development of virtual machines employing paging, and replacement algorithms for use in such virtual machines, it was recognized that given a program by its reference string and the size of the main memory, it is useful to known the minimum number of page faults necessary to run the program for evaluating memory configurations and/or algorithms. The minimum number of page faults divided by the number of faults generated by a replacement algorithm is then defined as the efficiency of this particular algorithm. Efficiencies have since been extensively measured and found to vary widely between about 0.15 and 1.0, an approximate average being about 0.4.

To determine the minimum number of page faults, there have been developed the so-called MIN algorithm and the OPT algorithm. The MIN algorithm is described in the publication of L. A. Belady, "A Study of Replacement Algorithms for Virtual Storage Computers," IBM Systems Journal, Vo. 5, No. 2, June 1966. This algorithm enables the continuous processing of the reference string and, given a fixed memory size, computes a single minimum value by constructing, with necessary and variable delay, the memory states and their transitions. The disadvantage presented by this MIN algorithm is that it works for a single memory size at a time.

To overcome this disadvantage, the OPT algorithm was developed, the latter algorithm is described in the publication of R. L. Mattson, J. Gecsei, D. R. Slutz, and I. L. Traiger, "Evaluation Techniques for Storage Hierarchies," IBM Systems Journal, Vol. 9, No. 2, June 1970. This OPT algorithm computes the minimum page fault count for the entire range of memory sizes substantially concurrently. The disadvantage presented in the use of the OPT algorithm is that it requires repetitious look-ahead which then has to be eliminated by a pre-processing first pass. This first pass is the construction of the LRU (least recently used) distance string, usually performed in the reverse order. The resulting sequence is subsequently processed by the OPT algorithm to compute its distance string, i.e., the sequence of minimum capacity memories.

In considering the foregoing described MIN and OPT algorithms, it has been found that both are useful in given situations. Thus, the MIN algorithm is a simple, continuous and efficient technique when only a single memory size is of interest and may be frequently employed in compilers for register allocation. Such use is described in the publication of F. R. A. Hopgood, "Compiling Techniques," MacDonald: London, 1970; pp. 96–99, and in the publication of D. Gries, "Compiler Construction for Digital Computers," John Wiley and Sons, New York 1972. The OPT algorithm, however, is more elaborate, and requires larger amounts of recorded information but it is efficaccious in that it directly provides information as to the entire space-time behavior of the program. Consequently, the OPT algorithm is extensively employed to evaluate storage hierarchy configurations.

However, neither of the MIN or OPT algorithms can be used as an on-line device in an operational environment. Their effect on replacement algorithms is therefore only indirect and through the increased insight that they teach relative to program behavior.

Further developments in this area are exemplified by the publication of L. P. Horwitz, R. M. Karp, R. E. Miller and S. Winograd, "Index Register Allocation," Journal of the ACM, Vol. 13, No. 1, January 1966, wherein there is provided an elegant solution to the general problem of index register allocation. Also, in U.S. Pat. No. 3,577,185 of L. A. Belady, "On-Line System for Measuring the Efficiency of Replacement Algorithms," issued May 4, 1971, and assigned to the IBM Corporation, there is described an on-line device for calculating approximate values for the minimum page fault count.

However, all of the prior art, as outlined hereinabove in the development of techniques for determining the minimum number of page faults, suffer from various disadvantages such as applicability in a particular type of environment, need for repetitious look-ahead, complexity, or inability to be employed in an on-line environment.

Accordingly, it is an important object of this invention to provide apparatus and a method for determining the behavior of replacement algorithms in a vertical memory system, specifically the minimum number of page faults, which is simple as compared to prior art techniques for accomplishing the same purpose, which can be employed with small amounts of information recorded or stored during processing, and which can be used on-line.

It is a further object to provide an apparatus and method in accordance with the preceding object wherein the need for providing for look-ahead is eliminated.

It is a further object to provide an apparatus and method in accordance with the preceding objects which enables the study of program structures in an operating environment.

SUMMARY OF THE INVENTION

In accordance with the invention, there is provided a system for use in data processing apparatus which is operated as a paging machine and wherein a program is considered as a page reference string. This system enables the determining of the minimum memory capacities for the pages of this string, the data processing apparatus includes means for maintaining a first list of the names of the pages of the program ordered in accordance with a least recently used (LRU) criterion, this first list being constituted by the names of the pages and integers respectively having one of the discrete values of 1 to $n$ respectively associated with each of the names according to the criterion wherein $n$ is equal to the total number of the pages in the program. The system comprises means for maintaining a second list of the page names, the second list being constituted by $n$ addresses, each of the addresses having one of the different discrete values of 1 to $n$. There are associated with each of the addresses a different integer, C, from which the minimum memory capacity of the page can be determined, each of the integers, C, of the second list having a different discrete value of 1 to $n$. The system includes means for determining the minimum memory capacity of a given referenced page which comprises means responsive to the referencing of the given page for dividing the second list into a first group of addresses having the values of 1 to $(l-1)$ respectively, and a second group of addresses having the value $l$ to $n$ respectively, wherein $l$ is equal to the LRU integer associated with the given referenced page. The minimum memory capacity determining means further includes means for determining the address $(k)$ in the second group of addresses which has the lowest value integer, C, in the second group and means for marking the series of addresses in the second group included in the subgroup containing addresses $(l+1), \ldots, k-1$ which have the following values $(l+a), (l+b), (l+c), \ldots$, up to address $(k-1)$, if necessary, wherein $(l+a)$ has the smallest address value greater than $l$ such that $C(l+a) < C(l)$, wherein $(l+b)$ has the smallest address value greater than $(l+a)$ such that $C(l+b) < C(l+a)$, etc., wherein $C(i)$ is the value of integer C at address $i$. The minimum memory capacity determining means further includes means for incrementing each of the addresses 2 to $(l-1)$ in the first group by 1 to constitute the addresses 3 to $l$, means for assigning the address value of 2 to the smallest integer originally at address, $k$, such smallest integer being the minimum memory capacity of the given referenced page, and means for assigning to each of the series of the marked addresses of the second group, the value of the next address in the series, the highest value address in the series being assigned the value of $k$.

Also, in accordance with the invention, there is provided a method for use in data processing apparatus wherein the apparatus is operated as a paging machine and wherein a program is considered as a page reference string, for determining the minimum memory capacities for the pages of the string. The data processing apparatus includes means for maintaining a first list of the means of the pages of the program, ordered in accordance with a least recently used (LRU) criterion, this first list being constituted by the names of the pages and integers respectively having one of the different discrete values of 1 to $n$ respectively associated with each of the names according to the criterion, wherein $n$ is equal to the total number of the pages in the program. The method comprises the step of maintaining a second list, this second list being constituted by $n$ addresses, each of the addresses having one of the different discrete values of 1 to $n$, there being associated with each of the addresses an integer, C, from which the minimum memory capacity of the page can be determined, each of the integers, C, having a different discrete value of 1 to $n$. The method further includes the step of determining the minimum memory capacity of a given referenced page comprising the step, which in response to the referencing of the given page, the second list is divided into a first group of addresses having the values of 1 to $(l-1)$ respectively, and a second group of addresses having the values $l$ to $n$ respectively, wherein $l$ is equal to the LRU integer associated with the referenced page. The method, according to the invention, further includes the step of determining the address, $k$, in the second group having the lowest value integer, C, and the step of marking the series of addresses in the second group included in the subgroup containing the addresses $l, (l+1), \ldots, (k-1)$, which have the following values, viz. $l, (l+a), (l+b), (l+c), \ldots$, up to address $(k-1)$, if necessary, wherein $(l+a)$ has the smallest address value greater than $l$ such that $C(l+a) < C(l)$, wherein $(l+b)$ has the smallest address value greater than $(l+a)$ such that $C(l+b) < C(l+a)$, etc. wherein $C(i)$ is the value of integer C at address $i$. Additional steps included in the method are the incrementing of each of the addresses 2 to $(l-1)$ in the first group by 1 to constitute the addresses 3 to $l$, assigning the address value of 2 to the smallest integer originally at address, $k$, such smallest integer being the minimum memory capacity of the given referenced page, and respectively assigning to each of the series of the marked addresses of the second group, the value of the next address in the series, the highest value address in the series being assigned the value $k$.

The foregoing and other objects, features and advantages of the invention will be apparent from the following more particular description of the preferred embodiment of the invention, as illustrated in the accompanying drawings.

BRIEF DESCRIPTION OF THE DRAWINGS

In the drawings.

FIG. 5 illustrates an example for explaining the operation of the invention.

DESCRIPTION OF A PREFERRED EMBODIMENT

Figure 1:
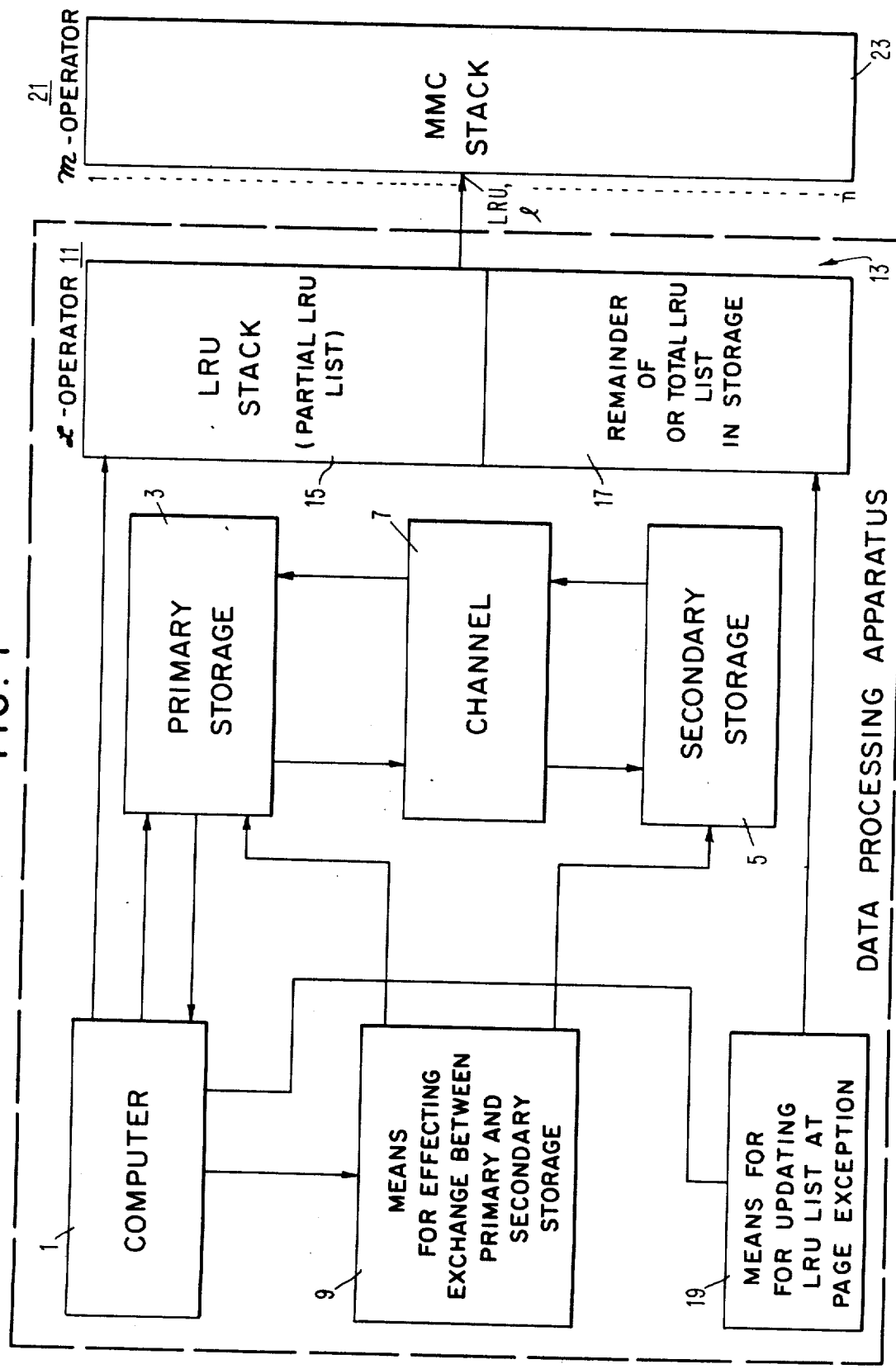
FIG. 1 is a block diagram which conceptually depicts the inventive concept.

In the description of the invention which ensues, let there first be considered a program represented by its page reference string R. For any replacement algorithm, such string is the input. As far as the output is concerned, the above-mentioned MIN algorithm, for a given memory size, produces a single value, i.e., the least count of page faults required to run a program. The OPT algorithm mentioned hereinabove uses the input string R first to produce the LRU (least recently used) stack distance sequence and then uses this new sequence as input for the process which actually extracts the sequency of so-called minimum stack distances. In this connection, reference is made to the above-mentioned Mattson et al publication for the definition of the term "stack." Thereby, each element of string R, i.e., the original input, becomes associated with a stack distance. Since an optimum stack distance is essentially the minimum memory size which is associated with a reference such that no page-fault is induced, the minimum number of faults for any fixed memory size is computable from the distance string. In this connection, reference is made to the above-mentioned Mattson et al publication wherein such computation is described. In the invention described herein, there is not provided an explicit stack in the sense that it is evolved in the Mattson publication. The output string is termed the sequence of minimum memory capacities (MMC).

Heretofore, the ultimate purpose of optimum stack construction for the evaluation of memory hierarchies has been to produce the MMC-string. In this regard, the so-called "hit ratios," i.e., the normalized page fault counts, as a function of memory size, are directly computable from the MMC. Thereby, voluminous recording of the MMC-string can be avoided.

As will be further appreciated in the description of the invention hereinbelow, at any point in the page reference string R, the MMC value associated with the current reference is uniquely a function of the previous references whereby look-ahead is unnecessary and, consequently, can be eliminated.

At this point in the description of the invention, to provide necessary background material therefor, there is described as much as is necessary of the MIN algorithm as set forth in the above-mentioned L. A. Belady publication in the IBM Systems Journal, June 1966. The conceptual framework of this algorithm is a two-dimensional matrix of markings in which there is a row associated with each individual page. The set of construction rules of the matrix, for a given memory size p and reference string R, is as follows:

Let it be assumed that the next reference in page reference string R is to page $\alpha$ and the rightmost non-empty column is $-1$. Then:

If row $\alpha$ is empty, mark $(\alpha,t)$ and return.

Otherwise, find the rightmost column $t$ with a marking in row $\alpha$.

If there exists a column $\tau$, $t_\alpha < \tau < t$ with $p$ markings, mark $(\alpha,t)$ and return.

Otherwise, mark all empty $(\alpha, \tau)$, $t_\alpha < \tau < t$, and return. After having processed the input string R sequentially, using the above rules, the number of non-empty, marked, columns is equal to the minimum number of page pulls necessary to run the program.

The following is an example of a memory size $p=3$ and input (reference) string ABCDEDBCBDAEEAC, of 15 elements.

|   | t |
|---|---|
| A | 1         1 1 |
| B | 1 1 1 1       |
| C | 1     1 1 1   |
| D | 1 1 1         |
| E | 1     1       |

With regard to the above example, clearly, repetitious references, such as EE, do not cause new markings for any value of $p$ and are thus redundant. Accordingly, in the further description of the invention, repetitions will be suppressed and the example that will be utilized will be ABCDEDBCBDAEAC.

The above set forth matrix is relatively easy to interpret. Thus, gaps in a row represent a page pull from the outside, and markings in a given column identify coexisting pages in memory. Gaps, within the constraint set by $p$ (memory size), can be filled with markings upon a new reference to a previously referenced page, thereby avoiding a page pull. Actually, $p$ markings in a column represent an obstacle to a filling attempt, i.e., the gap is permanent. It is to be noted that the columns of $p$ markings are, in general, constructed with a delay.

With this representation resulting from the operation of the MIN algorithm, however, it is difficult to compare and then interpret matrices generated for different $p$ values, since the columns are generally unaligned with each other and the input string. Thus, for the above example and $p=5$, a single column would be generated, with all positions marked, while the matrix associated with $p=1$ has as many columns as there are page references to the output, while each column has only one marking.

In accordance with the invention, the foregoing MIN algorithm is modified. As modified, when the next reference is presented, there are marked $(\alpha,t)$ for all cases. Since, prior to this new reference, $(\alpha,t)$ has been, by definition, empty, matrices for all memories become aligned with the input string and $t$ can be considered to be the index of time to the page reference string R. The next reference is $x_t$, with the t-th column associated with it. The addition then to the above rules is the marking $(\alpha,t)$ in the last step. There are now shown hereinbelow all five matrices, i.e., p = 1, . . . , 5 in the example being utilized employing the modified rules.

|   | A | B | C | D | E | D | B | C | B | D | A | E | A | C |       |
|---|---|---|---|---|---|---|---|---|---|---|---|---|---|---|-------|
| A | 1 |   |   |   |   |   |   |   |   |   | 1 |   | 1 |   |       |
| B |   | 1 |   |   |   |   | 1 |   | 1 |   |   |   |   |   |       |
| C |   |   | 1 |   |   |   |   | 1 |   |   |   |   |   | 1 | p = 1 |
| D |   |   |   | 1 |   | 1 |   |   |   | 1 |   |   |   |   |       |
| E |   |   |   |   | 1 |   |   |   |   |   |   | 1 |   |   |       |
| A | 1 |   |   |   |   |   |   |   |   |   | 1 | 1 | 1 |   |       |
| B |   | 1 |   |   |   |   | 1 | 1 | 1 |   |   |   |   |   |       |
| C |   |   | 1 |   |   |   |   | 1 |   |   |   |   |   | 1 | p = 2 |
| D |   |   |   | 1 | 1 | 1 |   |   |   | 1 |   |   |   |   |       |

-continued

|   | A | B | C | D | E | D | B | C | B | D | A | E | A | C |       |
|---|---|---|---|---|---|---|---|---|---|---|---|---|---|---|-------|
| E |   |   |   |   | 1 |   |   |   |   |   |   | 1 |   |   |       |
| A | 1 |   |   |   |   |   |   |   |   |   | 1 | 1 | 1 |   |       |
| B |   | 1 | 1 | 1 | 1 | 1 | 1 | 1 | 1 |   |   |   |   |   |       |
| C |   |   | 1 |   |   |   | 1 | 1 | 1 | 1 | 1 | 1 | 1 | 1 | p = 3 |
| D |   |   |   | 1 | 1 | 1 | 1 | 1 | 1 | 1 |   |   |   |   |       |
| E |   |   |   |   | 1 |   |   |   |   |   | 1 |   |   |   |       |
| A | 1 |   |   |   |   |   |   |   |   |   | 1 | 1 | 1 |   |       |
| B |   | 1 | 1 | 1 | 1 | 1 | 1 | 1 | 1 |   |   |   |   |   |       |
| C |   |   | 1 | 1 | 1 | 1 | 1 | 1 | 1 | 1 | 1 | 1 | 1 | 1 | P = 4 |
| D |   |   |   | 1 | 1 | 1 | 1 | 1 | 1 | 1 |   |   |   |   |       |
| E |   |   |   |   | 1 | 1 | 1 | 1 | 1 | 1 | 1 | 1 |   |   |       |
| A | 1 | 1 | 1 | 1 | 1 | 1 | 1 | 1 | 1 | 1 | 1 | 1 | 1 |   |       |
| B |   | 1 | 1 | 1 | 1 | 1 | 1 | 1 |   |   |   |   |   |   |       |
| C |   |   | 1 | 1 | 1 | 1 | 1 | 1 | 1 | 1 | 1 | 1 | 1 | 1 | p = 5 |
| D |   |   |   | 1 | 1 | 1 | 1 | 1 | 1 |   |   |   |   |   |       |
| E |   |   |   |   | 1 | 1 | 1 | 1 | 1 | 1 | 1 |   |   |   |       |

Similar to the previous matrix illustrated hereinabove, in the matrices generated in accordance with the modified rules, the number of markings in any column never exceeds the value of p, but can be less. The minimum number of pulls necessary to run the program is then equal to the number of markings not preceded on the left by another marking but by a gap.

The five matrices shown immediately hereinabove are now superimposed. However, there cannot be used the uniform marking, i.e., the numeral 1, since there would result an inconclusive figure identical to that of p=5 which is the union of all five matrices. Extending the range of symbols for marking, there are therefore introduced the new numerals 2, 3, 4, . . . , observing the order of integers which they represent.

In addition to the already presented rules of the algorithm according to the invention, there are now required rules for guiding the use of numerals when marking, such as, the preserving of information about all cases even after superimposition. In order to illustrate the construction rules, the procedure is as follows:

1. The old numeral 1 is employed in the matrix for p=1 whereby the procedure for this case is then unchanged, and there will be a 1 in as many columns as there are references processed. No other numeral is employed.

2. It is determined next that no column contains duplicate numerals. With this determination it is desired to achieve the goal of being able to distinguish between cases of different p-values after superimposition. Thus, if in a given position, matrix p contains a marking but matrix (p-1) does not, then a numeral which has not as yet been used in the corresponding column in matrix (p-1) will distinguish between the two cases.

There can now be constructed the combined matrix by continuously processing the reference string. Thus, when the next reference $X_t$ is presented and it is to page $\alpha$, there is employed the numeral 1 to mark $(\alpha,t)$. Then, there is observed the gap extending to the left of the new marking, bounded on the left either by the margin of the matrix (new reference) or by a numeral 1 (the most recent previous reference to $\alpha$). By contrast, in the original MIN algorithm, the gap would be filled only if, for each column in the region of the gap, the count of markings would be less than some fixed value for p. However, according to the invention, a matrix is being constructed for all possible values of p, therefore, there is employed the numeral for marking which indicates, in position $(\alpha,t-1)$, the maximum p-value for which the gap-filling is valid, ie.e., for which markings are possible, between the two recent consecutive references, or prior to the first reference, to page $\alpha$.

Since it is desired to be ascertained, for all memory sizes, the minimum number of page exceptions necessary to run the program, the numerals have to be employed in a specific order. Thus, starting with the leftmost position of the gap, the smallest numeral, which is not yet present in that column, is used for marking. As a meaning is also attached to the numeral, i.e., that it designates the p-size memory capable of containing the page, a numeral once used in a gap forms a lower bound to the right in the same gap, i.e., before the numeral 1 is reached. In other words, a numeral-string 223444 is valid, for example, while a numeral-string 223443 is not. The reason for this non-decreasing sequence in the numeral string is readily apparent. Thus, in the demand paging being considered, once a page is not an element of, i.e., pushed from, memory of size p, only another reference to the page will pull it back into all memories smaller than or equal to p, including that of unit size.

A gap filling string consisting only of a single numeral a will now be termed an a-string. The string starting with a numeral a and terminating with a numeral b is termed an a/b-string. The above valid string is then a 2/4-string. Further, the value of 1-s is excluded from the strings. Consequently, a or b never have a value of 1. There now follows a summary of the foregoing into a numeral string algorithm:

Let it be assumed that the next reference in string $R, X_t$, is to page $\alpha$.

Then mark $(\alpha,t)$ with a numeral 1.

Starting with the rightmost non-empty position $t_\alpha$ in row $\alpha$, mark every position $(\alpha, \tau)$, $t_\alpha < \tau < t$ with a numeral $P(\tau) = \max(u,v)$ where $u$ = minimum missing numeral in column $\tau$ and $v$ = numeral in position $(\alpha, \tau-1)$ and return.

The application of the immediately foregoing set of rules to the example discussed hereinabove produces the following numeral matrix:

|   | A | B | C | D | E | D | B | C$^t$ | B | D | A | E | A | C |
|---|---|---|---|---|---|---|---|---|---|---|---|---|---|---|
| A | 1 | 2 | 3 | 4 | 5 | 5 | 5 | 5 | 5 | 5 | 1 | 2 | 1 |   |
| B | 2 | 1 | 2 | 2 | 3 | 3 | 1 | 2 | 1 |   |   |   |   |   |
| C | 3 | 3 | 1 | 3 | 4 | 4 | 4 | 1 | 2 | 2 | 2 | 3 | 3 | 1 |
| D | 4 | 4 | 4 | 1 | 2 | 1 | 2 | 3 | 3 | 1 |   |   |   |   |
| E | 5 | 5 | 5 | 5 | 1 | 2 | 3 | 4 | 4 | 4 | 4 | 1 |   |   |
|   | 2 | 3 | 4 | 5 | 2 | 3 | 4 | 2 | 3 | 5 | 4 | 2 | 3 |   |

It is simple to extract the uniformly marked matrix for any given value of p. Such extraction can be done in the following two steps:

a. remove all a/b-strings (between 1-s) for which $b > p$.

b. change all of the remaining symbols to 1-s.

It can now be perceived that the combined matrix has the following properties. If the t-th reference is to page $\alpha$, then $(\alpha,t)$ is marked with 1. In addition, the numeral $(\alpha,t-1)$, i.e., p, represents the minimum memory capacity (MMC) containing page $\alpha$, prior to the t-th reference. The sequence of these MMC values is displayed immediately below the numeral-matrix. There is one MMC for every reference, except for the first one which is by definition numeral 1, however, since repetitious references are eliminated, this first MMC is suppressed.

As a result, the algorithm according to the invention eliminates the look-ahead (first pass) required by the OPT algorithm discussed hereinabove, but produces all of the information generated by the MIN algorithm also discussed hereinabove. Since the numerals stand for (OPT) stack distance, the sequence of numerals in a given row is the history of pushes from memories of distinct sizes. Thus, a change from a to b signifies that the page is pushed from memories of size $c, a \leq c < b$.

The ease of constructing the matrix, as mentioned hereinabove, does not compensate for the bulkiness of the matrix, one of its dimensions being bounded only by the length of R. Since a high speed storage of this size is rarely available for automatic computation, there is provided a more compact representation which keeps just the essential information which is necessary to generate the MMC sequence, as a response to the input string R. Historical information which has been found to be rarely used in practice is suppressed.

In the numerical string algorithm, upon the presentation of the next reference, a new string is constructed which is subject to constraint by strings which had been drawn earlier. In order to achieve compactness, the constraints are summarized such that the new string is sufficiently defined and, in particular, the string's rightmost numeral, identifying the MMC output associated with the page reference, is displayed.

A simple way of doing this is to construct independently for each gap the minimum a/b-string (or briefly minimum string), using the rules as set forth hereinabove. In the example presented there, a next reference to either B or D would produce 4 as output, while a reference to E or A would result in 2 (a reference to C would be a repetition). The corresponding minimum strings, listed in the order of their lengths, or equivalently in the LRU (least recently used) order to past references, are:

```
A                 2
E           2     2
D     3  4  4     4
B  3  3  4  4     4
```

Only one of the strings becomes, of course, an actual minimum string, i.e., the one which in fact is next referenced. A new set of potential outputs can then be defined. The intent is to describe the potential outputs in a manner such that, if and when the next reference is known, not only is its associated output defined but the description of the new potential outputs is available.

In order to arrive at such arrangement, it is to be noted that the minimum string for D in the example is a proper, right adjusted, substring of that for B; a similar relation exists between A and E. Next, it is observed that in the longest gap, there is for the strings only one starting numeral to choose from. In the next longest gap, there are two "free" numerals, then three and so on. In the example as mentioned above, 3 is the only choice for B's starting numeral, but 3 and 5 are both possible for D without duplicate numerals in a column. Similarly, 2, 4 and 5 are possible for E and finally all but 1 for A. Of course, independently constructed minimum strings drawn for individual gaps always start with the smallest numeral possible as shown in the above table.

There are now defined two kinds of minimum strings: the immediate minimum string IMS and the conditional minimum string CMS. The IMS of element $\alpha$ is the numeral string which is generated by the rules as stated hereinabove, if the next reference is to element $\alpha$. The string listed above for A, E, D and B are then by definition, the IMS.

A conditional minimum string, CMS, is on the other hand a minimum string whose starting numeral is not the smallest possible one, and it is either a proper right adjusted substring of an IMS or a CMS filling a longer gap or it can be constructed as a minimum string after all longer gaps are filled.

There are now listed the IMS and CMS for the example:

```
       IMS         CMS
A       2      3    4    5
E      22          44   55
D    3444              5555
B   33444
```

It is seen that the IMS's listed above are identical to those presented earlier. However, 5555 as a CMS for D, for example, is constructed with B's only string being assumed to have already been drawn. Other CMS's were similarly generated. It is to be noted that each string (IMS or CMS) which is not a substring in the above list is underlined, such a string being suitably termed a "primitive." Every other (not underlined) string is then a substring of some primitive.

Because of this string/substring inclusion property of IMS/CMS and by the construction rules as set forth above, there are as many primitives to draw as there are gaps. If n is the number of elements already referenced, then there are n-1 primitives. For the example, four primitives (underlined in the above list) are constructed by the following rules:

Take the longest gap and draw its minimum string.

2. Take the next longest gap and draw the minimum string assuming that all longer gaps are filled with IMS and CMS.

3. Repeat the previous step until all gaps are filled.

In general, the terminating numerals of the (n-1) primitives contain all immediate and conditional minimum output values. The listing of the primitives for the example is as follows:

```
A                 3
E           2     2
D     5  5  5     5
B  3  3  4  4     4
``` the terminal numerals being enclosed in a block. This LRU- ordered last column formed by the primitives is defined as the p-stack of output values and is interpreted as follows: B, the least recently referenced element has only one starting numeral for a minimum string (IMS) and its terminal numeral is 4, which is the next MMC - output if B is referenced next.

Next, there are two possible starting numerals for D and, by construction, the corresponding IMS and CMS terminate in 4 and 5, listed at and below D in the p-stack. Since the numeral 4 is the smaller of the two, it becomes the MMC associated with D if it is next referenced. Similarly, E has three IMS and CMS terminating in 2, 4 and 5 and therefore, the smallest, 2 becomes the output if E is referenced next. Element A's MMC would also be 2 since it is the smallest of the terminal numerals 2, 3, 4 and 5.

Thus, generally, given the p-stack of output values in the LRU order of their associated elements, the MMC-value for the next referenced element can be, for example, computed as follows:

If the next reference is the $l$-th recently referenced element, there is selected as the MMC, the smallest from the set S of numerals at or below the $(l-1)$th position in the p-stack.

In the example, if element E, the third most recently referenced element, is referenced next, then the output is 2 which is the smallest number at or below the second stack position. Similarly, the output for element D would be 4, etc.

There is now explained as to how the p-stack is manipulated in order to reflect in it the new IMS/CMS configuration after the next reference is included.

The next reference lists either an element whose IMS is primitive or else its IMS is a proper substring of either an IMS or a CMS associated with an element which was referenced earlier. Also, by definition the longest gap that of the least recently referenced element) has an IMS which is primitive. In the example, IMS for B and E are primitives, while the IMS for D or A is a substring.

Let it be assumed that $\alpha$ is referenced next. Then, for the former case, IMS is primitive. The IMS and CMS for each element referenced earlier than $\alpha$ (or below $\alpha$ in the LRU order) are unchanged. The reason is that, by the definition of the primitive string, none of the longer IMS or CMS includes the string actually generated for $\alpha$. The IMS/CMS of elements more recently referenced than $\alpha$, however, become changed, i.e., either an IMS or a CMS is lost for each element in this range, by the actual string in row $\alpha$. This is equivalent of moving the new output value, i.e., the terminal numeral of the actual string, from its prior position to the top of the p-stack.

If in the example, E is next referenced where E's IMS is primitive, the corresponding stack transition can be illustrated as follows: (For the purpose of clarity of explanation, there are also listed the names of the elements A through E in LRU order.)

```
        C           E
        A    3      C    2
     →  E    2      A    3
        D    5 ────►D    5
        B    4      B    4
```

Similarly, a reference to B (also with a primitive IMS) would cause the following transition:

```
        C           B
        A    3      C    4
        E    2      A    3
        D    5 ────►E    2
     →  B    4      D    5
```

Considering now the latter case, it is somewhat more complicated since the actual string for $\alpha$ is not primitive. Clearly, the IMS/CMS configuration of some elements, earlier referenced less recently than $\alpha$, become changed since there exists an IMS properly including the actual string. The unused portion of this including string has to be extended to the right by new numerals. Under the minimum constraint, these numerals become the smallest (former) CMS of $\alpha$. This CMS of $\alpha$, in turn, may be a substring of some other IMS or CMS, causing its including string to become extended by the next smallest CMS or $\alpha$, etc., as illustrated in the following example:

```
A   5 5 5 1|4               5 5 5 1 2 1|
B   2 1|3 3 3               2 1|3 3 4 4
C   1|2 2 2 2 ──────────► 1|2 2 2 3 3
D   3 3 1|5 5               3 3 1|5 5 5
E   4 4 4 4 1|              4 4 4 4 1|2
```

In the above depiction, the jagged lines separate the actual strings from the IMS and CMS.

It is readily verified that the last column in the right matrix correctly reflects the new output (terminal numeral) configuration of all of the IMS and CMS. The corresponding stack transition can be extracted as follows:

```
   →  4         2
      5 ──────► 5
      3         4
      2         3
```

The new output is 2 which is the terminal numeral of the actual string for A. Upon transition, this numeral 2 is placed at the top of the stack thereby indicating that, from now on, and for a while, no IMS or CMS terminates in the numeral 2, except for one IMS for the topmost element E (now the second most recently referenced element). Since element C has lost its IMS of 2222, its new IMS terminates in 3 which was A's smallest CMS. However, this latter string is not primitive; therefore B loses its CMS of 333 and gets replaced by the 3344 string ending in 4, which was the next smallest CMS of A. Only the 55 string remains untouched.

There has already been described as to how there is found the output value MMC in the set S of the p-stack when the next reference is presented. It has now been seen that the updating of the new conditions requires the removal of the output value from the stack and its subsequent placement on the top. The vacated position then is to be filled with the next smallest numeral, if any, in set S of the original stack above the vacant position. This, in turn, creates a new vacant position to be filled with the next smallest in that range, is any, and so on. A more formal description of these rules follows hereinbelow.

The operation of the system according to the invention can be conceptually diagrammed as follows:

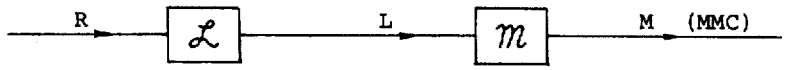

wherein L is operator which transforms sequence R of page references into sequence L of LRU positions. It keeps the already referenced pages (page names) in an LRU-stack and is defined as follows: If the page referenced next is not in the LRU-stack, the new page is placed on the top of the stack, n, the number of pages in the stack is incremented by 1, (n-1) is output and return is made. Otherwise, the page at the $k$-th position in the LRU-stack is found, this page is removed and placed on top of the stack, ($k$-1) is output, and the return is made.

M is an operator which transforms the sequence L of the LRU-positions into a sequence M of minimum memory capacities (MMC). It keeps past output values (constraints) in a modified LRU stack and is defined as follows: If the next position, $l$ is zero, a return is made. Otherwise, If the $l$-th position in the modified stack is empty, the numeral ($l$+1) = $p$ is placed on the top of the stack, $p$ is output and a return is made. Otherwise, the smallest value $p$ is found at, or below the $l$-th position on the modified stack.

If p is at the $l$-th position, $p$ is removed, $p$ is placed at the top of the stack, $p$ is output, and a return is made. Otherwise, the smallest value $p'$ above $p$ is found which is at or below the $l$-th position; p and p' are exchanged in the modified stack and the branch is made back to the immediately preceding step.

It is to be noted that the last two steps are identical to a single pass of the so-called "bubble sort," i.e., a pairwise exchange sort, as is disclosed in the publication titled "Sorting Techniques," IBM Data Processing Techniques, Form NR, C20-1639-0, pp. 12-13.

The M-operator can thus be generally described as follows: the finding of the minimum value $p$ in the lower part of the P-stack, i.e., the elements at and below the $l$-th position, by performing a single pass of a bubble sort type and the then placing of p on the top of the stack.

The correctness of the two-pass OPT algorithm is proven in the above-mentioned Mattson et al publication. The operation accomplished in accordance with the invention can be considered as a one-pass OPT, the numerals representing (OPT) stack positions.

There now follows hereinbelow, a formal description of the OPT algorithm and the novel one-pass algorithm carried out by the invention. In these descriptions it will be demonstrated that the one-pass algorithm generates the same distance string (MMC-s) as the OPT algorithm.

In this connection, as has been discussed hereinabove, in the one-pass algorithm two stacks are maintained. One of these is the LRU stack which is the list of pages referenced in the LRU order. Thus, the most recently referenced page is on top of the stack, i.e., a page $\alpha$ is above a page $\beta$ if and only if page $\alpha$ has been referenced more recently than page $\beta$.

The second stack (P) can be conveniently considered a pseudo OPT stack. It is a list of integers from which the OPT stack distance may be calculated for any page which is referenced. When a page is referenced, its position in the LRU stack is found. The OPT stack distance is the smallest integer in the P stack which is at or below the LRU stack position.

The LRU stack is updated by moving the page referenced to the top of the stack and pushing each page above it down one position.

The P stack is updated as follows: The value at the LRU position is saved and all items between it and the second position are moved down one position. The saved value is compared with the value in the next position. The larger of these values is placed in this position and the smaller value is saved. The process is continued until the bottom of the P-stack is reached. The saved value is the OPT-stack position and is placed in the second position of the P-stack.

An alternate description of the update procedure is as follows: Assuming the $k$ is the LRU stack position, all items between 2 and k-1 are marked. Thereafter, the next item which is marked is the one is the one which has the minimum value from among the items which are at or below position $k$ and above the last marked item if any such item exists. This procedure is continued until item $k$ is marked. The marked item in the lowest position is the OPT stack value, i.e., position. All other marked items are shifted to the next lower marked position, and the OPT stack value is put in the second position of the P-stack. The output is the LRU stack position $k$ and the OPT-stack position (MMC).

At this point to enable comparison between the inventive algorithm and the OPT algorithm as described in the above-referred to Mattson et al paper, there is summarized the operation of the OPT algorithm.

In the operation of this algorithm, on the first pass of the page trace, the forward distance string is created, i.e., the reference string $R = X_1, X_2, \ldots, X_N$ and the forward distance string $F = F_1, F_2, \ldots, F_N$, the forward distance string effectively being the summary of the "future" of the reference string. The OPT algorithm in itself is a stack algorithm induced by a priority list. Thus, considering the stack $Q_t$ and the priority list $L_t$ at time $t$, if $X_{t+1}$ is the next referenced page, its position $k$ in stack $Q_t$ is the OPT stack distance. This next referenced page is placed in the output string and on top of the Q stack. Items above this next referenced page are rearranged as follows: The priority for the displaced page and the page in the next position are compared. The page with the highest priority (lowest priority number) is placed in this position while the other page is displaced. This continues until the next page position is $k$, then the last displaced page is placed in this position.

The priority list L is updated as follows: All priorities which are less than or equal to the forward distance $F_{t+1}$ are reduced by one and the priority for the referenced page $X_{t+1}$ is $F_{t+1}$.

Referring back to the algorithm achieved according to the invention, there has been demonstrated informally hereinabove that the MMC-values can be generated in one pass. It has also been mentioned that these MMC values are, in fact, the OPT stack distance. However, in the numeral matrix algorithm, there can be maintained a sequence of OPT-stacks which are only partially filled in, as opposed to the two-pass OPT algorithm which has no gaps but wherein stacks are maintained for all times up to the present, because of the supplying by the first pass of all of the necessary information about the future.

The tabulation which now follows immediately hereinbelow is based on the example mentioned hereinabove (reference string) without the page A. In this tabulation, only eight consecutive references are employed. In order to conform with the OPT algorithm, the ∞ symbol is defined as the output associated with the first reference to a page. In the tabulation, in the $A_t$ and $B_t$ columns, only the most recent (n+1) columns, which are non-empty, are shown for times (t-n), (t-n+1), ..., (t-1), t.

| Time t | Page ref. $X_t$ | OPT. Stack Positions (former numeral matrix) | Available (free) position list, $A_t$ | Unassigned page list $B_t$ | Output $MMC_t$ |
|---|---|---|---|---|---|
| 1 | B | B 1 | 0 | 0 | ∞ |
| 2 | C | B 1<br>C - 1 | 2 | B | ∞ |
| 3 | D | B 1<br>C - 1<br>D - - 1 | 22<br>3 | BB<br>C | ∞ |
| 4 | E | B 1<br>C - 1<br>D - - 1<br>E - - - 1 | 222<br>33<br>4 | BBB<br>CC<br>D | ∞ |
| 5 | D | B 1<br>C - 1<br>D - - 1 2 1<br>E - - - 1 | 2244<br>333<br>2 | BBBB<br>CCC<br>E | 2 |
| 6 | B | B 1 2 2 3 3 1<br>C - 1<br>D - - 1 2 1<br>E - - - 1 | 3444<br>22<br>3 | CCCC<br>EE<br>D | 3 |
| 7 | C | B 1 2 2 3 3 1<br>C - 1 3 4 4 4 1<br>D - - 1 2 1<br>E - - - 1 | 222<br>33<br>4 | EEE<br>DD<br>B | 4 |
| 8 | B | B 1 2 2 3 3 1 2 1<br>C - 1 3 4 4 4 1<br>D - - 1 2 1<br>E - - - 1 | 2244<br>333<br>2 | EEEE<br>DDD<br>C | 2 |

Previously hereinabove there was set forth the matrix updating procedure. There now follows an interpretation of this updating procedure utilizing the OPT-stack terminology. For example, when C is referenced at time 7, the row which is designated C is filled for times 3, 4, 5, 6 and 7. For t=3, the only available stack position, i.e., 3, is given to C. For t=4, the stack position 4 has to be given as the only available one. For t=5, the available set is {2,4}. Thus, 4 is assigned as the smallest of the set, but not smaller than the position assigned previously. Similarly, position 4 is selected for t=6 from the unassigned positions, i.e., 4, 2 and 3. For t=7, the stack position value of 1 is assigned to C because it is the referenced page at that time. The OPT stack distance for C is the last stack position 4, prior to the reference at t=7.

There now follows a formal structure which establishes that the one-pass algorithm provides the same output as the two-pass OPT algorithm as disclosed in the above-referred to Mattson et al paper. To revolve this formal structure, there are first extended notations which were previously employed. The numeral matrix appears now as a partial function $H_t$. The terms $A_t$ and $B_t$ previously employed, are now formally defined. The term $k$ is any stack position, the term $\gamma_\tau$ is the $\tau$-th element of a numerical string $S(\alpha)$, at time $t_\alpha$, where $\alpha$ is a page again being referenced. The term [a, b] is the set of consecutive integers $a, a+1, \ldots, b-1, b; a < b$.

The formal structure is as follows:

Define the sequence of partial functions $H_t$ recursively as follows:

$$H_1 = \{((1, x_1), 1)\}$$

Let it be assumed that $H_t$ has been defined.

Let $\Sigma_t$ be the set of pages referenced up to time $t$ and let $n_t$ be the number of pages in $\Sigma_t$.

Define $A_t(\tau) = [1, n_t] - \{k | \exists \alpha \epsilon \Sigma_t ((\tau, \alpha), k) \epsilon H_t\}$.

$B_t(\tau) = \Sigma_t - \{\alpha | \exists k \epsilon [1, n_t] ((\tau, \alpha), k) \epsilon H_t\}$.

The string $S(\alpha)$ is defined to be the sequence $$\{((\tau, \alpha), \gamma_\tau) t_\alpha < \tau \leq t + 1\}.$$

where $t_\alpha =$ last time $\alpha$ was referenced. (If this is the first time $\alpha$ is referenced $t_\alpha = 0$ and $\gamma_0 = \infty$). Also define $\gamma_{t_\alpha} = 1$ and $\gamma_{t+1} = 1$;

$\gamma_t = \min \{k | k \geq \gamma_{\tau-1}$ and $k \epsilon A_t(\tau)\}$ for satisfying $t_\alpha < \tau \leq t$.

Then $H_{t+1} = H_t \cup S(\alpha)$.

Using this definition of the sequence $H_t$, there can now be proved:

Theorem 1

If $(\tau, \alpha, k) \epsilon H_t$, then $k$ is the OPT stack position for page $\alpha$ at time $\tau$.

This theorem follows from

Lemma 1: If $H_t$ gives the OPT stack stable at time $t$, then $S(\alpha)$ determines the OPT stack entries for $\alpha = x_{t+1}$ for all times since $\alpha$ was last referenced.

Proof: If $\alpha$ was not previously referenced, then its OPT stack position for all $\tau < t + 1$ is ∞, and for $\tau = t + 1$, its position is 1. If $\alpha$ was last referenced at time $t_\alpha$, then its stack position at that time was 1. The position of $\alpha$ at each time $t_\alpha < \tau \leq t$ is determined in the OPT algorithms as follows: If $\alpha$ was at stack position $\gamma_\tau$ at time $\tau$, it will remain at position $\gamma_\tau$ if $\gamma_\tau$ has not been assigned to any other page at time $\tau + 1$, i.e., $\gamma_\tau$ is in the set $A_t(\tau + 1)$. Otherwise, $\alpha$ will be displaced from position $\gamma_\tau$ if $\gamma_\tau$ has been assigned to some other page, (i.e., $\gamma$ and $A_t(\tau + 1)$. In this case, its stack position will be the first unassigned stack position which is greater than $\gamma_\tau$.

The OPT algorithm may be interpreted as follows:

A page $\alpha$ whose stack position is $\gamma_\tau$ at time $\tau$ will remain at that position at time $\tau + 1$ because 1. the stack position of the page referenced at time $\tau + 1$ is less than $\gamma_\tau$ (i.e., $\alpha$ is not challenged).

or 2. if $\alpha$ is challenged, it has a higher priority than all challengers for its position. But this can happen only if $\gamma_\tau$ has not been assigned to a page with higher priority. Suppose $\alpha$ is at stack position $\gamma_\tau$ at time $\tau$. Suppose the page $\beta$ is referenced at time $\tau + 1$ and is in position $\Delta_\tau$, then if $\gamma_\tau > \Delta_\tau$, $\alpha$ will remain in position $\gamma_\tau$. The stack positions for all pages with higher priority than $\gamma_\tau$, have already been determined (by the induction hypothesis). Thus $\alpha$ will be assigned the first available position which is $\geq \gamma_\tau$. A page cannot achieve a smaller stack position than its present value. In the contests for any given stack position, the positions for all pages with higher priority than $\alpha$ have already been assigned. Thus, $\alpha$ may compete for all stack positions $\geq \gamma_\tau$, and will win the first contest in which it has a higher priority. But this will happen only for stack positions which have not been assigned. Thus, the stack position for $\alpha$ at time $\tau + 1$ is given by min $\{k | k \geq \gamma_\tau$ and $k \epsilon A_t(\tau+1)\}$. Q.E.D.

In the definition of the partial functions, there were introduced the sets $A_t(\tau)$ and $B_t(\tau)$ for $\tau \quad t$.

These sets are used to establish the connection to the one pass OPT algorithm. First there are listed some properties of $A_t(\tau)$ and $B_t(\tau)$.

$$B_t(\tau) \subseteq B_t(\tau + 1) \qquad 1.$$

$$|A_t(\tau)| \leq |A_t(\tau + 1)| \qquad 2.$$

$|A_i(\tau)| = |B_i(\tau)|$ $|A_j(\tau)| < |A_i(\tau+1)| \rightarrow A_i(\tau+1) = A_i(\tau) \cup \{k\}$ $|A_i(\tau)| = |A_i(\tau+1)| \rightarrow A_i(\tau+1) = (A_i(\tau) - j) \cup k$ (a). $A_t(t) = [2,n_t]$
(b). $B_t(t) = \Sigma_t - \{x_t\}$.

If $\alpha$ has been previously referenced $A_{t+1}(\tau) = A_t(\tau) - \{\gamma_t\}$ $B_{t+1}(\tau) = B_t(\tau) - \{\alpha\}$ for $t_\alpha < \tau \le t$ If $\alpha$ has not been previously referenced then $\Sigma_{t+1} = \Sigma_t \cup \{\alpha\}$ and $n_{t+1} = n_t + 1$ $A_{t+1}(\tau) = A_t(\tau)$  $1 \le \tau \le t$ $B_{t+1}(\tau) = B_t(\tau)$  $1 < \tau < t$

Definition of the L and P Stacks

The L and P stacks are obtained from the sets $A_t(\tau)$ and $B_t(\tau)$, $\tau \le t$ as follows: Define $t_i$ and $\alpha_i$ for $i = 1, \ldots, n$ by the formulas $t_i = \min\{ S \mid |B_t(S)| = i\}$ $i = 1, \ldots, n$ $\alpha_i \epsilon B_t(t_i) - B_t(t_i - 1)$ $i = 1, \ldots, n-1$ $\alpha_n \epsilon \Sigma_t - B_t(t_{n-1})$ It is to be noted that $\alpha_n$ is the page referenced at time $t$. For each $i = 1, \ldots, n-1$, let $S(\alpha_i)$ be the string adjoined to the partial function $H_t$ after the strings $S(\alpha_1), \ldots, S(\alpha_{i-1})$ have been adjoined and define $S^1(\alpha_i)$ to be the string $S(\alpha_i)$ truncated at time $t$. Thus $S^1(\alpha_i) = \{(j,\alpha_i,\gamma_j) \mid (j,\alpha_i,\gamma_j) \epsilon S(\alpha_i)$ and $j = t_i, \ldots, t\}$.

Let $X_t$ be the set $[1,t] \times \Sigma_t \times [1,n]$ and $G_t = X_t - H_t$.

Then $G_t = \bigcup_{i=1}^{n-1} S^1(\alpha_i)$.

Define $P_t$ to be the set of integers $[1,n_t]$ in the order induced by the strings $S^1(\alpha_i)$. Thus $P_t(1) = 1$ $P_t(j) = k$ if and only if $(t,\alpha_{n-j+1},k) \epsilon S^1(\alpha_{n-j+1})$ for $j = 2, \ldots, n$ Also define $L_t$ to be the set of pages $\Sigma_t$ in the order induced by the sequence $\alpha_1, \ldots, \alpha_n$, i.e., in LRU order. Thus $L_t(j) = \alpha_{n-j+1}$ for $j = 1, \ldots, n$ With these definitions, there are now provided the following lemmas.

Lemma 2: If $\alpha_K \epsilon \Sigma_t$ is referenced at time $t+1$, the output $\gamma_K$ is given by the formula $\gamma_K = \min\{k \mid \exists j (t,\alpha_j,k) \epsilon S^1(\alpha_j)$ and $j \le K\} = \min\{P_t(j) \mid j \ge n - K - 1\}$ 3. Lemma 3: If $P_t$ and $L_t$ correspond to the pairs $A_t$ and $B_t$, and $\alpha_K \epsilon \Sigma_t$ is the next page referenced, then the stacks $P^1_{t+1}$ and $L^1_{t+1}$ updated by the one pass OPT procedure are the same as the stacks $P_{t+1}$ and $L_{t+1}$ corresponding to the pairs $A_{t+1}$ and $B_{t+1}$.

These two lemmas establish the equivalence of the one pass OPT to the two pass OPT algorithms. This follows because for any input, the same output is obtained and the updated stacks $P^1_{t+1}$ and $L^1_{t+1}$ correspond to the partial function $H_{t+1}$.

Prior to describing the structure of the system according to the invention, it is convenient at this point to make certain observations of the invention's operation. Thus:

1. The operation of the system is a continuous process and produces the string of MMC values directly from the input without requiring look-ahead.

2. The totality of information to be stored is a table, the number of elements in the table being equal to the program size under page measure.

3. Many steps of the total operation can be conceived of as parallel operations, employing an associative memory for example.

4. The system enables on-line operation thereby eliminating the need for recording the reference string.

Reference is now made to FIG. 1, wherein there is shown a conceptual depiction of an embodiment according to the invention. The environment of the invention is suitably data processing apparatus which is operated as a paging machine. Such apparatus suitably includes a central processing unit or computer 1, primary storage 3, secondary storage 5, primary storage 3 and secondary storage 5 intercommunicating with each other through a channel 7. A stage 9 legended Means For Effecting Exchange Between Primary and Secondary Storage is actually intrinsic to the computer itself and depicts the conventional capability of the computer for effecting exchanges between primary and secondary storage as will be further understood hereinbelow. Stage 9 is operative at the time that a page exception occurs.

With regard to page exception, it is assumed, as is conventional in the operation of paging a virtual machine, the section of primary storage that is made available for the execution of a program can only accommodate a portion, $m$, of the total pages, $n$. Secondary storage contains the remaining pages of the program, $(n-m)$. The page exception occurs when the program calls for a page that is in secondary storage. That page is brought into primary storage and a page in primary storage is placed into secondary storage in exchange therefor, the selection of a page to be taken out of primary storage in such situation generally being dependent upon a replacement algorithm criterion.

In accordance with the invention, the invention also includes the stage legended as $L$-operator 11. This stage includes an LRU list 13. The LRU list is a list of the names of the pages and integers associated respectively with each of the pages which are in accordance with a least recently used (LRU) criterion. The LRU integer values are 1 to $n$. As shown in FIG. 1, the LRU list is depicted as comprising two components, an LRU stack 15 which is a partial LRU list in hardware and the remainder of or total LRU list in storage 17. Where the LRU list is partitioned as shown in FIG. 1, it suitably comprises a stack of $m$ registers which contain the page names of those pages in the program at present in prinary storage. The LRU integers respectively associated with the page names in LRU stack 15 have values of 1 to $m$.

It is appreciated that each register in LRU stack 15 has to be capable of containing contents at least equal to a value of $m$. The remainder of the total LRU list in storage 17 may be only that portion, i.e., $(n-m)$ pages representing the $(n-m)$ pages presently in secondary storage whereby the LRU integers associated with the latter pages have the values of $(m+1)$ to $n$. Alternatively, component 17 can comprise the total LRU list in storage whereby the LRU integers associated with the respective page names make the different values included in 1 to $n$. The stage 19 legended Means For Updating LRU List at Page Exception is also intrinsically part of the computer of the data processing apparatus. Stage 19 effects the following operations when a page exception occurs.

1. The page name of the page causing the exception is placed into the LRU stack component 15 and assigned the LRU integer of 1.

2. The page name of the page which is transferred from primary storage 3 to secondary storage 5, i.e., the one which immediately prior to the occurrence of the exception of the LRU integer value of $m$ associated with it is placed into component 17 of the LRU list and then assigned the LRU integer value of $(m+1)$.

3. Those page names in LRU stack component 15 which had the LRU integers of 1 to $(m+1)$ are respectively incremented by 1 whereby they now constitute the LRU integer values of 2 to $m$.

4. Those page names in component 17 of the LRU list which had the LRU integer values of $(m+1)$ to one less than the LRU integer of the page causing the exception are respectively incremented by 1.

In the description of the invention thus far, since LRU lists are known, the LRU list is included within the dashed line portion which is legended data processing apparatus. The M-operator 21 is the means for effecting the invention and can be an add-on device to the data processing apparatus portion. The MMC stack 23 component of the M-operator is a stack of 1st to $n$th registers, each of the registers of stack 23 containing an MMC (minimum memory capacity) integer, each of the respective latter integers taking one of the different discrete values of 1 to $n$. The MMC integers are provided in accordance with an algorithm as described hereinabove.

In considering the operation of M-operator 21, when the next reference of the reference string is presented from computer 1, the MMC stack is divided into an upper portion of registers having the values in the ordered sequence of 1 to $(l-1)$ and a lower portion in an ordered sequence having the values $l$ to $n$ wherein $l$ is equal to the LRU integer associated with the page name of the reference being presented. The M-operator 21 at this juncture performs the following operations:

1. The shifting down by one of the contents of respective registers 2 to $(l-1)$ whereby these contents are now contained in registers 3 to $l$.

2. The ascertaining of register $k$ among registers $l$ to $n$ whereat there is present the smallest integer, C, of all of the integers in registers $l$ to $n$.

3. The shifting of the contents in register $k$ into register 2.

4. The marking of the series of registers contained in the group $l$ to $(k-1)$, if necessary, viz. $l$, $(l+a)$, $(l+b)$, . . ., to $(k-1)$, if necessary, whereby $(l+a)$ is the lowest register number greater than $l$ such that $C(l+a) < C(l)$, wherein $(l+b)$ is the smallest register number greater than $(l+a)$ such that $C(l+b) < C(l+a)$, etc., wherein $C(i)$ is the value of the MMC integer of register $i$.

5. Transferring the contents of the respective registers in the marked series to the next register in the series, the contents of the highest numbered register in the series being placed into register $k$.

In the operation of the invention, the MMC stack is suitably initialized by load registers 1 to $n$ with integers of 1 to $n$ respectively, not necessarily in any order.

There follows hereinbelow a description of the structure and operation of a preferred embodiment constructed in accordance with the principles of the invention. In this description, reference is first made to FIGS. 2A to 2Z, taken together as in FIG. 2, wherein this embodiment is depicted in essentially block form.

Figure 2A:
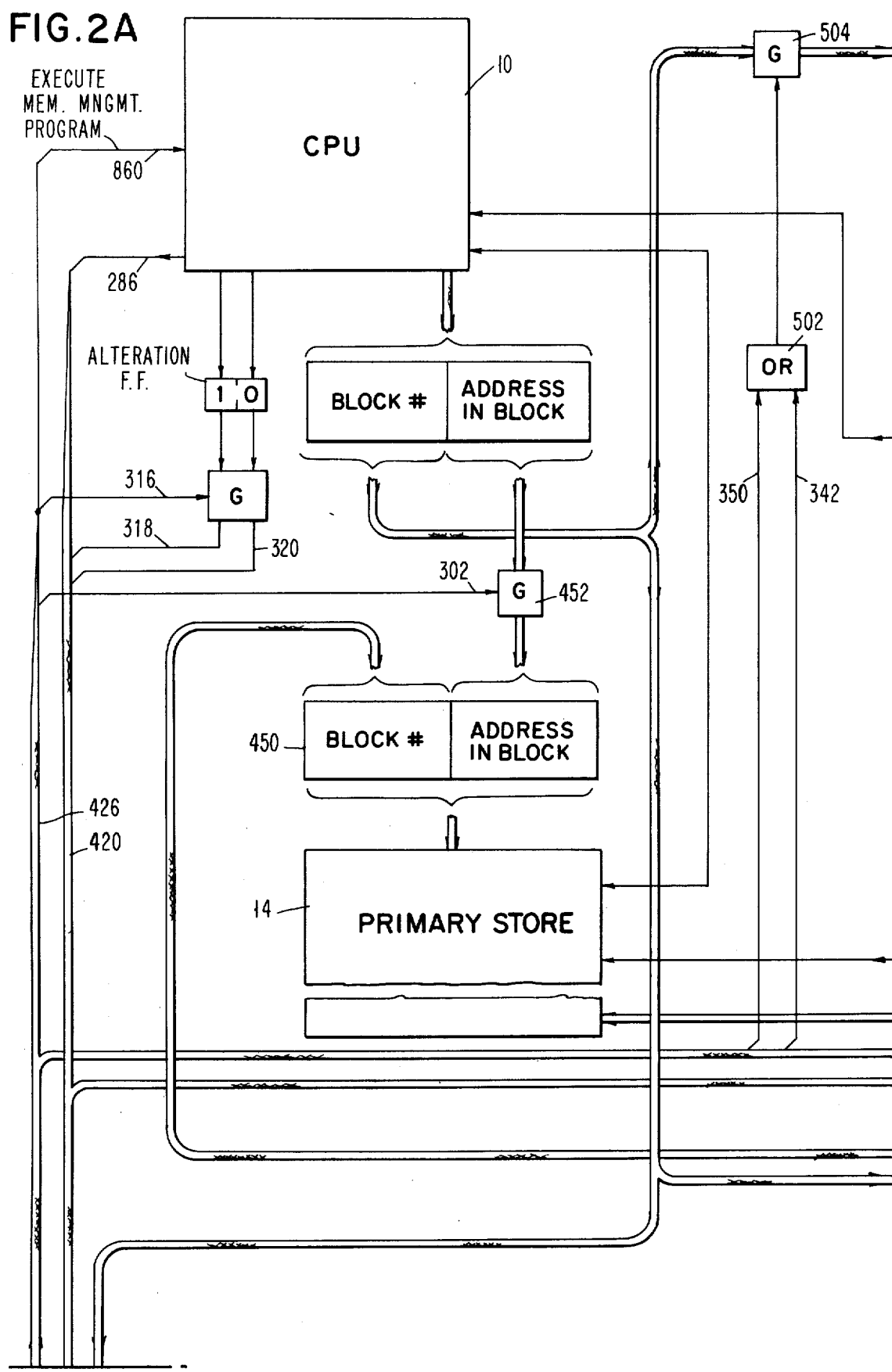
FIG. 2A to 2Z, taken together as in FIG. 2, is a block diagram of a preferred embodiment constructed in accordance with the principles of the invention.
Figure 2D:
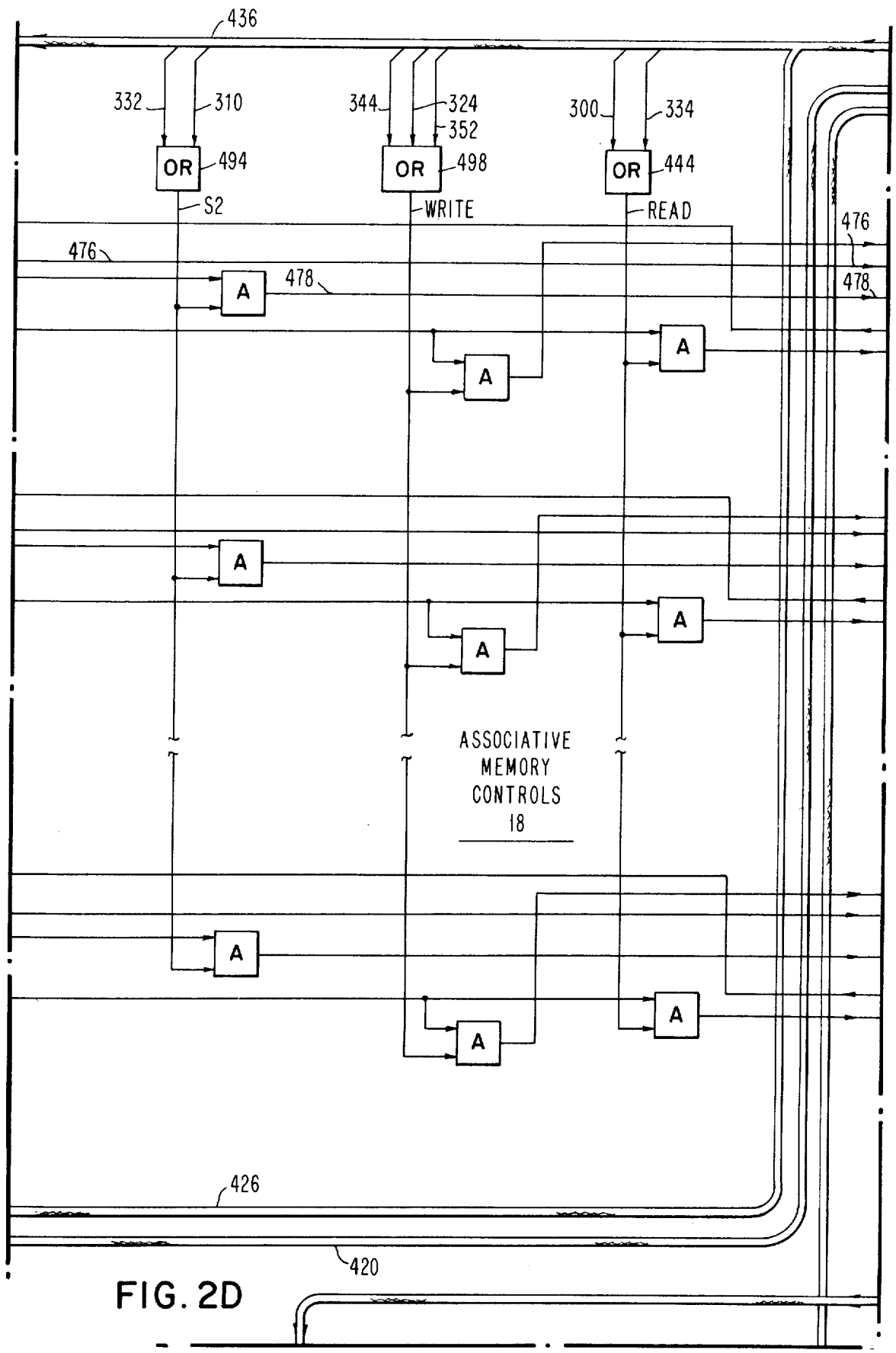
Figure 2G:
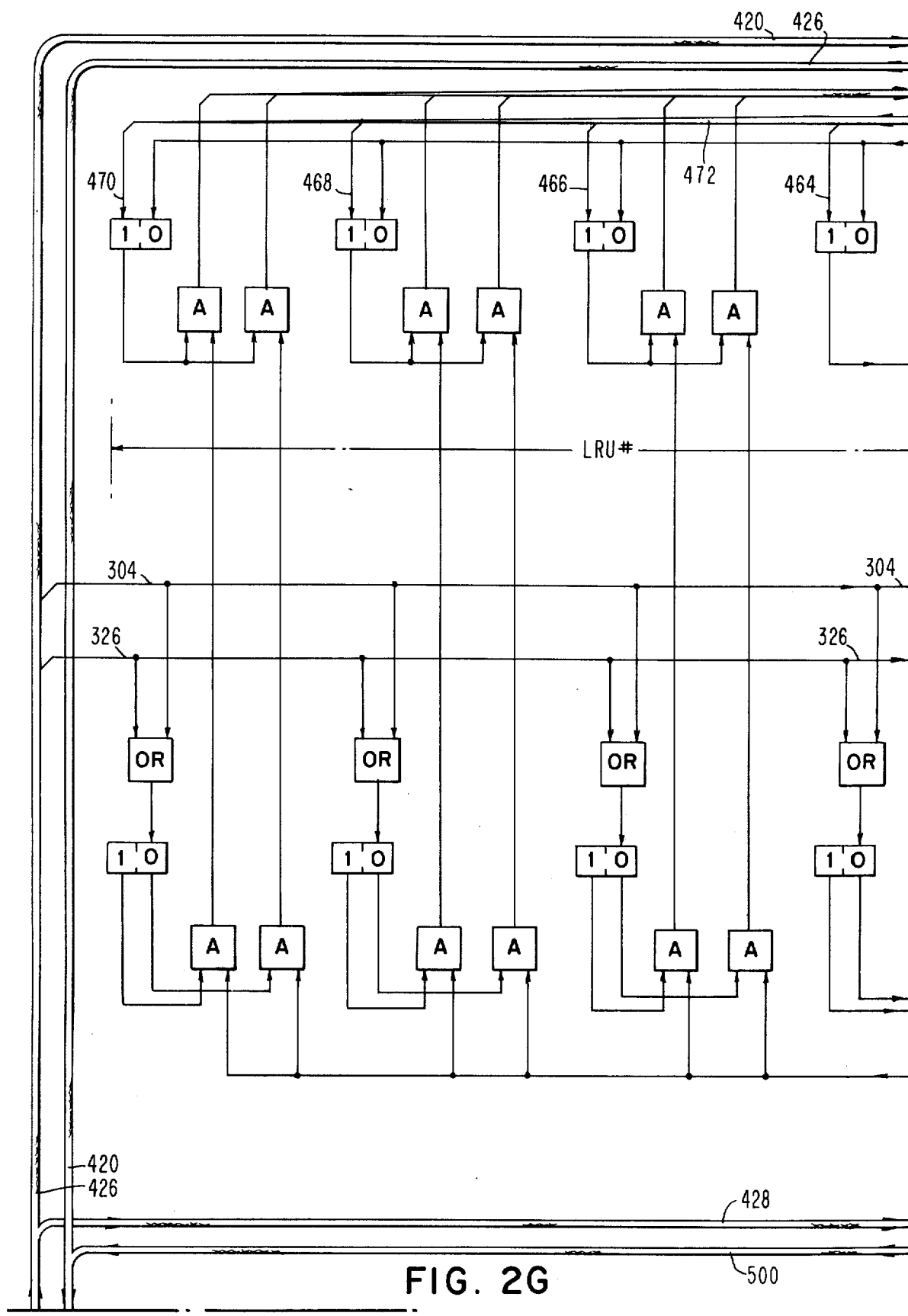
Figure 2H:
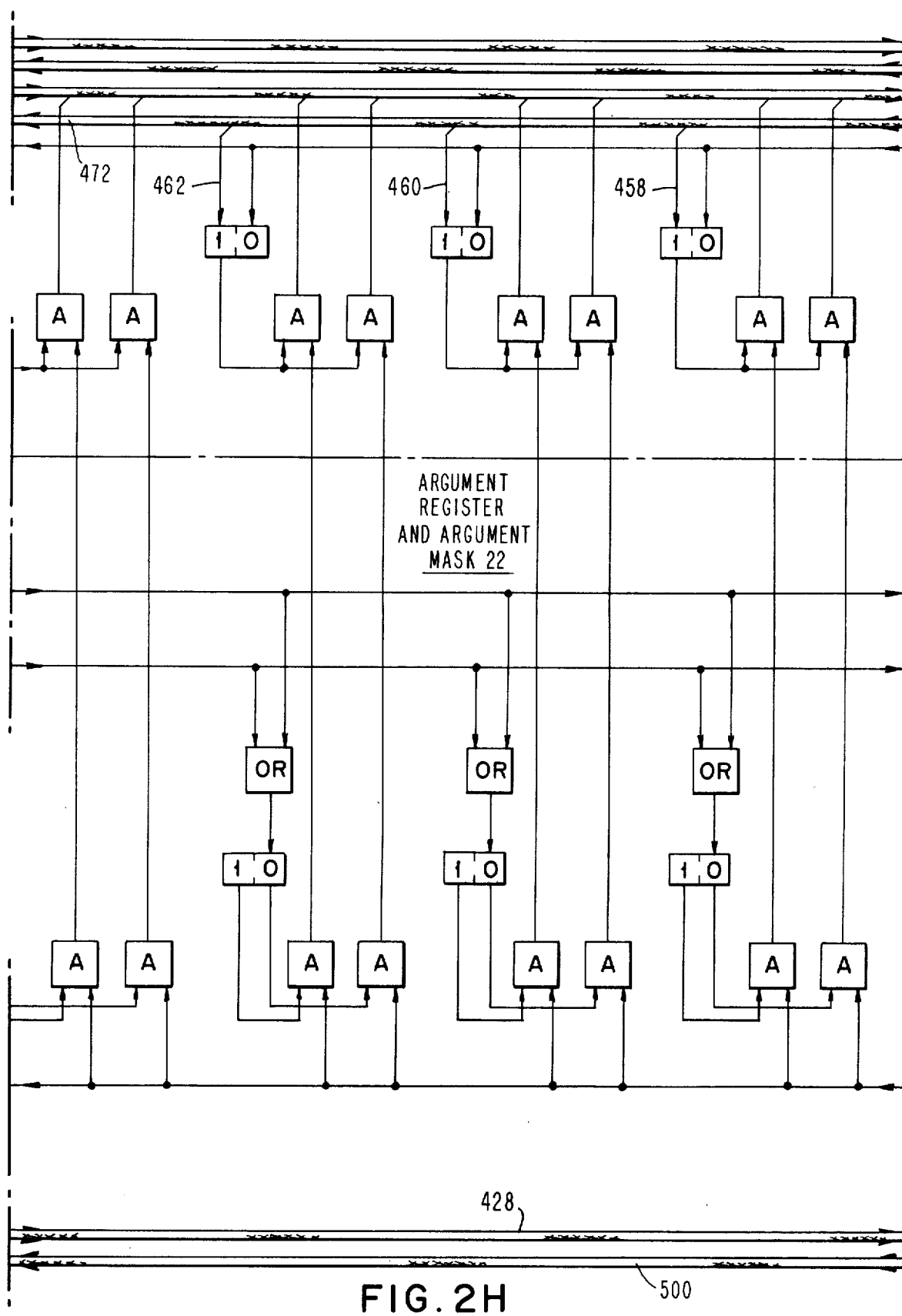
Figure 2I:
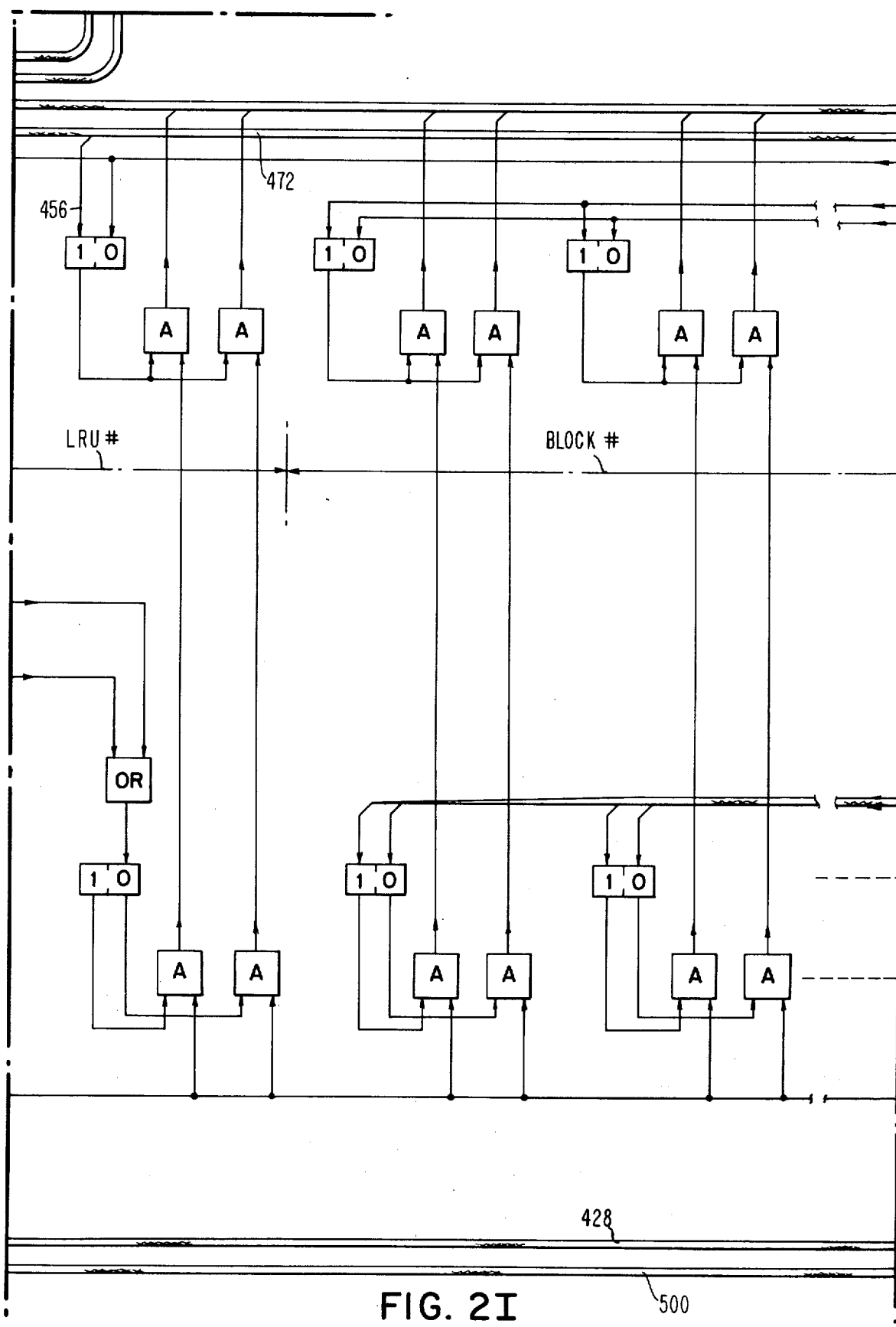
Figure 2J:
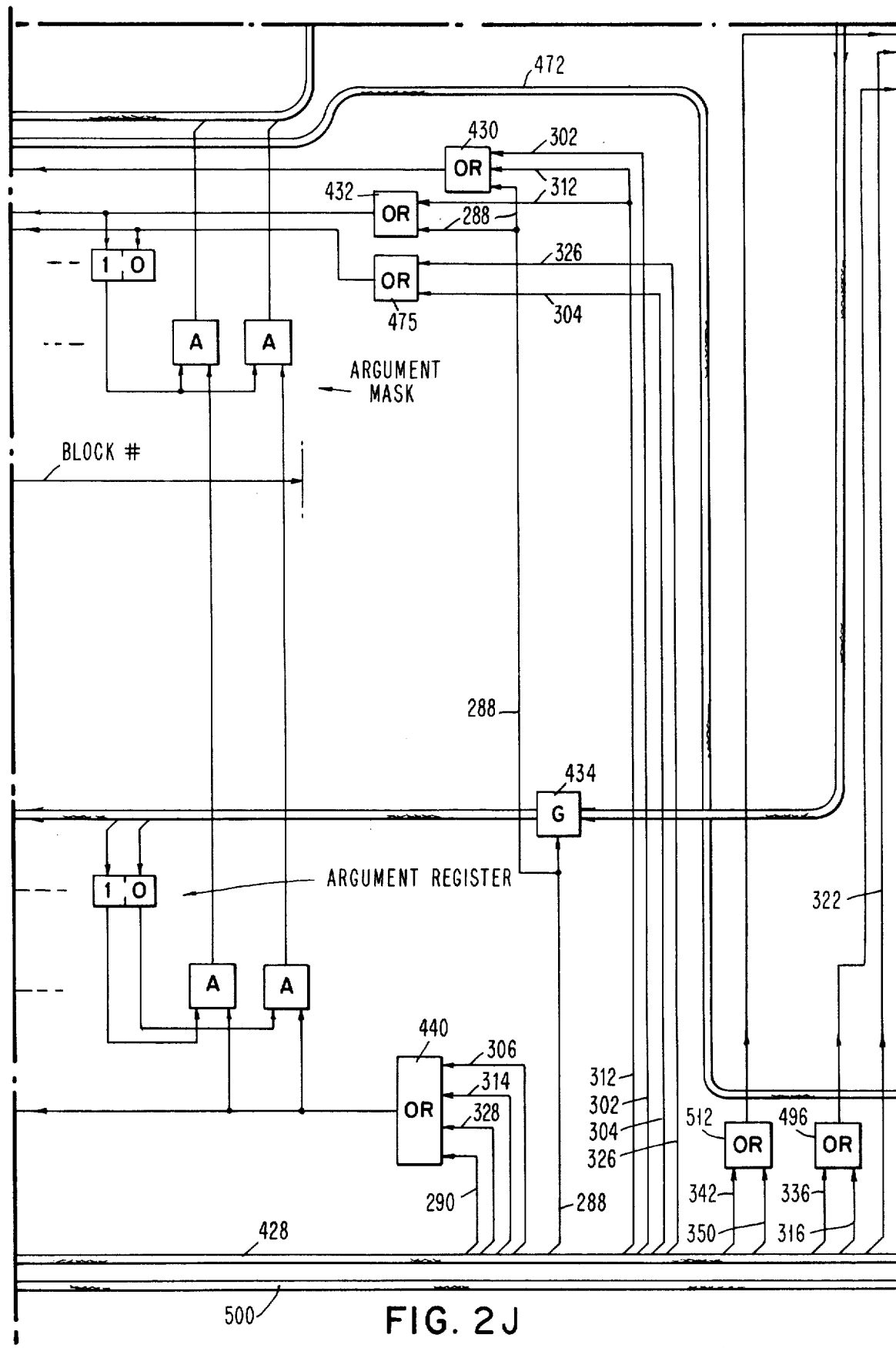

The invention is employed in conjunction with data processing apparatus and accordingly there is provided a CPU 10 (FIG. 2A), a large capacity secondary store 12 (FIG. 2B) and a high speed low-capacity primary store 14 (FIG. 2A). Secondary store 12 which may be a disk file, for example, is connected to primary store 14 through a channel 20 (FIG. 2B). Channel 20 includes a variety of controls and may, for example, be a channel such as provided in the computers manufactured by the IBM Corporation and designated numbers 360 and 370. Channel controls 20 is the type of device which, in addition to its other capabilities can perform required buffering and control functions. Channel 20 accepts serially applied informaton from secondary store 12, assembles the bits into words, and applies these words in parallel to primary store 14. Channel 20 is also capable of accepting words in parallel from primary store 14 and of applying the bits thereof serially to secondary store 12. Channel 20 also suitably contains control circitry for implementing the addresses from which informaton is being taken or to which information is being applied and for indicating when the transfer of a block of information has been completed.

Figure 2K:
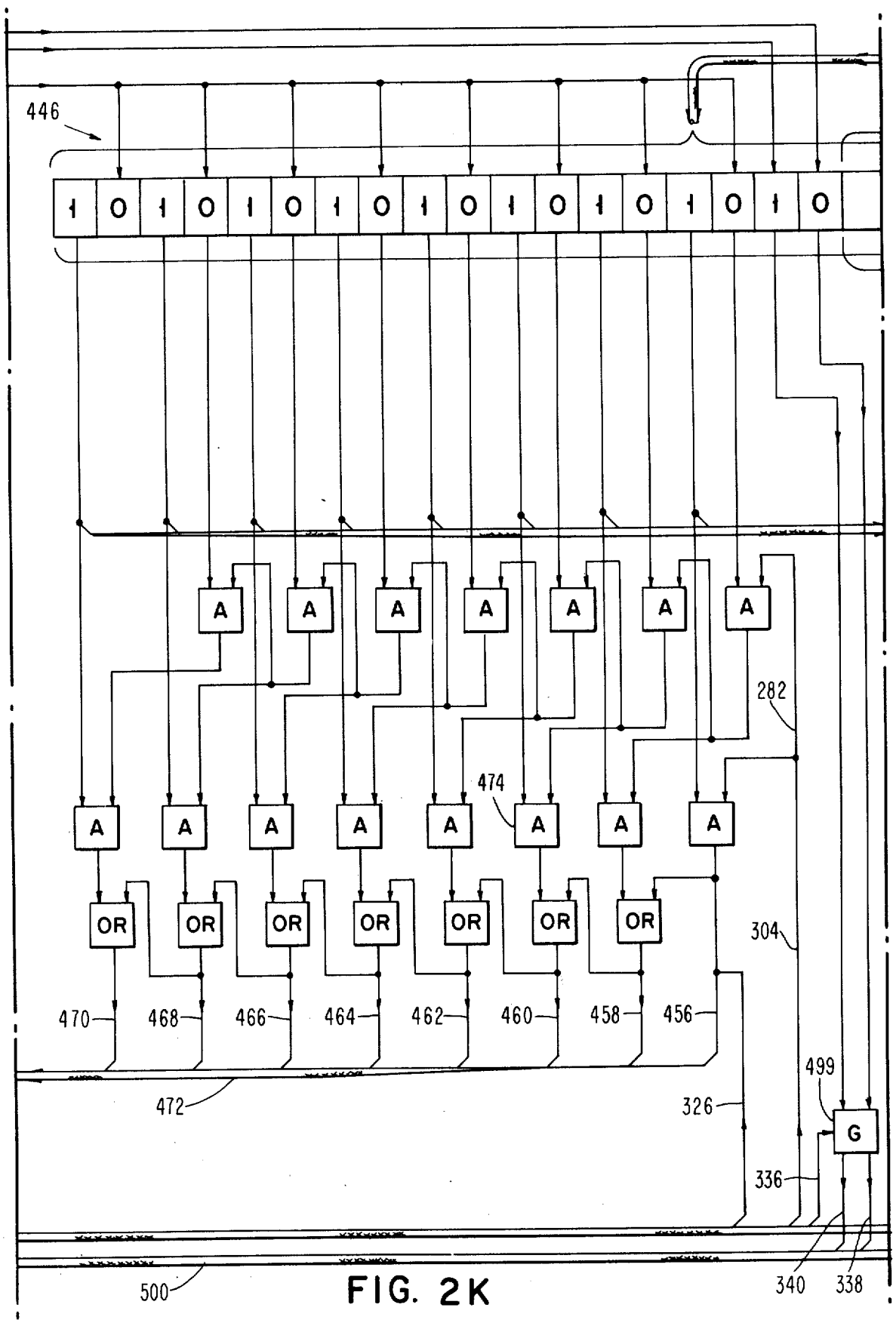
Figure 2L:
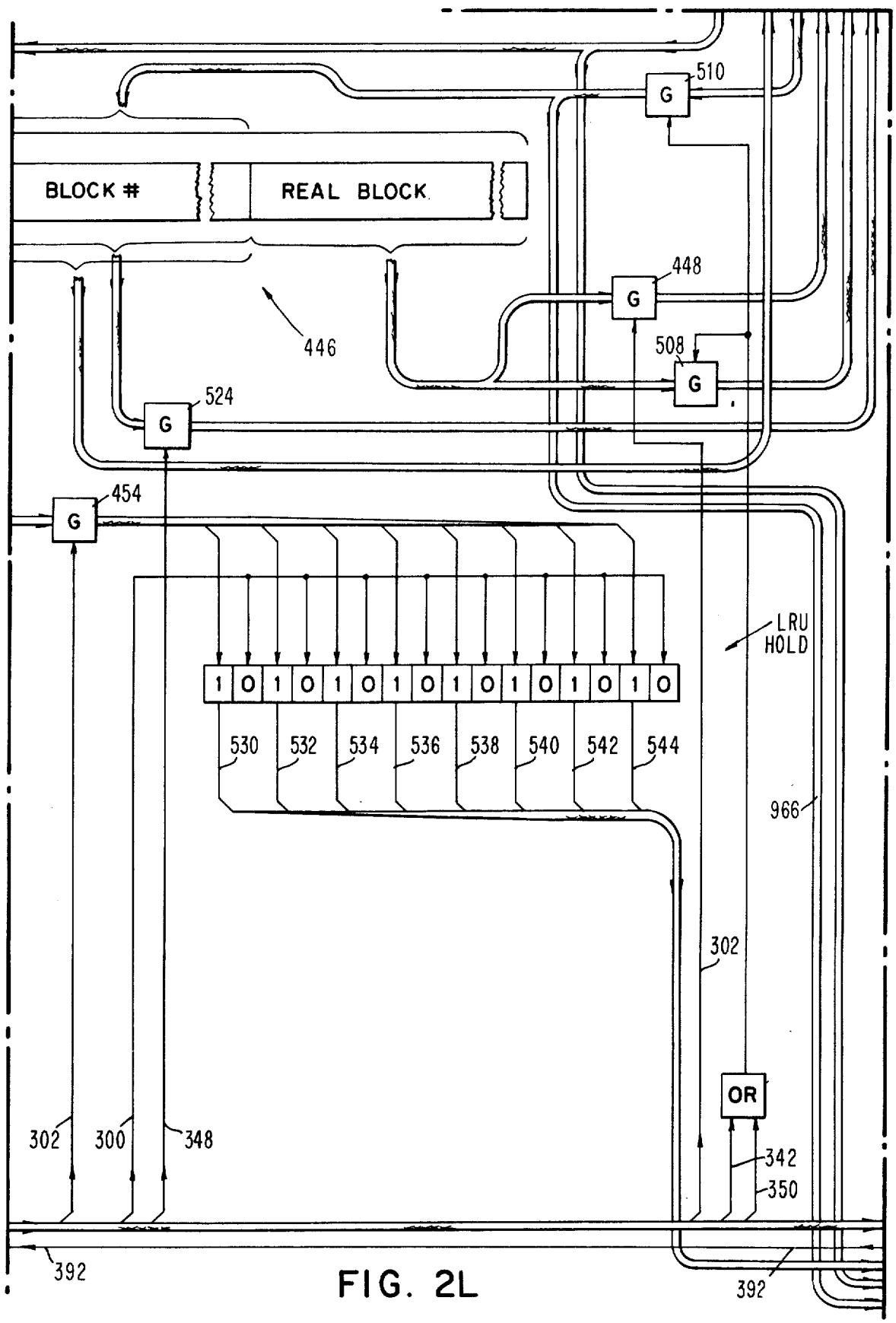

An associative memory, generally designated by the numeral 16 is provided (FIGS. 2E and 2F) which has an entry for each of the block positins in primary store 14. Each of these entries contains five fields which as will be further explained hereinbelow are illustrated in memory data register 446 (FIGS. 2K and 2L). These fields from left to right are a one bit A field (alteration field) which is set when the corresponding block in primary store 14 has its contents altered; a one bit R (reference) field which is set each time a corresponding block in primary store 14 is utilized and is reset when all of the enteries in associative memory 16 have their R field set; and ID field which identifies a program in CPU 10 in which the block in the associated position in primary store 14 is associated with; the block address in secondary store 12 for the block in the corresponding block position in primary store 14; and the block address in primary store 14 for which the entry corresponds. The right-most field of each entry in associative memory 16 may be read only. The other fields in associative memory 16 are altered from time to time.

Referring to FIGS. 2E and 2F where there is shown the associative memory, those elements designated by the numeral 412 may suitably be the same as those disclosed in FIG. 5 of U.S. Pat. No. 3,317,898 to H. Hellerman for "Memory System," issued May 2, 1967, and assigned to the assignee of this invention, i.e., the IBM Corporation. Those elements designated with the numeral 412 for associative memory read/write storage elements, the memory elements designated with the numeral 414 and associative memory 16 may also suitably be units such as depicted in FIG. 5 of the above-referred to Hellerman patent but need not contain the associative feature. This is because they are utilized merely as read and write storage elements. The memory elements in associative memory 16 designated with the numeral 416 may suitably be the same as those disclosed in FIG. 8 of the above referred to Hellerman U.S. Pat. No. 3,317,898.

Continuing further with the description of FIG. 2, that portion contained in FIGS. 2G to 2J constitute the argument register and argument mask 22. The circuitry controls associated with associative memory data register 446 are generally found in FIGS. 2J to 2L. That portion of associative memory 16, legended LRU field constitutes the LRU box, the LRU (least recently used) criterion being employed in the embodiment. The remainder of associative memory 16 in FIGS. 2E and 2F may suitably be termed the "mapping device"

Figure 2M:
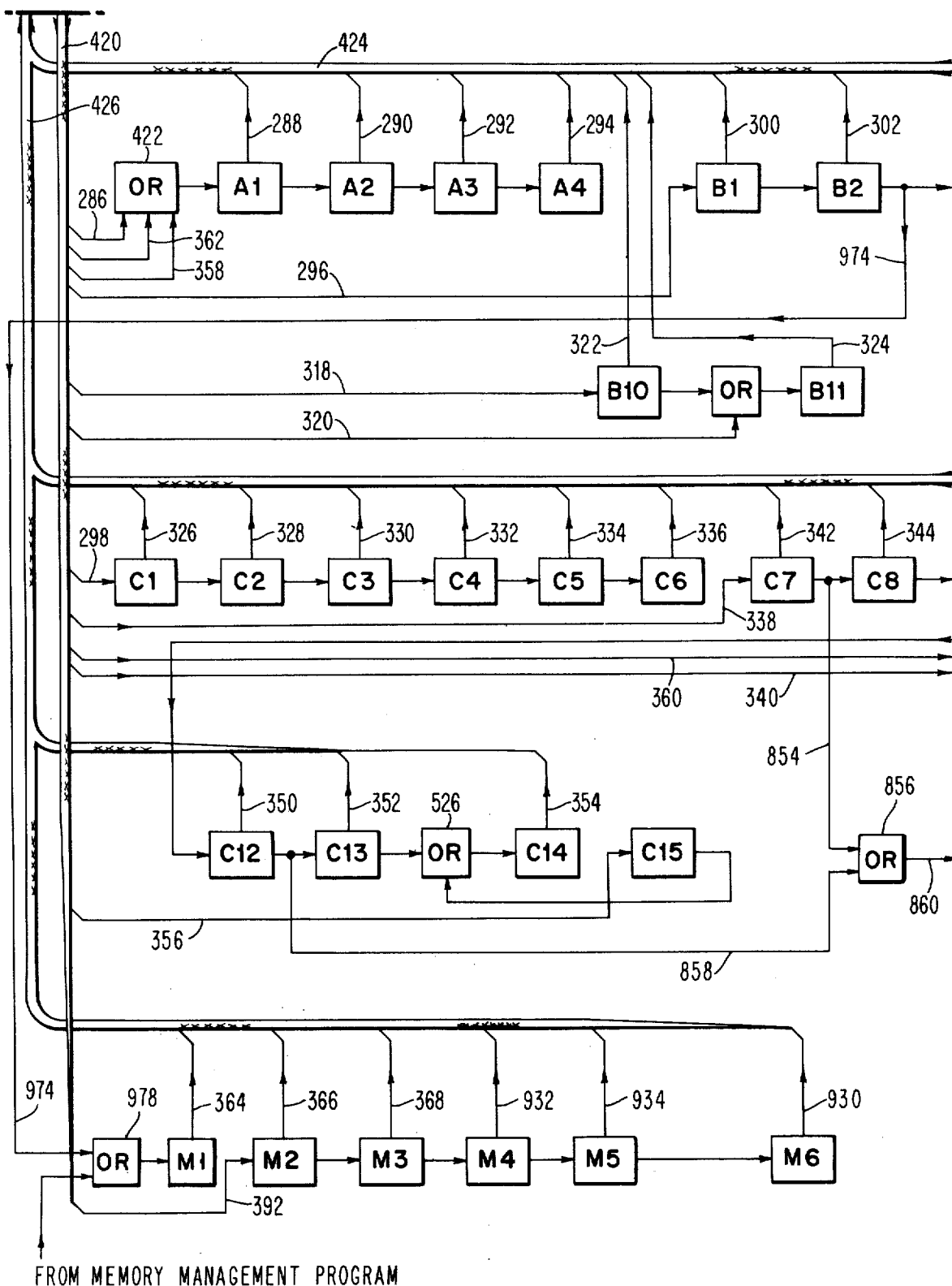
Figure 2N:
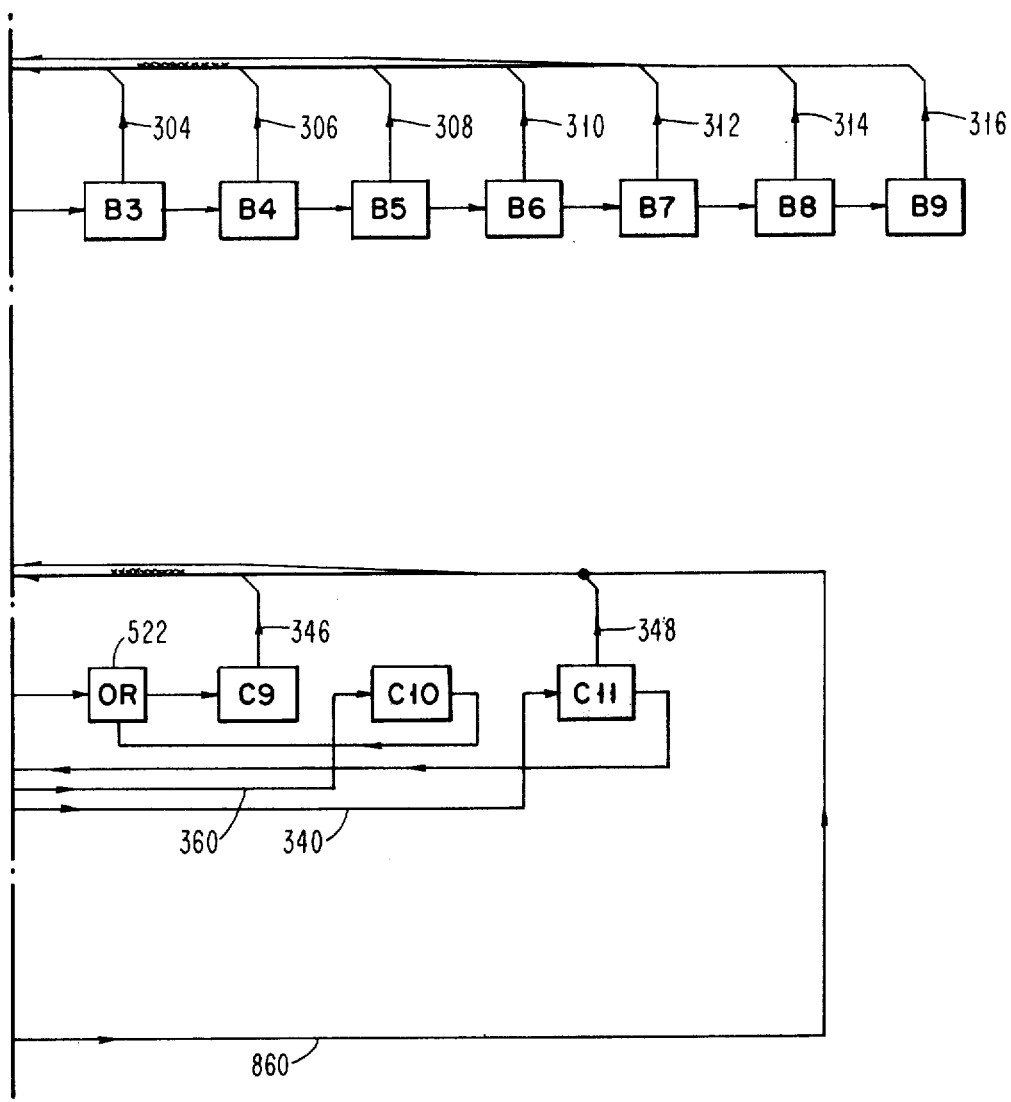
Figure 20:
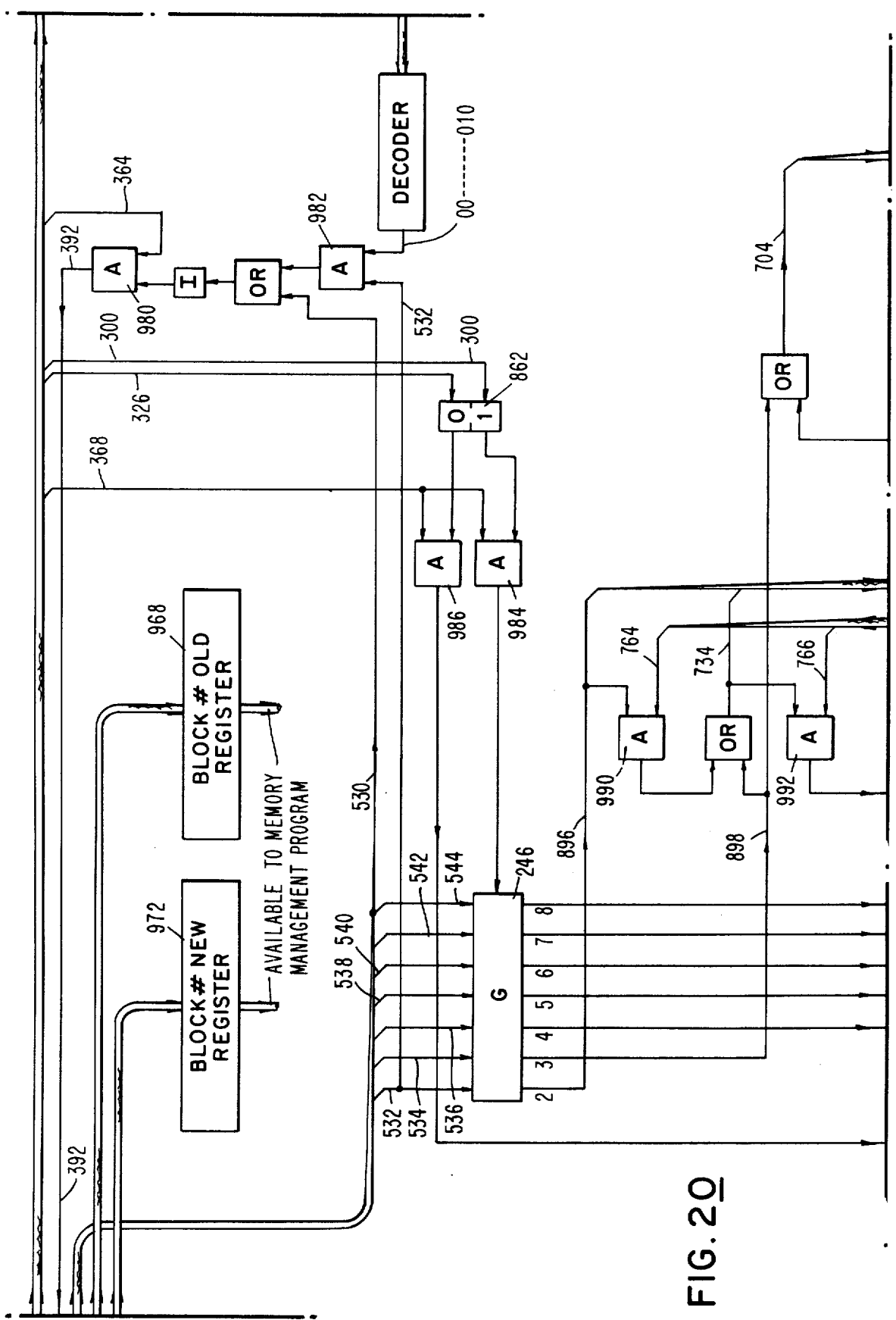
Figure 2Q:
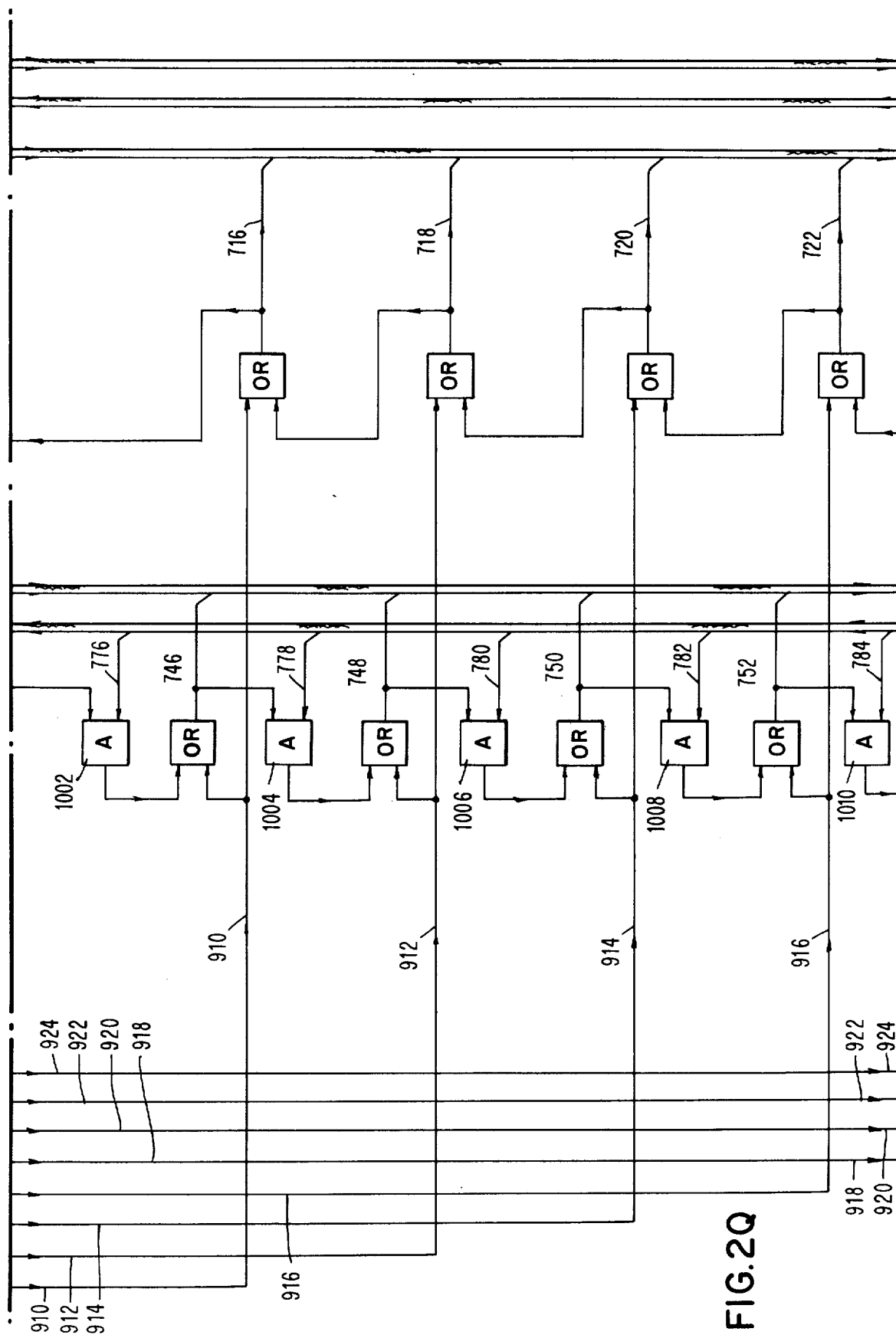
Figure 2R:
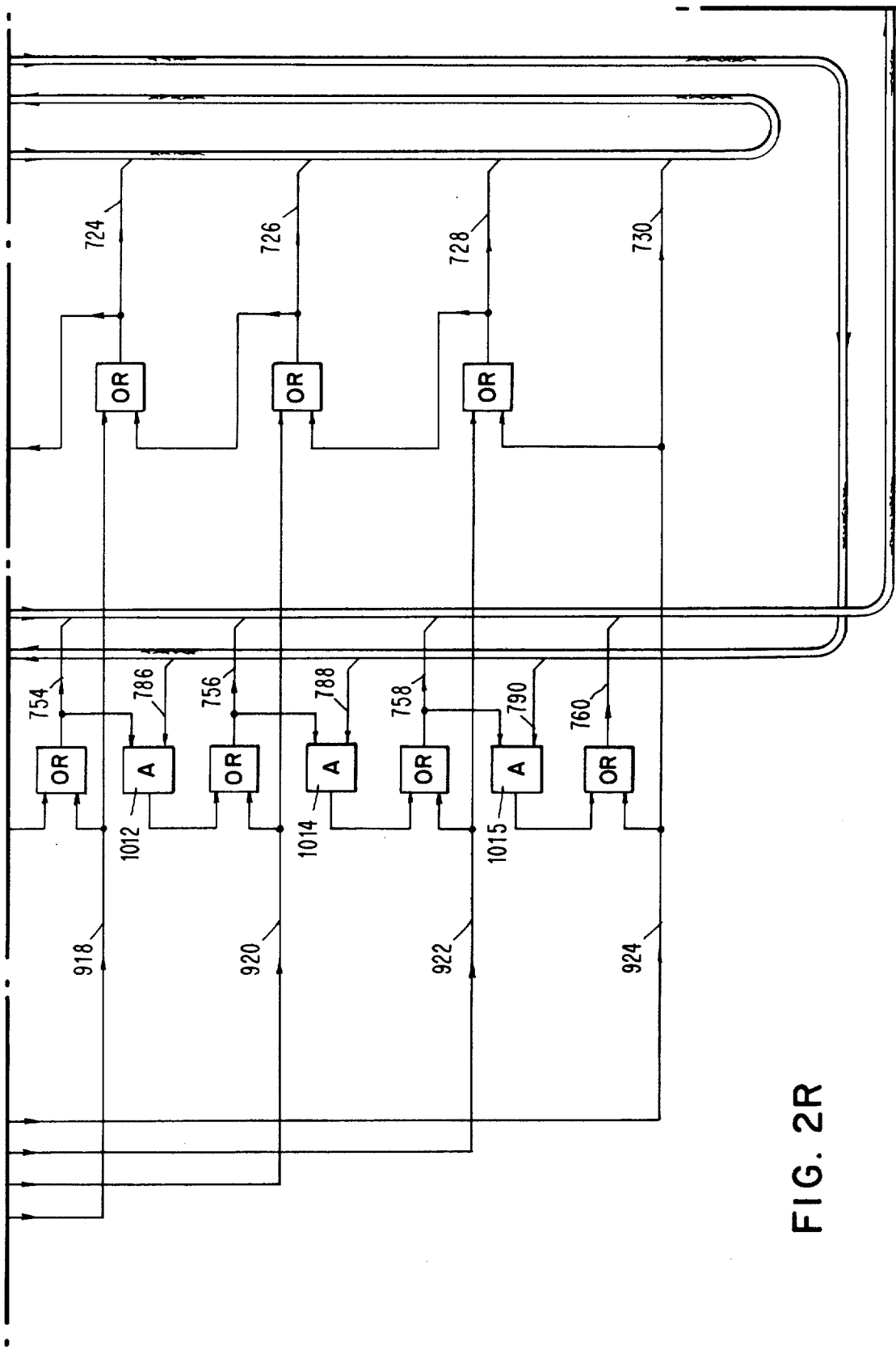

The circuitry contained in FIGS. 2M and 2N, i.e., pulse generator 24, is the clock which controls the system according to the invention. This generator comprises a plurality of monostable multivibrators which generate respective signals when they are "set," i.e., "on." When a monostable multivibrator is switched from its set to its "reset," i.e., "off" state, i.e., when the monostable multivibrator "times out," it generates another signal generally. As will become apparent hereinbelow, it is the "set" signal which is utilized in the time and control of the system. However, the signal which is generated upon the "timing out" of a monostable multivibrator may also be used. In FIGS. 2O to 2z, there is depicted the "MIN" box, i.e., the MMC stack which effects the "MIN," i.e., the M-operator operation as described hereinabove. The MIN box receives its inputs from the "LRU" number as provided from the circuitry shown in FIGS. 2A to 2L and also from pulse generator 24. In the embodiment in FIG. 2, there is utilized as an example a MIN box which comprises 15 registers designated 936, 938, 940, 944, 946, 948, 950, 952, 954, 956, 958, 960, 962 and 964. These registers and their associated circuitry are capable of performing the binary sort technique as disclosed in U.S. Pat. No. 3,191,156, R. I. Roth for "Random Memory with Ordered Readout," June 22, 1965, assigned to the IBM Corporation. These registers are also capable of being selectively shifted as disclosed in the patent application of R. I. Roth for "Selective Shift Register," filed June 2, 1972, Ser. No. 258,968 and also assigned to the IBM Corporation.

In considering the operation of the system shown in FIG. 2 when CPU 10 requests a memory access, it loads a register 418 and concurrently provides a pulse on a line 286. Line 286 terminates in a cable 420 and the pulse thereon is applied to an OR circuit 422 which sets monostable multivibrator A1 (FIG. 2M) to provide the set signal on line 288. Line 288 terminates in cable 424 whereby the latter signal is conveyed to pass through an OR circuit 430, the signal emerging from OR circuit 430 setting the flip-flops constituting the "LRU" field of argument mask 22 to all binary 0's. The set signal for monostable multivibrator A1 on line 288 also is applied to an OR circuit 432, the output of OR circuit 432 in this situtation setting those flip-flops constituting the "BLOCK NUMBER" of the argument mask to all binary 1's. The signal on line 228 is also applied to a gate 434 to effect the gating of the "BLOCK NUMBER" from register 418 (FIG. 2A) to the "BLOCK NUMBER" field of the argument register in FIGS. 2G to 2J. Finally, the signal on line 288 is also conveyed via cable 424 and then cable 436 to an OR circuit 438 (FIG. 2C) to set the match indicators (FIGS. 2C and 2D) in associative memory controls 18 to their 1 states. The signal on line 288 also resets the EOL (end-of-line) flip-flop to its . state.

When monostable multivibrator A1 goes "Off," i.e., times out, a signal is produced which sets monostable multivibrator A2, the latter signal appearing on a line 290. Line 290 terminates in cable 424 and the signal on line 290 is conveyed via cables 424, 426 and 428 to an OR circuit 440 whereby the consequent output of OR circuit 440 is the associate pulse. It is to be realized that, at this juncture, it is desired to associate on the "BLOCK NUMBER" to ascertain whether this block number is in the associative memory. As is well known and as is explained in the above referred to patent to H. Hellerman, the match indicator flip-flops shown in FIGS. 2C and 2D are switched to their reset state for each word where a mismatch occurs and only in the case of a match does a match indicator flip-flop remain in its 1, i.e., set state.

When monostable multivibrator A2 goes "off," i.e., times out, a signal is produced which sets monostable multivibrator A3 to produce its set signal on a line 292. Line 292 terminates in cable 424 and the set signal from monostable multivibrator A3 is conveyed via cables 424, 426 and 428 to interrogate the match indicator flip-flops, i.e., to ascertain whether they are in their set or reset states. In the event that all of the match indicator flip-flops are in their reset states, than the EOL flip-flop is set to its 1 state signifying that no match exists in the associative memory. However, if the EOL flip-flop is not switched to its set state by the signal from monostable multivibrator A3, this signifies that their is a match in the associative memory.

When monostable multivibrator A3 goes "off," a signal is produced which turns "on" monostable multivibrator A4 to thereby produce its set signal on line 294. Line 294 terminates in cable 424 and the signal present thereon is conveyed via cables 424 and 426 to be applied to a gate 442 (FIG. 2C) to enable the testing for the state of the EOL flip-flop. If the EOL flip-flop is in its 1 state, a pulse appears on line 298. However, if the EOL flip-flop is in its 0 state, than a pulse appears on line 296. Lines 298 and 296 both terminate in cable 420. The pulse on line 296 is employed in turn "on" the monostable multivibrator B1. A pulse on line 298 is employed to turn "on" the monostable multivibrator C1 in pulse generator 24. For convenience of explanation, in the description of the system depicted in FIG. 2, it is assumed that a match exists in the associative memory and, accordingly there is described the events which ensue when the pulse appears on line 296.

Thus, when monostable multivibrator B1 is turned "on" to provide its set signal on a line 300, this signal is conveyed via cables 424, 426 and 436 to an OR circuit 444. At this point, the output of OR circuit 444 effects the reading of the matching word in the associative memory to the memory data register 446 (FIGS. 2K and 2L).

It is to be noted that the "BLOCK NUMBER" portion of the word in associative memory 16 is read via cable 966 to register 968. However, no use is made of register 968 when the "BLOCK NUMBER" which is called for is in the associative memory.

A signal on line 300 is employed to set flip-flop 862 to its 1 state, as will be further understood hereinbelow, in connection with the M clock pulses, that such setting is necessary when the "BLOCK NUMBER" which is called for is in the associative memory in order to obtain the LRU number from the "LRU hold" register (FIG. 2L). The signal on line 300 is also conveyed via cables 424, 426 and 428 to reset the LRU hold register to its all zero state.

When monostable multivibrator B1 turns "off," a signal is produced which turns "on" a monostable multivibrator B2, the set signal produced thereby appearing on a line 302 which terminates in cable 424. The signal on line 302 is conveyed via cables 424, 426 and 428 to actuate a gate 448 (FIG. 2L) to gate the "real block" from register 446 to the left portion of register 450 (FIG. 2A). The signal on line 302 is also conveyed via cables 424 and 426 to be applied to a gate 452 (FIG. 2A) to effect the gating of the "address in block" from register 418 to the right portion of register 450. The signal on line 302 is also conveyed via cables 424, 426 and 428 to an OR circuit 430 (FIG. 2J) to effect the resetting of the LRU field of the argument mask to all zeros. The signal on line 302 is also applied to a gate 454 (FIG. 2L) to gate the LRU number to the LRU hold register. As will become further apparent hereinbelow, because the LRU number is now in the LRU hold register (FIG. 2L), such LRU number can now be used as an input to the MIN box and its sequence can proceed in parallel with that of the mapping device. Accordingly, when monostable multivibrator B2 turns "off," the signal produced thereby turns "on" a monostable multivibrator B3 and a monostable multivibrator M1. The operation of the monostable multivibrators designated M will be described further hereinbelow.

When monostable multivibrator B3 is turned "on," the set signal appearing on line 304 which terminates in cable 424, is conveyed via cables 424, 426, and 436 to OR circuit 438, the output of OR circuit 438 at this juncture effecting the setting of the match indicator flip-flops to their 1 states. The signal on line 304 is also applied via cables 424 and 428 and line 304 to line 282. At this juncture, it is to be noted that the leftmost eight bits of the memory data register 446 are reserved for the LRU number. The latter is represented by a 1 out of 8 number. For example, an LRU number of 1 would be represented by 10000000. The number 2 would be represented by 01000000, etc. up to the number 8 which would be represented as 00000001.

It is to be noted in FIG. 2K that the top row of AND circuits directly to the left of line 282 are enabled from the 0 side of each of the eight flip-flops in the LRU number. The bottom row of AND circuits directly to the left of line 282 are enabled from the 1 sides of these flip-flops. It is apparent that a pulse on line 282 will propagate to the left until the first 1 is encountered and, at this juncture, the circuit will extend downwardly on one of the lines in the group designated 456, 458, 460, 462, 464, 466, 468 and 470. For example, if the LRU number were to be 6, AND circuit 474 would be enabled and a pulse would appear on line 460. Because of the OR circuits at the left of line 460, all of lines 426, 464, 466, 468 and 470 would be activated. The active states of the latter lines would be activated. The active states of the latter lines would be conveyed via cable 472 to set the six left-most flip-flop of the argument mask (FIGS. 2G and 2H) to 1.

The pulse on line 304 passes through OR circuit 475 to reset the "BLOCK NUMBER" field of the argument mask to all 0's. The pulse on line 304 is also operative to reset the LRU field of the argument register to all 0's (FIGS. 2G, 2H and 2I).

When monostable multivibrator B3 goes "off," a signal is produced thereby on line 306, such signal being conveyed via cables 424, 426 and 428 to an OR circuit 440 (FIG. 2J), the output of OR circuit 440 being the associate pulse.

The association pulse effects the resetting of the match indicators for all words in the associative memory which have LRU numbers equal to or less than the LRU number in data register 446. This operation is performed at this juncture because all of the LRU numbers have to next be incremented. In this connection, it is to be noted that shift pulses which are applied (FIGS. 2C and 2D) are enabled by the reset state of the match indicator flip-flops. The shifting operation occurs with memory elements 406, 408 and 410.

Figure 3A:
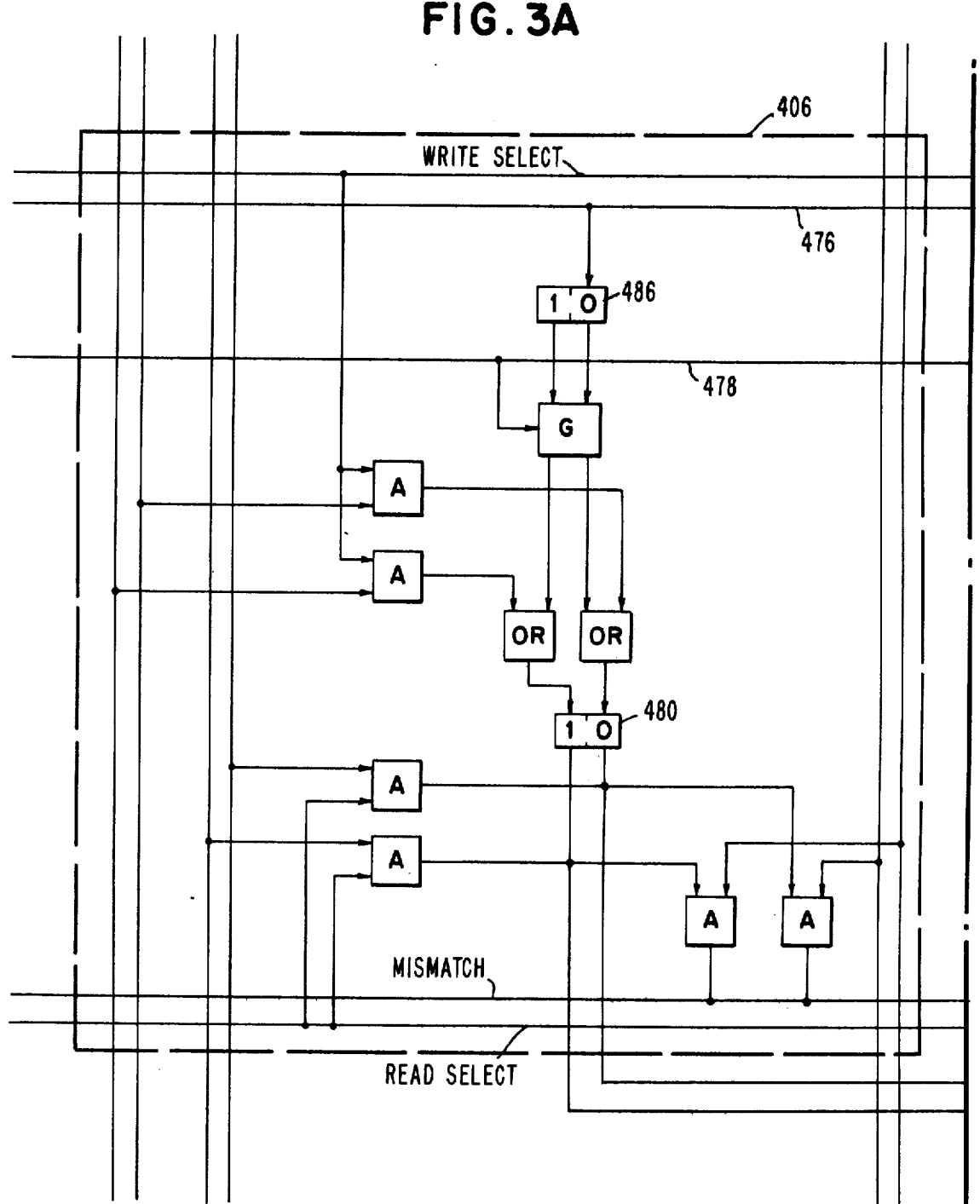
FIGS. 3A to 3D, taken together as in FIG. 3, are illustrative examples of the stages of the LRU stack depicted in FIG. 2.
Figure 3:
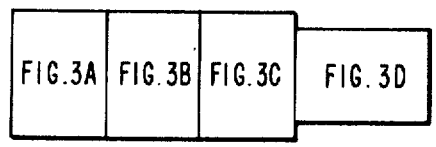
Figure 3C:
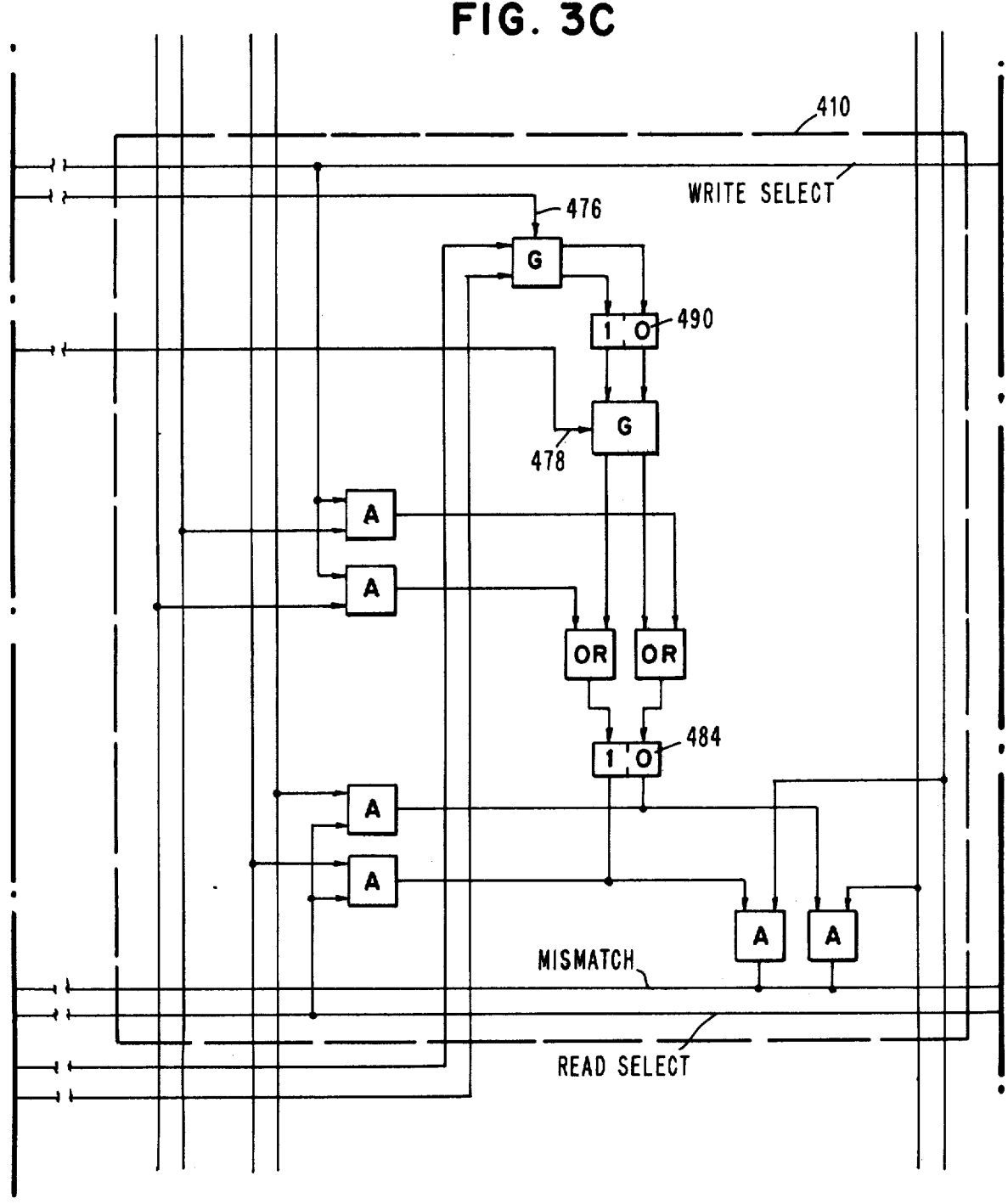
Figure 3D:
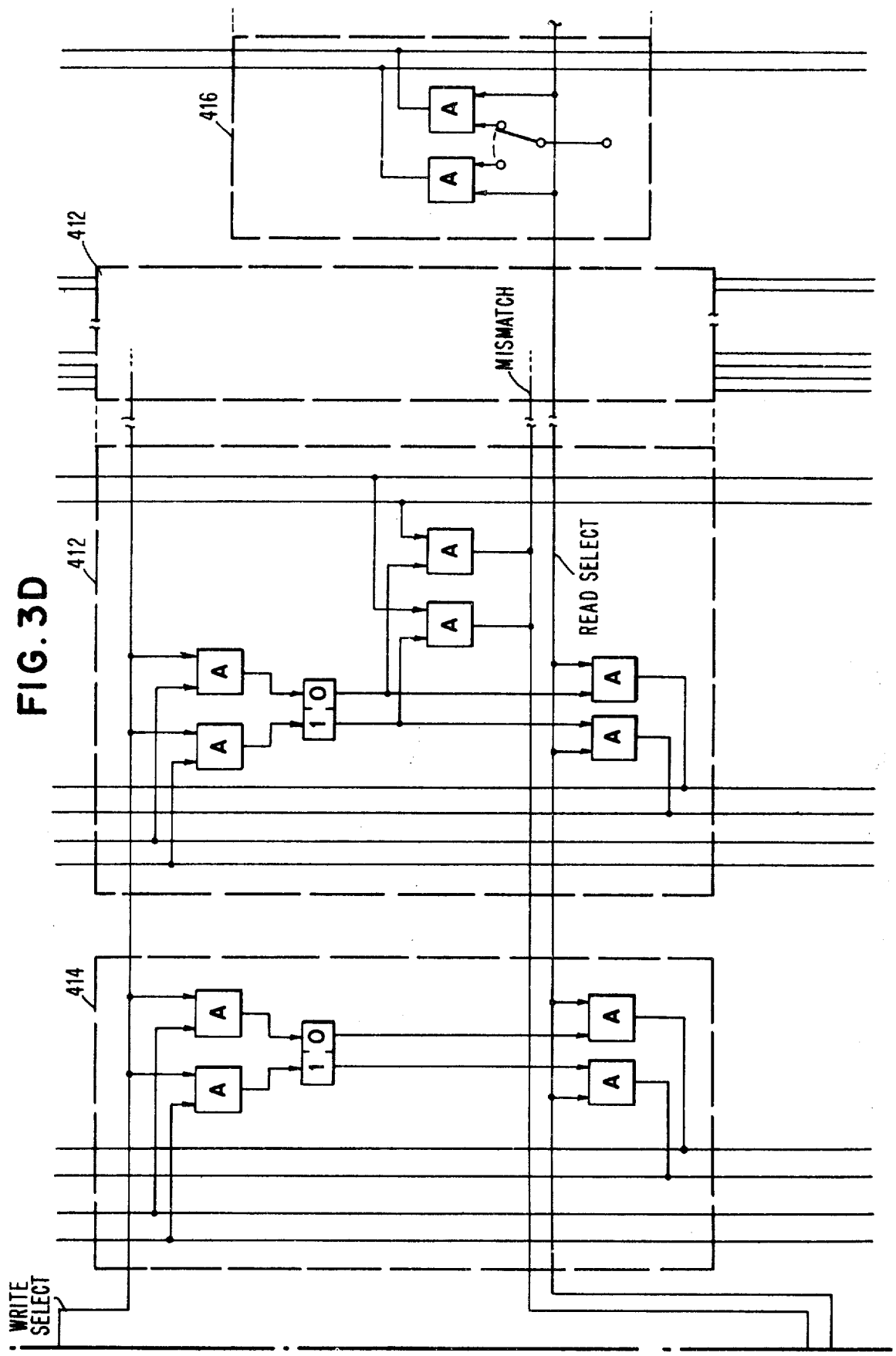

To understand the shifting operation, reference is made to FIGS. 3A, 3B and 3C. In FIG. 3A, there is shown an embodiment memory element 406. In this element, flip-flop 480 is the information bit and flip-flop 486 is provided to inject zeros from the left. The first shift pulse is applied to line 476 which sets flip-flop 486 to its 0 state. In FIG. 3B wherein there is shown a suitable embodiment of a memory element designated by the numeral 408, the information bit is flip-flop 482 and flip-flop 488 is an intermediate flip-flop. This first shift pulse on line 476 gates the contents of flip-flop 480 (FIG. 3A) to flip-flop 488 (FIG. 3B). In FIG. 3C wherein there is shown a suitable example of a memory element designated with the numeral 410, the information bit is flip-flop 484 and flip-flop 490 is an intermediate flip-flop. At the occurrence of this first shift pulse on line 476 there are gated the contents of flip-flop 482 (FIG. 3B) to flip-flop 490 in memory element 410 (FIG. 3C). The second shift pulse now appears on line 478 which in memory element 406 (FIG. 3A) gates the contents of flip-flop 486 to flip-flop 480. Similarly, the second shift pulse on line 478 in memory element 408 (FIG. 3B) gates the contents of flip-flop 488 to flip-flop 482 and in memory element 410 (FIG. 3C), the second shift pulse which is on line 478 gates the contents of flip-flop 490 to flip-flop 484. In this manner, the single 1 in the LRU number is shifted one position to the right. It is to be noted that a 0 is always entered into the leftmost position.

When monostable multivibrator B4 goes "off," a signal is produced which turns "on" monostable multivibrator B5, this "on" signal appearing on line 308 which terminates in cable 424. The signal on line 308 is conveyed via cables 424, 426 and 436 to OR circuit 492, the output at this juncture from OR circuit 492 being the first shift pulse.

When monostable multivibrator B5 goes "off," the signal produced thereby turns "on" monostable multivibrator B6 to produce a signal on wire 310 which is conveyed via cables 424, 426 and 436 to an OR circuit 494, the output of OR circuit 494 at this point being the second shift pulse.

When monostable multivibrator B6 turns "off," the monostable multivibrator B7 is turned "on" to produce a signal on line 312, this signal being conveyed via cables 424, 426 and 436 to an OR circuit 438, the output of OR circuit 438 setting the match indicator flip-flops to their 1 states. The signal on line 312 also is applied to an OR circuit 430, the output of OR circuit 430 being operative to reset the LRU field of the argument mask to all zeros. Finally, the signal on line 312 is applied to OR circuit 432, the output of OR circuit 432 setting the "BLOCK NUMBER" field of the argument mask to all ones.

When monostable multivibrator B7 goes "off," the resulting signal produced thereby turns "on" a monostable multivibrator B8 to produce a signal on line 314, the signal on line 314 being conveyed via cables 424, 426 and 428 to an OR circuit 440 (FIG. 2J) to produce the associate pulse. The purpose of the association at this time is to reset all match indicators except the one which is associated with the word in the associative memory which contains the same block number as the block number in register 446. This same block number concurrently exists in the argument register.

When monostable multivibrator B8 goes "off," a monostable multivibrator B9 is turned "on" to produce a signal on line 316 which is conveyed via cable 428 to an OR circuit 496, the output of OR circuit 496 setting the LRU field of register 446 to 10000000. It is to be noted that, when CPU 10 requests a memory access, it also furnishes information as to whether the block is to be altered. Such information furnishing takes the form of effecting the setting of the alteration flip-flop (FIG. 2A) to its 1 state if the block is to be altered or setting the alteration flip-flop to its 0 state if the block is not to be altered. A signal on line 316, produced during the "on" time of monostable multivibrator B9, is also applied to gate 498 (FIG. 2A), to ascertain the state of the alteration flip-flop. If the latter flip-flop is in its 1 state, a pulse appears on line 318. However, if the alteration flip-flop is in its 0 state, then a pulse appears on line 320. Lines 318 and 320 terminate in cable 420. A pulse on line 318 is employed to turn "on" monostable multivibrator B10 and the pulse on line 320 is employed to turn "on" monostable multivibrator B11.

If it is necessary to set the A bit of register 446 to its 1 state, a pulse on line 332 accomplishes that purpose. The pulse on line 324 is applied to an OR circuit 498, the output of OR circuit 498 at this juncture effecting the writing of the contents of register 446 back into the associative memory.

Up to this point in the description of the embodiment of the invention, there has been illustrated the operation of the mapping device and the LRU box when the block number which is called for is in the associative memory. As has been mentioned, the LRU number of the selected word is always set to 1 and the LRU numbers which are less that the selected word in the associative memory are incremented by 1.

There now follows a description of the operation of the mapping device and the LRU box when the desired block number is not in the associative memory. In this situation, a page exception occurs which is detected by the signal on line 294, the latter signal being employed to test for the state of the EOL flip-flop. The set, i.e., 1 state of the EOL flip-flop causes a signal to appear on a line 298, such signal turning "on" monostable multivibrator C1. The set state of monostable multivibrator C1 produces a signal on line 326 and hence on line 456. Because of the operation of the series connected OR circuits, the set signal of monostable multivibrator C1 also appears on lines 458, 460, 462, 464, 466, 468 and 470 and is operative to set the LRU field of the argument mask (FIGS. 2G to 2J) to all 1's. The signal on line 326 also is applied to OR circuit 475 and is operative to reset the "BLOCK NUMBER" field of the argument mask to all 0's. In addition, the signal on line 326 effects the setting of the LRU field of the argument register to 00000001. Further, the signal on line 326 is applied to an OR circuit 438, the consequent output of OR circuit 438 effecting the setting of the match indicator flip-flops to their 1 states. At this juncture, the circuits are now set up to associate on an LRU number of eight because this is the word in the associative memory that must be replaced with a new block.

The signal on line 326 is also employed to set a flip-flop 862 to its 0 state. Such setting is necessary in the case of the occurrence of a page exception because the LRU number has to be taken from register 970.

When monostable multivibrator C1 goes "off," the signal consequently produced thereby turns on a monostable multivibrator C2 to produce a signal on line 328. The signal on line 328 is applied to an OR circuit 440, the consequent output of OR circuit 440 functioning as the associate pulse. The result of the association effected by the latter associate pulse is to reset all of the match indicators in the associative memory with the exception of that match indicator which is associated with the word having the LRU value of eight. It now becomes necessary to increment LRU numbers which have values less than eight.

When monostable multivibrator C2 goes "off," the consequent signal produced thereby turns "on" a monostable multivibrator C3 to produce a signal on line 330. The signal on line 330 is applied to an OR circuit 492 (FIG. 2C), the consequent output of OR circuit 492 being operative as a first shift pulse.

When monostable multivibrator C3 goes "off," the consequent signal produced thereby turns "on" a monostable multivibrator C4 to produce a signal on a line 332. The signal on line 332 is applied to an OR circuit 494 (FIG. 2D), the consequent output of OR circuit 494 functioning as the second shift pulse.

When monostable multivibrator C4 goes "off," the signal produced thereby turns "on" a monostable multivibrator C5 to produce a signal on line 334. The signal on line 334 is applied to an OR circuit 444, the consequent output of OR circuit 444 effecting the reading of the matching word from the associative memory to data register 446.

As has been explained hereinabove, the "BLOCK NUMBER" portion of this word is read into register 968.

When monostable multivibrator C5 goes "off," the signal produced thereby turns "on" a monostable multivibrator C6 to produce a signal on line 336. The signal on line 336 is applied to an OR circuit 496 (FIG. 2J), the consequent output of OR circuit 496 being operative to set the LRU section of register 446 to 10000000. In addition, the signal on line 336 is applied to a gate 499 (FIG. 2K) to effect the testing of the state of the A bit in register 446. If this test ascertains that the A bit is equal to 1, a signal appears on line 340. However, if the A bit is equal to 0, a signal appears on line 338. Lines 338 and 340 terminate in cables 500 and 420. The signal on line 338 is employed to turn "on" a monostable multivibrator C7 and the signal on line 340 is utilized to turn "on" the monostable mutlivibrator C11.

Let it be assumed that the A bit is equal to 0 whereby the signal appears on line 338 to turn "on" the monostable multivibrator C7 to thereby produce a signal on line 342. The signal on line 342 is applied to an OR circuit 502 (FIG. 2A), the output of OR circuit 502 being applied to a gate 504, the actuation of gate 504 thereby effecting the gating of the "BLOCK NUMBER" from register 418 to the "REPLACEMENT ADDRESS REGISTER." The signal on line 342 is also applied to an OR circuit 506 (FIG. 2L), the output of OR circuit 506 being applied to gate 508, the actuation of gate 508 effecting the gating of the contents of the "REAL BLOCK" field of register 446 to the "PRIMARY ADDRESS REGISTER" (FIG. 2B). The signal on line 446 is also applied to a gate 510 (FIG. 2L), the actuation of gate 510 being operative to gate the "BLOCK NUMBER" from register 418 (FIG. 2A) to the "BLOCK NUMBER" field of register 446. This block is also loaded into register 972. Further, the signal on line 342 is applied to an OR circuit 512, the consequent output of OR CIRCUIT 512 effecting the resetting of the A bit of register 446 to 0. In addition, the signal on line 342 is applied to the "replace" input channel controls 20 (FIG. 2B). Finally, the signal on line 446 sets flip-flop 514 (FIG. 2B) to its 1 state.

When monostable multivibrator C7 goes "off," a signal is produced on line 854. The signal on line 854 passes through OR circuit 856 as conveyed by line 860 to cause the CPU 10 to execute the memory management program, as is described hereinbelow. This memory management program effects the updating of the LRU list.

When monostable multivibrator C7 goes "off," a monostable multivibrator C8 is turned "on" to produce a signal on line 344. The signal on line 344 is applied to an OR circuit 498 (FIG. 2D), the consequent output of OR circuit 498 effecting the writing of the contents of data register 446 into the proper location in the associative memory.

When monostable multivibrator C8 goes "off," the signal produced thereby is transmitted through an OR circuit 522 to turn "on" a monostable multivibrator C9 to produce a signal on line 346. The signal on line 346 is applied to a gate 518 (FIG. 2B), the actuation of gate 518 being operative to test for the state of flip-flop 514. In this connection, if flip-flop 514 is in its 1 state, a signal appears on a line 360. However, if flip-flop 514 is in its 0 state, then a signal appears on line 362.

A signal on line 360 is employed to turn "on" a monostable multivibrator C10 and the signal on line 362 is passed through an OR circuit 422 to turn "on" monostable multivibrator A1. The "on" signal from monostable multivibrator C10 is used for delay only and when monostable multivibrator C10 times out, there is produced a signal which passes through an OR circuit 522 to again turn "on" monostable multivibrator C9.

Considering again the situation when gate 499 (FIG. 2C) is actuated by the signal on line 336, if the A flip-flop is in its 1 state at this time, a signal appears on line 340 which turns "on" monostable multivibrator C11 to produce a signal on line 348. The signal on line 348 is applied to a gate 524 (FIG. 2L), the actuation of gate 524 effecting the gating of the contents of the "BLOCK NUMBER" field of data register 446 to the "WRITE ADDRESS REGISTER" (FIG. 2B).

When monostable multivibrator C11 goes "off," the consequent signal produced thereby turns "on" a monostable multivibrator C12 which produces a signal on line 350. The signal on line 350 is applied to an OR circuit 502 (FIG. 2A), the output of OR circuit 502 being applied to a gate 504, the actuation of gate 504 effecting the gating of the "BLOCK NUMBER" from register 418 to the "REPLACEMENT ADDRESS REGISTER". The signal on line 350 is also applied to an OR circuit 506, the consequent output of OR circuit 506 actuating a gate 508, the actuation of gate 508 being operative to gate the "REAL BLOCK" field of register 446 to the "PRIMARY ADDRESS REGISTER" (FIG. 2B). In addition, the signal on line 350 is applied to a gate 510 (FIG. 2L), the actuation of gate 510 effecting the gating of the "BLOCK NUMBER" from register 418 (FIG. 2A) to data register 446 (FIGS. 2K and 2L). The "BLOCK NUMBER" is also loaded into register 972. Further, the signal on line 350 is applied to OR circuit 512, the consequent output of OR circuit 512 being operative to set the A bit of register 446 to its 0 state. The signal on line 350 is also applied to the "REWRITE AND REPLACE" input to channel controls 20 (FIG. 2B). Line 350 also sets flip-flop 516 (FIG. 2B) to its 1 state.

When monostable multivibrator C12 goes "off," a signal is produced on line 858. This signal passes through OR circuit 856 and is conveyed via a line 860 to cause CPU 10 to execute the memory management program. Also, when monostable multivibrator C12 goes "off," the consequent signal produced thereby turns "on" a monostable multivibrator C13 to produce the signal on line 352. The signal on line 352 is applied to OR circuit 498, the output of OR circuit 498 being operative to effect the writing of the contents of data register 446 (FIGS.S. 2K and 2L) into the associative memory.

When a monostable multivibrator C13 goes "off," the signal consequently produced thereby is passed through an OR circuit 526 to turn "on" a monostable multivibrator C14 to produce a signal on line 354. The signal on line 354 is applied to a gate 520 (FIG. 2B), the actuation of gate 520 effecting the testing of the state of flip-flop 516. In this test, if flip-flop 516 is found to be in its 1 state, a signal appears on line 356. However, if flip-flop 516 is in its 0 state, a signal appears on line 358. A signal on line 356 is used to turn "on" a monostable multivibrator C15. A signal on line 358 passes through an OR circuit 422 and is employed to turn "on" monostable multivibrator A1. Monostable multivibrator C15 is employed for delay only and, when it turns "off," a signal is produced which passes through OR circuit 526 and turns "on" monostable multivibrator C14.

FIGS. 3A to 3D, taken together as in FIG. 3, respectively depict suitable embodiments of stages 406, 408, 410, 414, 412 and 416 and illustrate how these stages are interconnected.

There has now been described the operation of the mapping device and the LRU box when a page exception occurs. It is to be noted that in this operation, the control returns to the sequence of signals which is initiated with the turning "on" of monostable multivibrator A1 and this sequence can now be effective since the required block is present at this juncture in primary store. At this juncture, the page causing the page exception is now in primary storage.

Figure 2S:
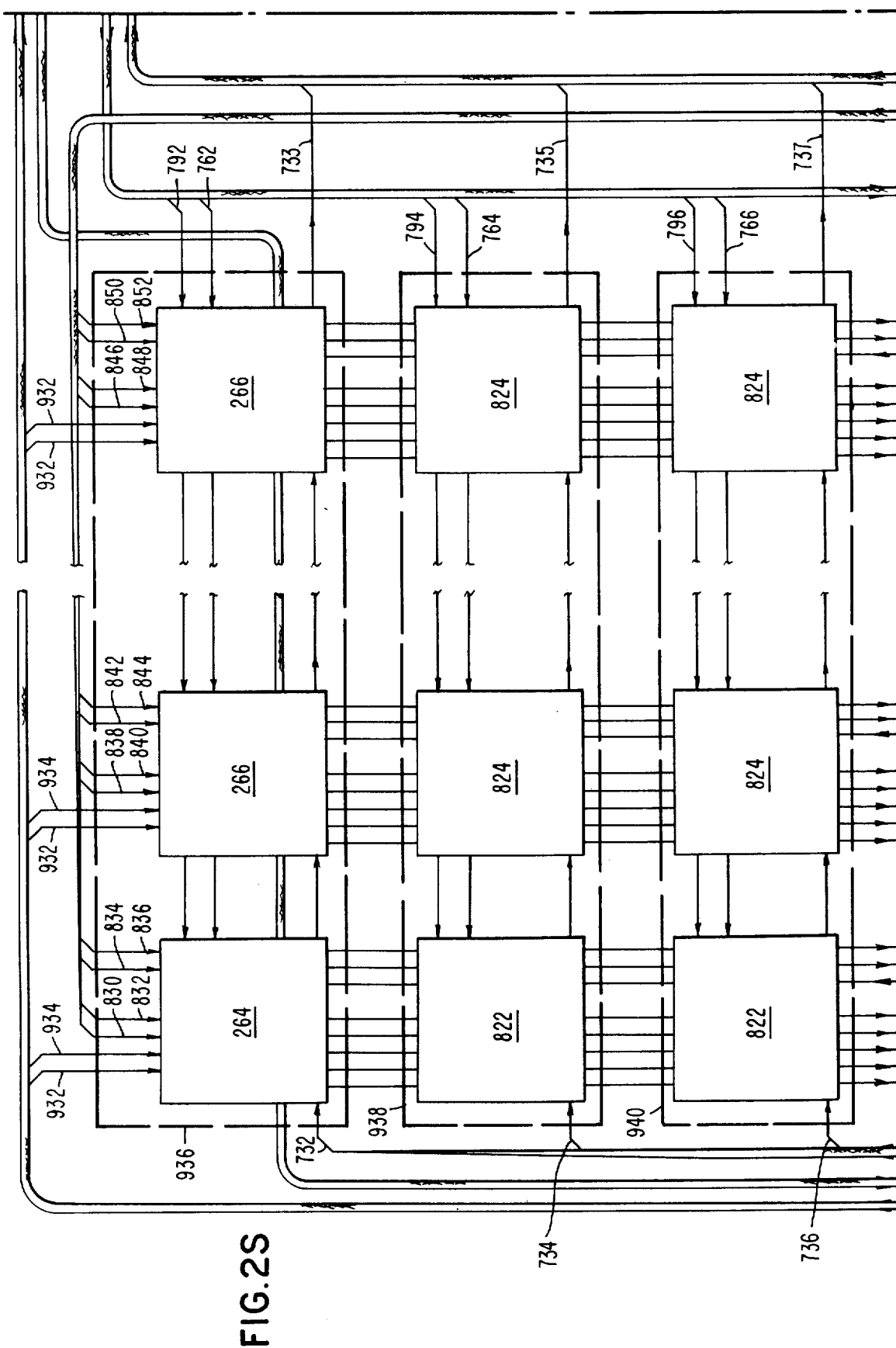
Figure 4:
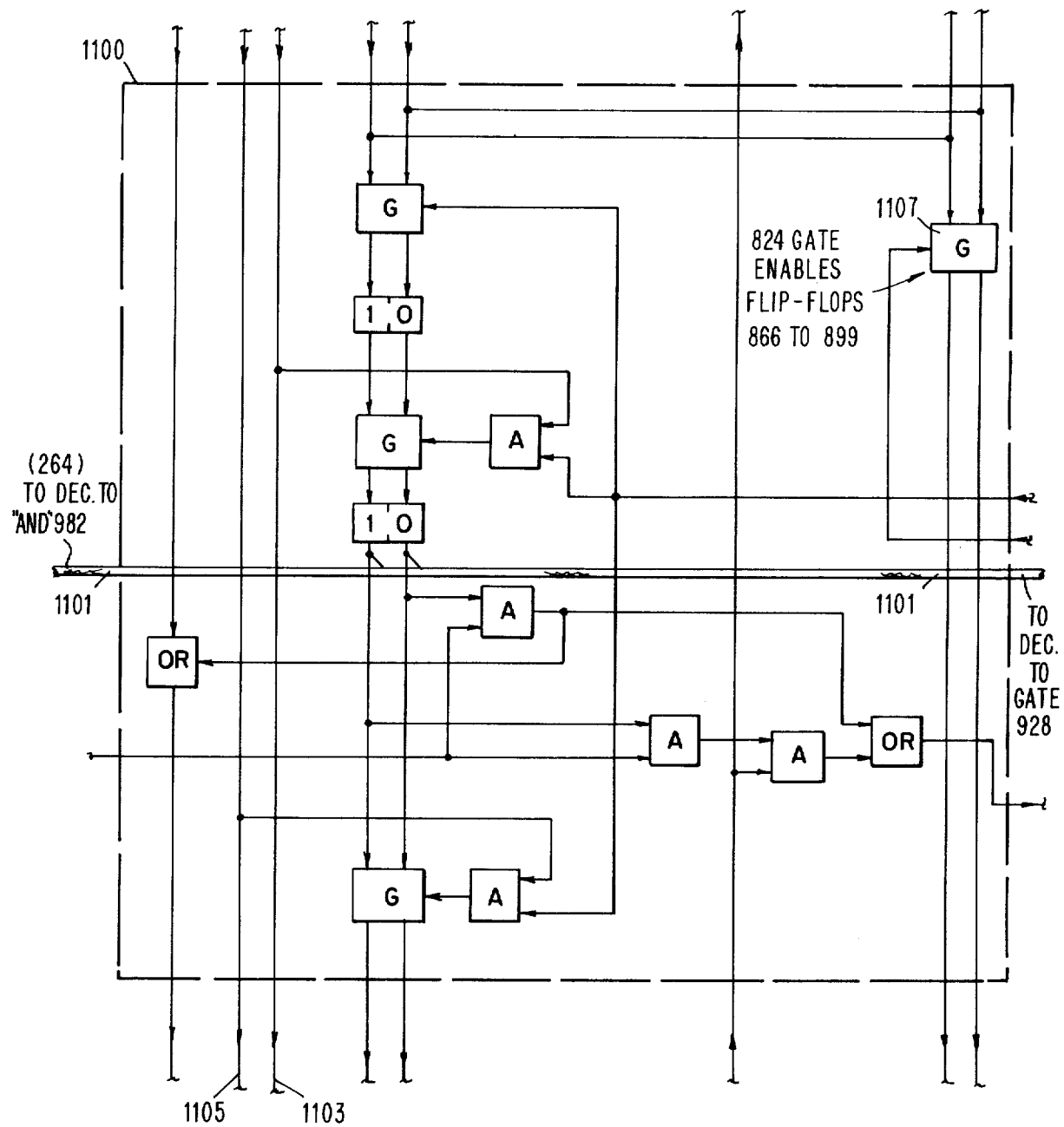
FIG. 4 is a diagram of an illustrative embodiment for use as the various stages of the MIN box, i.e., the MMC stack.

In the mapping device, the stages designated 264 and 266 in FIG. 2S are as shown in FIG. 4, i.e., they are the same as circuit 1100 therein and include cable 1101. In a stage 264, cable 1101 goes to the decoder which goes to AND circuit 982. In circuit 266, cable 1101 goes to the decoder which goes to gate 928.

Stages 822, 824, 826 and 828 also can be embodied as circuit 1100 (FIG. 4). Stage 822 differs from stage 824 in that a gate 1107 which is of the group of gates enabled from flip-flop 866-894 is an end gate in a series in a stage 822. A stage 826 corresponds to a stage 822 but does not include lines 1103 and 1105. Similarly, a stage 828 corresponds to a stage 824 but does not include lines 1105 and 1103.

The signal on either line 974 or 976 is operative to enable an OR circuit 978 to thereby turn "on" the monostable multivibrator M1. As a consequence thereof, a signal is produced on line 364 which is applied to an AND circuit 980 (FIG. 220). If the LRU number is 1, line 530 (FIG. 2D) is active. In this situation, AND circuit 980 is not enabled and there is no output on line 392.

If the LRU number is 2, a line 532 is active. If this situation obtains, and if register 936 (FIG. 2S) contains a contents of 2, the AND circuit 982 is enabled and thereby produces an output. This signifies that AND circuit 980 is not enabled and consequently there is no output on line 392.

If line 532 is active and register 936, however, does not contain contents of 2, then AND circuit 982 does not produce an output and, therefore, AND circuit 980 does produce an output on line 392. For all other cases, if LRU numbers greater than 3, wire 392 is always active as a result of the test of AND circuit 980.

The signal on line 392 is employed to turn "on" single shot M2 to produce a signal on line 366. The signal on line 366 is employed to reset flip-flops 866, 868, 870, 872, 874, 876, 878, 880, 882, 884, 886, 888, 890, 892 and 894 (FIGS. 2X, 2Y and 2Z) to their 0 states.

When monostable multivibrator M2 goes "off," a signal is produced which turns "on" a monostable multivibrator M3. There is thereby produced a signal on line 368 which is applied to AND circuits 984 and 986 (FIG. 2O), the AND circuit 984 is enabled if flip-flop 862 is in its 1 state thereby signifying that AND circuit 984 will produce an output to enable a gate 246. If flip-flop 862 is in its 0 state, AND circuit 986 produces an output to enable a gate 926. It is to be recalled that flip-flop 862 is set to its 1 state if the block number which is sought is in the mapping device. If the block number wich is sought is not in the mapping device, flip-flop 862 is set to its 0 state.

At this point, reference is also made to FIG. 5 wherein there is shown an example for illustrating the operation of the circuits on FIGS. 2O to 2Z. In FIG. 5, the left-most column sets forth the designating numerals of registers 936-964. The next column sets forth the corresponding LRU addresses of these registers. The column headed "OLD" shows the contents of the MMC stack prior to the presenting of a reference. The column headed "NEW" shows the contents of registers 936-964 that result according to the operation of the invention when the referenced page has an LRU integer value associated therewith of 7. When this occurs, the seventh register in the MMC stack is addressed. In this latter connection, it is to be realized that registers 936 to 964 are addresses 2-16 in the MMC stack, the register representing address 1 constantly containing the MMC value of 1. The rightmost column in FIG. 5 are the pertinent control flip-flops 866 to 894.

Figure 2T:
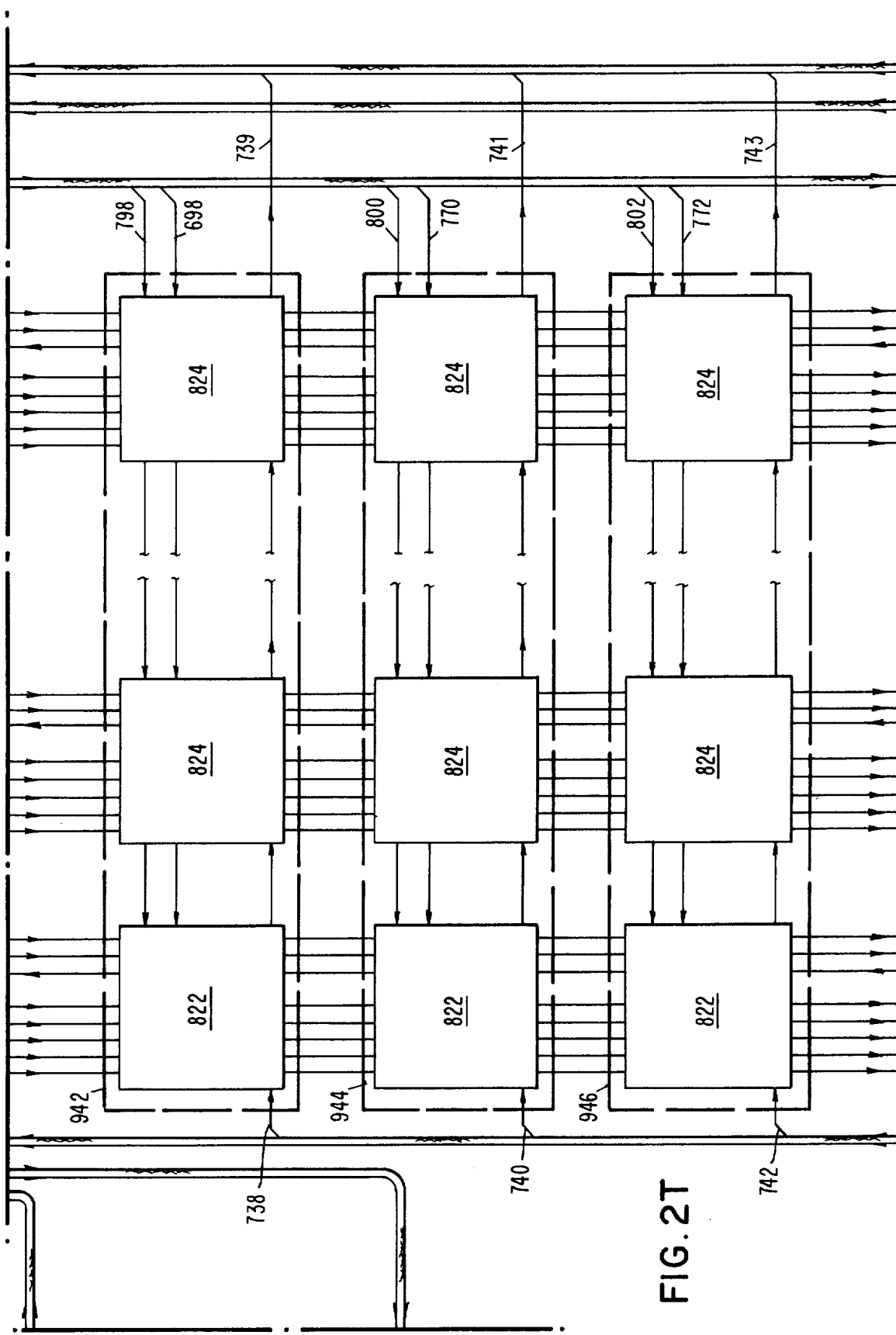
Figure 2V:
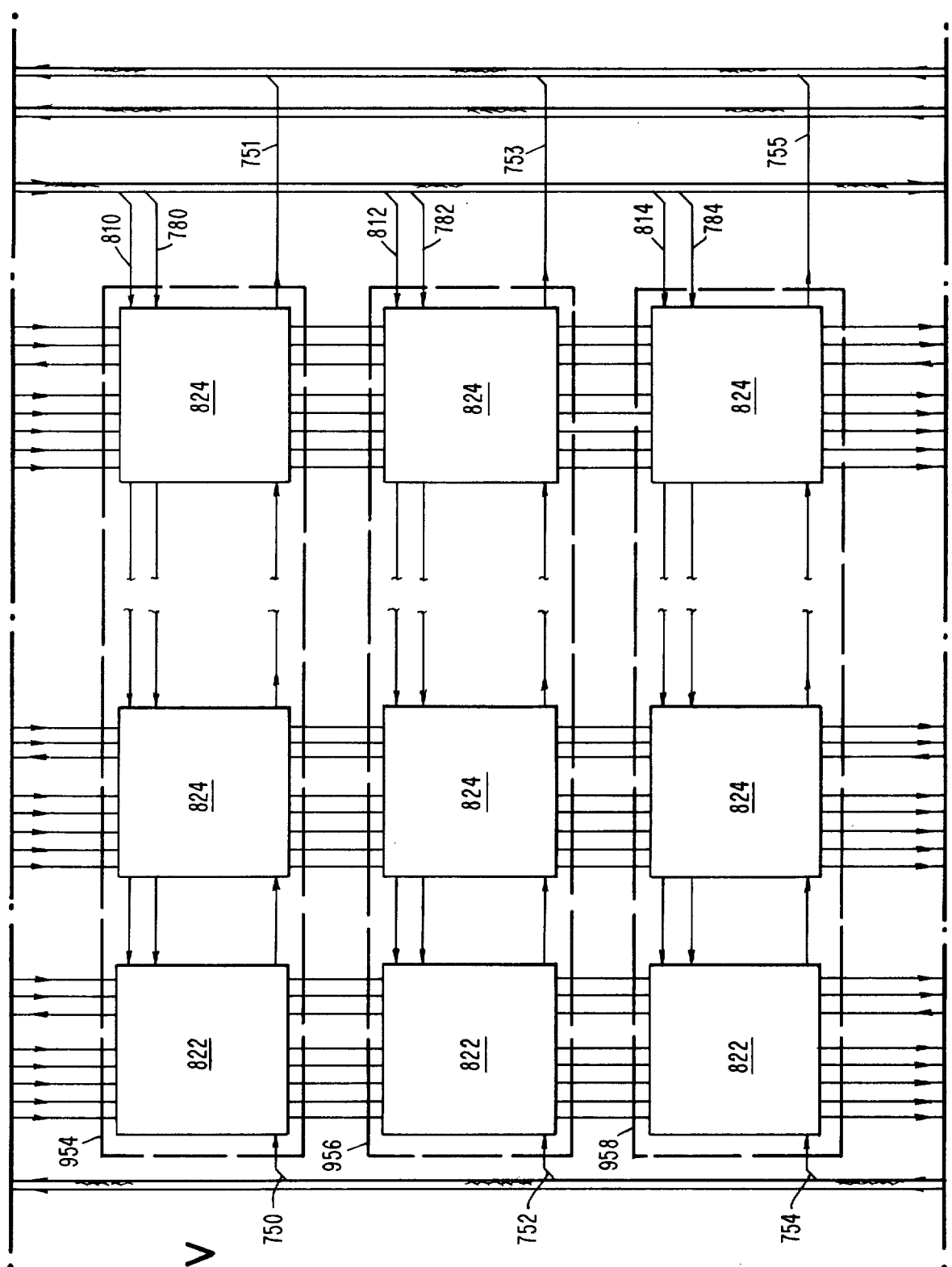
Figure 2Z:
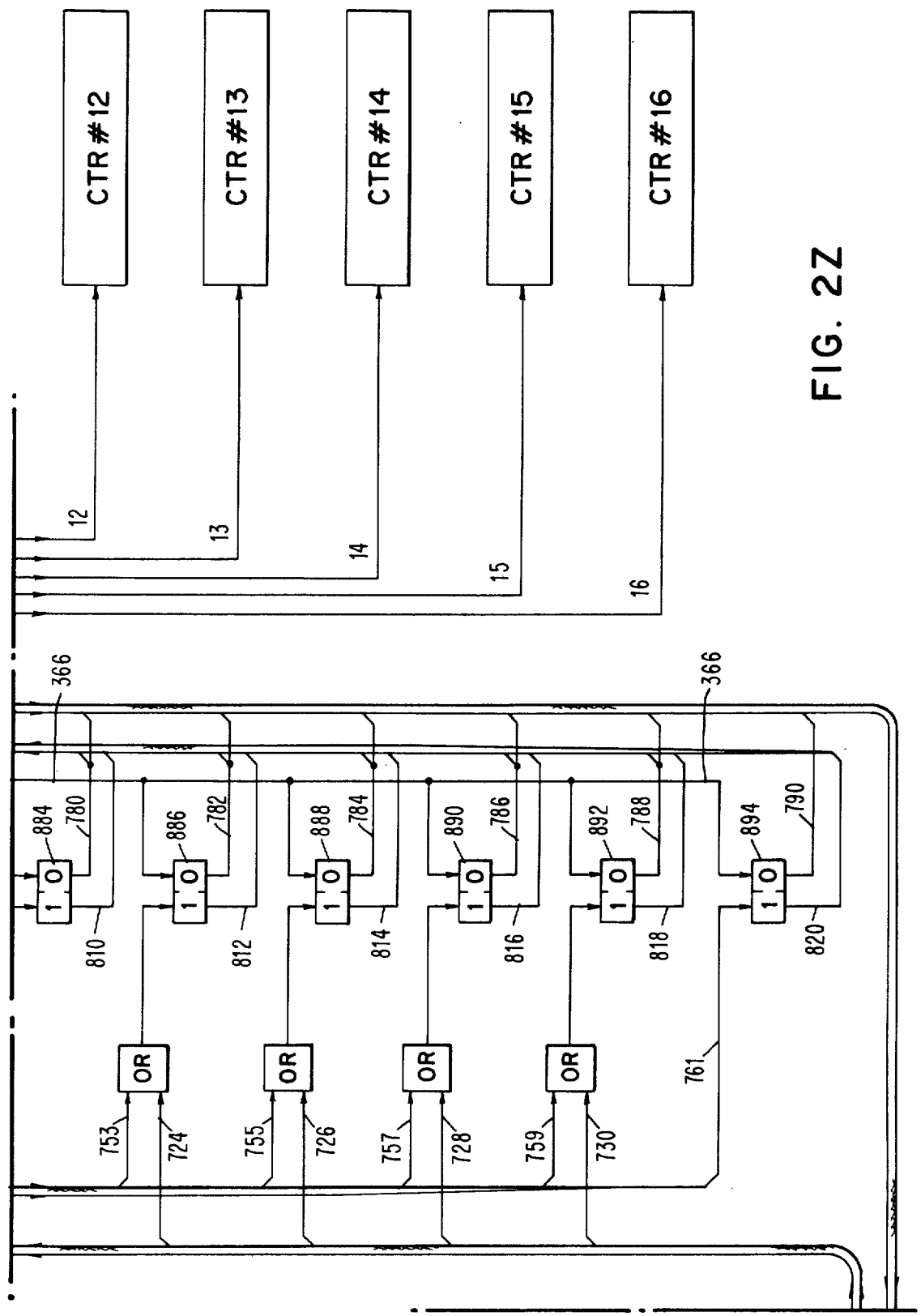

Considering the operation of the circuits shown in FIGS. 2O - 2Z utilizing as an explanatory example that depicted in FIG. 5, when the referenced page has an LRU value of 7, line 906 (FIG. 2P) is active. Because line 906 is active, line 742 is also active. It is to be noted that line 742 is the sorting input to register 946 (FIG. 2T). This signifies that all of registers 946 through 964 are to be included in a first sort. The smallest number in these three registers is the number 3 which is in register 952. It is to be noted (FIG. 2P) that because line 742 is active, all lines below line 742 such as lines 744, 746 to 760 become active because of the series connected AND and OR circuits on FIGS. 2O to 2R. The AND circuits 990 to 1016 on the latter FIGS. are all initially enabled because flip-flops 868 to 894 (FIG. 2X, 2Y and 2Z) had initially been set to their 0 states. Because register 952 contains a smallest number, line 749 (FIG. 2U) is active. Active line 749 effects the setting of flip-flop 882 (FIG. 2U) to its 1 state, this operation signifying that line 778 becomes inactive. Because line 778 is inactive (FIG. 2U), lines 748 to 760 also become inactive.

Referring back to FIG. 5, it is seen that it is next necessary to find which of the registers 946, 948 and 950 contain the smallest number. The smallest number in these three registers is 9 in register 946, such fact signifying that line 743 becomes active (FIG. 2T). The active state of line 743 sets flip-flop 876 (FIG. 2Y) to its 1 state thereby causing line 772 to become inactive. This event disables AND circuit 984 (FIG. 2O). However, this is not significant at this juncture because there are no active lines above line 906. It is also to be noted that the active state of line 906 causes lines 712, 710, 708, 706 and 704 (FIGS. 2O and 2P) to become active. The active states of these last-named lines result in the respective setting of flip-flops 866, 868, 870, 872 and 874 (FIGS. 2X and 2Y) to their 1 states.

When monostable multivibrator M3 goes "off," a signal is produced which turns "on" monostable multivibrator M4. The resulting signal appearing on line 932 provides the first shift pulse for the registers 936, 938, 940, 942, 944, 946, 948, 950, 952 and 954.

When monostable multivibrator M4 goes "off," a signal is produced which turns "on" monostable multivibrator M5. This produces the signal on line 934 which provides the second shift pulse for registers 936 through 964.

The effect of these two shift pulses is to shift the contents of register 952 to register 936. The contents of register 936 will be shifted to register 938. The contents of register 938 will be shifted to register 940. The contents of register 940 will be shifted to register 942. The contents of register 942 will be shifted to register 944. The contents of register 944 will be shifted to register 946 and the contents of register 946 will be shifted to register 952. It is to be noted that the contents of registers 948, 950, 954, 956, 958, 960, 962 and 964 are left unchanged. Arrangement of the numbers in the registers as has been mentioned hereinabove will be as shown in FIG. 5 in the column headed "NEW" after the shifts have taken place.

When monostable multivibrator M5 goes "off," monostable multivibrator M6 is turned "on." This produces a signal on line 930, which is applied to gate 928 (FIG. 2X). In this manner, the contents of register 936 are decoded and used as an address to increment one of the counters shown in FIGS. 2X, 2Y and 2Z, which contain the MMC integers.

The following tabulation sets forth the relationship of the operations under the control of the A clock.

| Monostable Multivibrator | Turn "On" Conditions | Function(s) Performed When "On" | Function(s) Performed When Turning "Off" |
|---|---|---|---|
| A1 | Memory access request by CPU (signal on line 286) The "0" state of the rewrite and replace flip-flop 516. | The Resetting of the "LRU" field of the argument mask to all "0's". The setting of the "BLOCK NUMBER" of the argument mask to all "1's". The gating of the "BLOCK NUMBER" from register 418 to the "BLOCK NUMBER" field of the argument register. The setting of the match indicators to their "1" states. The resetting of the EOL flip-flop to its "0" state. | The turning "on" of monostable multivibrator A2. |
| A2 | The turning "off" of monostable multivibrator A1. | Produces the associate signal for associating on the "BLOCK NUMBER". | The turning "on" of monostable multivibrator A3. |
| A3 | The turning "off" of monostable multivibrator A2. | The inerrogation of the match indicator flip-flops, i.e., the setting or the not setting of the EOL flip-flop to its "1" state. | The turning "on" of monostable multivibrator A4. |
| A4 | The turning "off" of monostable multivibrator A3. | The testing for the state of the EOL flip-flop. | |

The following tabulation sets forth the relationship of the operations under the control of the B clock.

| Monostable Multivibrator | Turn "On" Conditons | Function(s) Performed When "On" | Function(s) Performed When Turning "Off" |
|---|---|---|---|
| B1 | The "0" state of the EOL flip-flop. | The reading of the matching word in the associative memory to the memory data register 446. The resetting of the "LRU" hold register to its all "0" state. | The turning "on" of monostable multivibrator B2. |
| B2 | The turning "off" of monostable multivibrator B1. | The gating of the "real" block from the memory data register to the left-hand portion of the memory address register 450 of primary store. The gating of the "address in block" from register 418 to the right-hand portion of memory address register 450. The resetting of the LRU field of the argument mask to all "0's". The gating of the LRU number from the memory data register to the LRU hold register. The setting of flip-flop 862 to its "1" state. | The turning "on" of monostable multivibrator B3. The turning "on" of monostable multivibrator M1. |
| B3 | The turning "off" of monostable multivibrator B2. | The setting of the match indicator flip-flops to their "1" states. The setting of the left-hand portion of the LRU field of the argument | The turning "on" of monostable multivibrator B4. |

-continued

| Monostable Multivibrator | Turn "On" Conditons | Function(s) Performed When "On" | Function(s) Performed When Turning "Off" |
|---|---|---|---|
| | | mask to same number of "1's" as the LRU number in the associative memory MDR (memory data register). The resetting of the "BLOCK NUMBER" field of the argument mask to all "0's". The resetting of the LRU field of the argument register to all "0's". | |
| B4 | The turning "off" of monostable multivibrator B3. | The providing of the associate pulse to reset the match indicators for all words in the associative memory which have LRU numbers equal to or less than the LRU number in data register 446. | The turning "on" of monostable multivibrator B5. |
| B5 | The turning "off" of monostable multivibrator B4. | The providing of the first shift pulse. | The turning "on" of monostable multivibrator B6. |
| B6 | The turning "off" of monostable multivibrator B5. | The providing of the second shift pulse. | The turning "on" of monostable multivibrator B7. |
| B7 | The turning "off" of monostable multivibrator B6. | The setting of the match indicator flip-flops to their "1" states. The resetting of the LRU field of the argument mask to all "0's". The setting of the "BLOCK NUMBER" field of the argument mask to all "1's". | The turning "on" of monostable multivibrator B8. |
| B8 | The turning "off" of monostable multivibrator B7. | The providing of the associate pulse. | The turning "on" of monostable multivibrator B9. |
| B9 | The turning "off" of monostable multivibrator B8. | The setting of the LRU field of associative memory data register to 10000000. The testing for the state of the alteration flip-flop. | |
| B10 | The "1" state of the alteration flip-flop. | The setting of the A bit of the associative memory data register to its "1" state. | |
| B11 | The "0" state of the alteration flip-flop. | The writing of the contents of the associative memory data register back into the associative memory. | |

The following tabulation sets forth the relationship of the operations under the control of the C clock.

| Monostable Multivibrator | Turn "On" Conditions | Function(s) Performed When "On" | Function(s) Performed When Turning "Off" |
|---|---|---|---|
| C1 | The "1" state of the EOL flip-flop. | The setting of the LRU field of the argument mask to all "1's". The resetting of the "BLOCK NUMBER" field of the argument mask to all "0's". The setting of the match indicator flip-flops to their | The turning "on" of monostable multivibrator C2. |

-continued

| Monostable Multivibrator | Turn "On" Conditions | Function(s) Performed When "On" | Function(s) Performed When Turning "Off" |
|---|---|---|---|
| | | "1" states. The setting of flip-flop 862 to its "0" state. | |
| C2 | The turning "off" of monostable multivibrator C1. | The providing of the associate pulse | The turning "on" of monostable multivibrator C3. |
| C3 | The turning "off" of monostable multivibrator C2. | The providing of the first shift pulse. | The turning "on" of monostable multivibrator C4. |
| C4 | The turning "off" of monostable multivibrator C3. | The providing of the second shift pulse. | The turning "on" of monostable multivibrator C5. |
| C5 | The turning "off" of monostable multivibrator C4. | The reading of the matching word from the associative memory to the associative memory data register 446. The reading of the "BLOCK NUMBER" into "BLOCK NUMBER OLD REGISTER". | The turning "on" of monostable multivibrator C6. |
| C6 | The turning "off" of monostable multivibrator C5. | The setting of the LRU section of the associative memory data register 446 to 1000000. The testing for the state of the A bit in associative memory data register 446. | |
| C7 | The "A" bit in associative memory data register 446 is in its "0" state. | The gating of the "BLOCK NUMBER" from register 418 to the "REPLACEMENT ADDRESS REGISTER". The gating of the "REAL BLOCK" field of associative memory data register 446 to the PRIMARY ADDRESS REGISTER. The gating of the "BLOCK NUMBER" from register 418 to the "BLOCK NUMBER" field of MDR and to the "BLOCK NUMBER NEW" register. The resetting of the "A" bit in associative memory data register 446 to "0". The applying of the "replace" input to the channel controls. The setting of the "replace" flip-flop 514 to its "1" state. | The turning "on" of monostable multivibrator C8. The executing of the "Memory" Management" program. |
| C8 | The turning "off" of monostable multivibrator C7. | The writing of the contents of associative memory data register 446 into the associative memory. | The turning "on" of monostable multivibrator C9. |
| C9 | The turning "off" of monostable multivibrator C8. The turning "off" of monostable multivibrator C10. | The testing for the state of the replacement flip-flop 514. | |
| C10 | The replacement flip-flop 514 is in its "1" state. | Delay only. | The turning "on" of monostable multivibrator C9. |
| C11 | The "A" bit in associative memory data register 446 is in its "1" state. | The gating of the "BLOCK NUMBER" field of associative memory data register 446 to the "WRITE ADDRESS REGISTER". | The turning "on" of monostable multivibrator C12. |

-continued

| Monostable Multivibrator | Turn "On" Conditions | Function(s) Performed When "On" | Function(s) Performed When Turning "Off" |
|---|---|---|---|
| C12 | The turning "off" of monstable multivibrator C11. | The gating of the "BLOCK NUMBER" from CPU register 418 to the "REPLACEMENT ADDRESS REGISTER". The gating of the "REAL BLOCK" field of associative memory data register 446 to the "PRIMARY ADDRESS REGISTER". The gating of the "BLOCK NUMBER" from register 418 to the associative memory data register 446 and to the "BLOCK NUMBER NEW" register. The setting of the "A" bit of the associative memory data register 446 to its "0" state. The applying of the "REWRITE AND REPLACE" input to the channel controls. The setting of the rewrite and replace flip-flop 516 to its "1" state. | The turning "on" of monostable multivibrator C13. The execution of the "Memory Management" program. |
| C13 | The turning "off" of monostable multivibrator C12. | The writing of the contents of associative memory data register 446 into the associative memory. | The turning "on" of monostable multivibrator C14. |
| C14 | The turning "off" of monostable multivibrator C13. The turning "off" of monostable multivibrator C15. | The testing for the state of the rewrite and replace flip-flop 516. | |

The following tabulation sets forth the relationship of the operations under the control of the M clock.

| Monostable Multivibrator | Turn "On" Conditions | Function(s) Performed When "On" | Function(s) Performed When Turning "Off" |
|---|---|---|---|
| M1 | The turning "off" of monostable multivibrator B2. | The testing as to whether the LRU number is "1" or as to whether the LRU number is 2 and the contents of register 154 = 2. | |
| M2 | Signal on line 392. | The resetting to their "0" states of flip-flops 866 to 894. | The turning "on" of monostable multivibrator M3. |
| M3 | The turning "off" of monostable multivibrator M2. | The applying of the LRU number to selected one or ones of lines 896 to 924. (The enabling of gate 246 or gate 926) | The turning "on" of monostable multivibrator M4. |
| M4 | The turning "off" of monostable multivibrator M3. | The applying of the first shift pulse | The turning "on" of monostable multivibrator M5. |
| M5 | The turning "off" of monostable multivibrator M4. | The applying of the second shift pulse | The turning "on" of monostable multivibrator M6. |
| M6 | The turning "off" of monostable multivibrator M5. | The enabling of gate 928. | |

-continued

| Monostable Multivibrator | Turn "On" Conditions | Function(s) Performed When "On" | Function(s) Performed When Turning "Off" |
| --- | --- | --- | --- |

There follows hereinbelow a description of the memory management program, i.e., the program which is employed to update the LRU stack upon the occurrence of a page exception. The symbols employed in this program are as follows:

| TABLES: | LR(I) | is a list of N entries containing the LRU numbers. LR is ordered by virtual page names. All LRU numbers are initially zero. |
| --- | --- | --- |
| | BN(I) | is a list of two entries (old and new block numbers). |
| VARIABLES: | K | is the virtual address of the page causing the page exception. |
| | REPL | is the virtual address of the page being replaced. |
| | LMAX | is the number of distinct pages referenced up to this point (initially zero). |
| | L | is the temporary LRU register. |
| CONSTANTS: | M | is the number of page frames (primary storage size). |
| | N | is the number of pages in virtual memory. |
| FUNCTIONS: | EXEC(J,LOC) — | executes special hardware instructions as follows: |

| J | Description of EXEC |
| --- | --- |
| 1 | Reads the old and new block numbers from the device into two consecutive locations at LOC |
| 2 | Loads into the LRU extension register of the device the contents of LOC |

Figure 6:
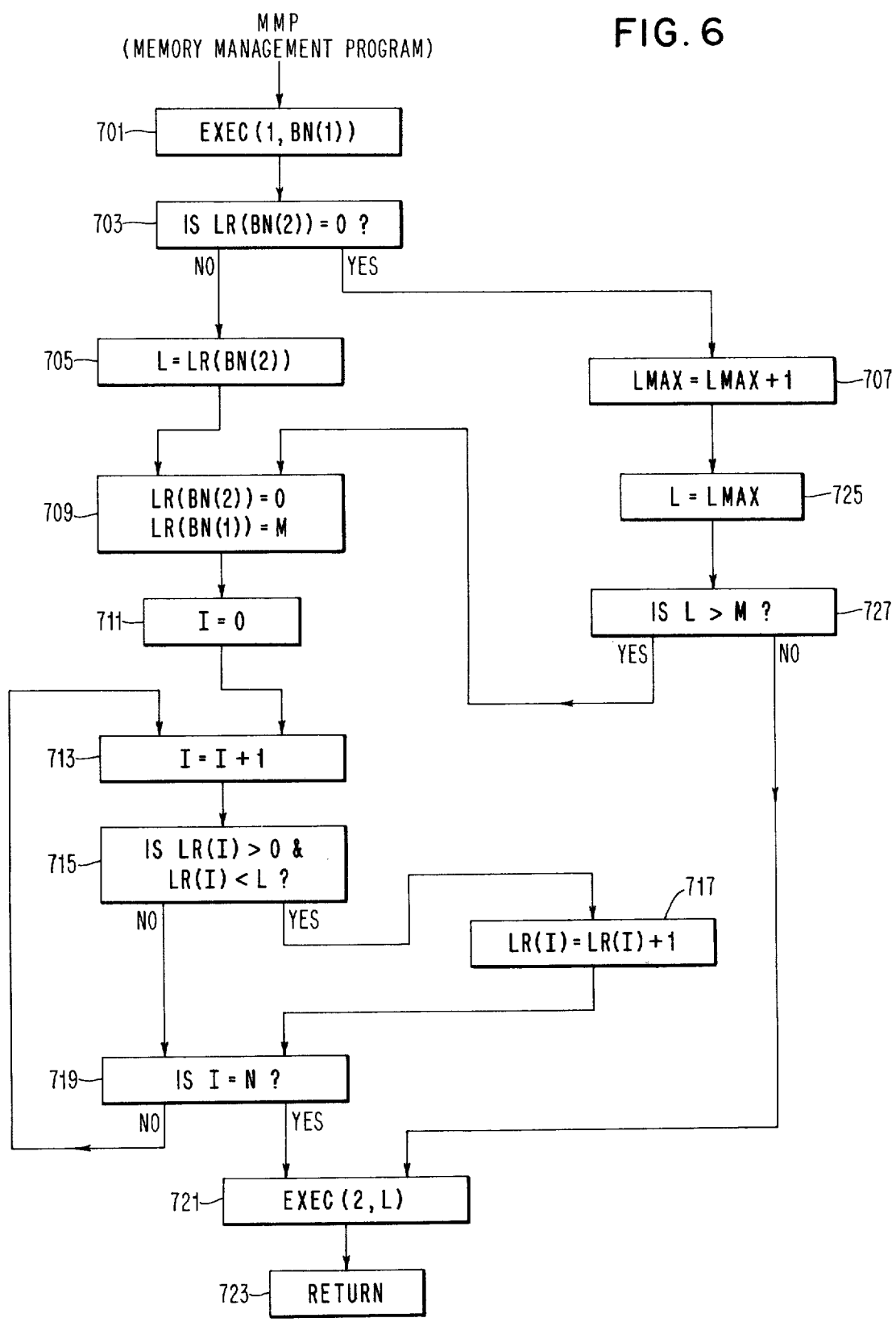
FIG. 6 is a flow chart of a suitable memory management program employed according to the invention.

Reference is now made to the memory management program (MMP) depicted in the flow chart in FIG. 6. In this program, step 701 sets forth the EXEC(1,BN(1)) function. With this step as is set forth in the table hereinabove under FUNCTIONS, old and new block numbers, i.e., the block numbers of the page being replaced and the page causing the exception, are read in two consecutive locations at LOC, LOC at this point being BN(I), where I is equal to 1. The program moves to step 703 wherein the test is made as to whether the old block number, (BN(2)) is equal to zero. If step 703 results in a no, then the program moves to step 705 wherein the temporary LRU register is set equal to the value of LR(BN(2)). However, if step 703 results in yes, then the program moves to step 707 where LMAX is incremented by 1.

Let it be assumed that step 703 had resulted in a no thereby the program moved to step 705 as has been described. From step 705, the program moves to block 709 wherein LR(BN(2)) is set to zero and LR(BN(1)) is set to the value of M, i.e., the number of page frames that can be accommodated in primary storage, i.e., can be represented in the hardware partial LRU stack. The program then moves to step 711 wherein I the virtual page name which orders LR is set to zero and then by step 713, is incremented by 1.

The program then moves to block 715 wherein the tests are made as to whether LR(I), wherein I = 1, is greater than 0 and whether LR(I) is less than the value of L, i.e., the value in the temporary LRU register. If the steps in block 715 both result in a yes, then the program moves to step 717 wherein LR(I) is incremented by 1 and the program then moves to step 719. However, if either or both of the steps in block 717 result in a no, then the program moves directly to step 719 wherein the test is made as to whether the value of I is equal to the value of N, i.e., all of the pages in virtual memory have been considered. Perforce, at this stage of the program, step 719 results in a no whereupon the program loops back to step 713. The program iteratively moves through step 713, block 715 and step 719 until step 719 results in a yes, i.e., I = N, at which point the program moves to step 721. By step 721, the routine EXEC(2,L) is performed. This routine effecting the loading into the LRU extension register the contents of the temporary LRU register, L. Block 723 denotes the return step of the program.

In the situation where step 703 results in a yes whereby LMAX is incremented by 1 in step 707, the program moves therefrom to step 725 wherein the contents in the temporary LRU register, L, is set to the value of LMAX. The program then moves to step 727 wherein the test is made as to whether the value of the contents in register L exceed the value of M, i.e., the number of page frames accommodated in primary storage. If step 727 results in a yes, then the program goes to block 709. However, if step 727 results in a no, then the program goes to step 721.

While the invention has been particularly shown and described with reference to the preferred embodiment thereof, it will be understood by those skilled in the art that the foregoing and other changes in form and details may be made therein without departing from the spirit and scope of the invention.

What is claimed is:

1. A system for use in data processing apparatus which is operated as a paging machine and wherein program is considered as a page reference string, for determining the minimum memory capacities of the pages of said string, said data processing apparatus including means for maintaining a first list of the names of the pages of said program ordered in accordance with a least recently used (LRU) criterion, said first list being constituted by the names of said pages and least recently used (LRU) integers respectively having one of the different discrete values of 1 to $n$, respectively, associated with each of said names according to said criterion, wherein $n$ is equal to the total number of said pages in said program, said system comprising:

means for maintaining a second list of said names, said second list being constituted by an ordered sequence of 1st to nth addresses, there being located at each of said addresses a different integer, C, from which the minumum memory capacity (MMC) of a page can be determined, each of said integers, C, of said second list having a different discrete value of 1 to $n$;

means responsive to said means for maintaining said second list for determining said minimum memory capacity of a given referenced page comprising;

means responsive to the referencing of said given page for dividing said second list into a first group of addresses having the values of 1 to $(l1)$, respectively, and a second group of addresses having the values of $l$ to $n$, respectively, wherein $l$ is equal to the LRU integer associated with said given referenced page;

means responsive to said means for dividing of said second list for determining the address, $k$, in said second group having the lowest value integer, C, in said second group, means responsive to said means for determining said address, $k$, for marking the series of addresses in said second group included in the subgroup containing the addresses $l$, $(l+1)$, ..., $(k-1)$, which have the following values, viz. $l$, $(l+a)$, $(l+b)$, $(l+c)$, ..., up to address $(k-1)$, if necessary, wherein $(l+a)$ has the smallest address value greater than $l$ such that $C(l+a) < C(l)$, wherein $(l+b)$ has the smallest address value greater than $(l+a)$ such that $C(l+a)$, etc., wherein $C(i)$ is the integer, C, at address , means responsive to said means for dividing said second list for incrementing each of the addresses 2 - $(l-1)$ in said first group by 1 to constitute the addresses 3 to $l$, means responsive to said means for the determining of said address, $k$, for assigning the address value of 2 to said smallest MMC integer originally at address, $k$, said smallest integer being said minumum capacity of said given referenced page, and means responsive to said means for assigning said address value of 2 for respectively assigning to each of the series of said marked addresses of said second group, the value of the next address in said series, the highest value address in said series being assigned the value of $k$.

2. In a data processing apparatus which is operated as a paging machine and wherein a program is considered as a page reference string, said data processing apparatus including primary storage for containing a portion, $m$, of the pages of said program and secondary storage for containing the remainder $(n-m)$ of the pages of the program wherein $n$ is the total number of pages in said program, means responsive to the occurrence of a page exception for effecting the exchange of a page in primary storage for the page in secondary storage causing said exception, means for maintaining a first list of the names of the pages of said program weighted in accordance with a least recently used (LRU) criterion, said first list being constituted by the names of said pages and (LRU) weighing integers respectively having one of the different discrete values of 1 to $n$, associated with each of said names according to said criterion, said first list comprising a first portion comprising means for containing the names of those pages in primary storage and having LRU weightings of 1 to $m$ and the respective LRU integers associated therewith, and a second portion comprising the names of the remaining pages of said program and which have the LRU weightings of $(m+1)$ to $n$ and their respective integers in a location in said storage, said data processing apparatus further including means for effecting changes of information in said first and second portions of said first list, a system for determining the minimum memory capacities (MMC) for the pages of said page reference string comprising:

means for maintaining a second list of said names, said second list being constituted by an ordered sequence of 1st to nth addresses, there being located at each of said addresses a different integer, C, from which the minimum memory capacity (MMC) of a page can be determined, each of said integers, C, of said second list having a different discrete value of 1 to $n$;

means responsive to said means for maintaining said second list for determining said minimum memory capacity of a given referenced page comprising;

means responsive to the referencing of said given page for dividing said second list into a first group of addresses having the values of 1 to $(l-1)$, respectively, and a second group of addresses having the values of $l$ to $m$, respectively, wherein $l$ is equal to the LRU integer associated with said given referenced page, means responsive to said means for dividing said second list for determining the address, $k$, in said second group having the lowest value integer, C, in said second group, means responsive to said means for determining said address, $k$, for marking the series of addresses in said second group included in the subgroup containing the addresses $l$, $(l+1)$, ..., $(k-1)$, which have the following values, viz. $l$, $(l+a)$, $(l+b)$, $(l+c)$, ..., up to address $(k-1)$, if necessary, wherein $(l+a)$ has the smallest address value greater than $l$ such that $C(l+a) < C(l)$, wherein $(l+b)$ has the smallest address value greater than $(l+a)$ such that $C(l+b) < C(l+a)$, etc., wherein $C(i)$ is the integer, C, address , means responsive to said means for dividing said second list for incrementing each of the addresses 2 to $(l-1)$ in said first group by 1 to constitute the addresses 3 to $l$, means responsive to said means for determining said address, $k$, for assigning the address value of 2 to said smallest integer originally at address $k$, said smallest integer being said minimum memory capacity of said given referenced page, and means responsive to said means for assigning said address value of 2 for respectively assigning to each of the series of said marked addresses, of said second group, the value of the next address in said series, the highest value address in said series being assigned a value of $k$, said means in said data processing apparatus for effecting changes of information as in said first and said second portions of said first list, in response to the occurrence of said page exception, a. placing the page name of said page causing said exception into said first portion and assigning it the LRU integer of one;
b. transferring the page name which had the LRU integer of $m$ associated therewith immediately prior to the occurrence of said page exception into said second portion of said first list and assigning it the LRU integer of $(m+1)$;
c. respectively incrementing by one all of those LRU integers in said first portion which, immediately prior to the occurrence of said page exception, had the LRU values of 1 to $(m-1)$;
d. respectively incrementing by one those LRU integers in said second portion which immediately prior to the occurrence of said page exception had values of $(m+1)$ to one less than the value of the LRU integer associated with the page causing the exception.

3. In a data processing apparatus as defined in claim 2 wherein:
said first portion of said first list comprises a first stack of at least $m$ registers, each of said registers being capable of having contents of at least $m$, and means for incrementing said contents of said registers; and wherein
said second list comprises a second stack of, at least, $n$ registers, each of said registers of said second stack being capable of having contents of the value of at least $n$, and
means for shifting the contents of the registers in said second stack into any of the other registers of said stack.

4. In a data processing apparatus which is operated as a paging machine and wherein a program is considered as a page reference string, said data processing apparatus including primary storage for containing portion, $m$, of the pages of said program and secondary storage for containing the remainder, $(n-m)$, of the pages of said program, and means responsive to the occurrence of a page exception for effecting the exchanging of a page in primary storage for the page in secondary storage causing said page exception, a system for determining the minimum memory capacities (MMC) for the pages of said page reference string comprising:
means for maintaining a first list of the names of the pages of said program weighted in accordance with at least recently used (LRU) criterion, said first list being constituted by the names of said pages and least recently used (LRU) weighting integers respectively having one of the different discrete values of 1 to $n$, associated with each of said names according to said criterion, said first list comprising a first portion comprising means for containing the names of those pages in primary storage having associated LRU weightings of 1 to $m$ and the respective LRU weighting integers associated therewith, and a second portion comprising the names of the remaining pages of said program and which have the LRU weightings of $(m+1)$ to $n$ and their respective associated LRU weighting integers in a location in said storage;
means in circuit with said means for maintaining said first list for effecting changes of information in said first and second portions of said first list;
means responsive to said means for maintaining said first list for maintaining a second list of said names, said second list being constituted by an ordered sequence of 1st to nth addresses, there being located at each of said addresses a different integer, C, from which the minimum memory capacity (MMC) of a page can be determined, each of said integers, C, of said list having a different discrete value of 1 to $n$;
means for determining said minimum memory capacity of a given referenced page comprising;
means responsive to the referencing of said given page for dividing said second list into a first group of addresses having the values of 1 to $(l-1)$, respectively, and a second group of addresses having the values of $l$ to $m$, respectively, wherein $l$ is equal to the LRU integer associated with said given referenced page;
means responsive to said means for dividing said second list for determining the address, $k$, in said second group having the lowest value integer, C;
means responsive to the determining of said address, $k$, for marking the series of addresss in said second group included in the subgroup containing the addresses $l, (l+1), \ldots, (k-1)$ which have the following values, viz. $l, (l+a), (l+b), (l+c), \ldots,$ up to address $(k-l)$, if necessary, wherein $(l+a)$ has the smallest address value greater than $l$ such that $C(l+a) < C(l)$, wherein $(l+b)$ has the smallest address value greater than $(l+a)$, such that $C(l+b) < C(l+a)$, etc. wherein $C(i)$ is the integer, C, at address ,
means responsive to said means for marking said series of addresses for respectively shifting down by one of the contents at addresses 2 to $(l-1)$ in said first group,
means responsive to said means for marking said series of addresses for shifting the contents at said address, $k$, i.e. said smallest integer, to address 2, said smallest integer being said minimum memory capacity of said given referenced page, and
means responsive to said means for marking said series of addresses for respectively shifting the contents of each of the series of said marked addresses of said second group into the next address in said series, the contents of the highest value address in said series being shifted to address $k$,
said means for effecting changes of information in said first and second portions of said first list, in response to the occurrence of said page exception, including means for
a. placing the page name of said page causing said exception into said first portion of said first list and assigning to it the LRU integer of one;
b. transferring the page name which had the LRU integer of $m$ associated therewith immediately prior to the occurrence of said page exception into said second portion of first list and assigning to it the LRU integer of $(m+1)$;
c. respectively incrementing by one all of those LRU integers in said first portion which immediately prior to the occurrence of said page exception had the LRU values of 1 to $(m-1)$; and
d. respectively incrementing by one those LRU integers in said second portion which immediately prior to the occurrence of said page exception had values of $(m+1)$ to one less than the value of the LRU integer associated with the page causing the exception.

5. In a data processing apparatus as defined in claim 4 wherein:

said first portion of said first list comprises a first stack of at least $m$ registers, each of said registers being capable of having contents of the value of at least $m$, and
means for incrementing said contents of said registers; and wherein
said second list comprises a second stack of, at least, $n$ registers, each of said registers of said second stack being capable of having contents of the value of at least $n$, and
means for shifting the contents of the registers in said second stack into any of the other registers of said stack.

* * * * *

UNITED STATES PATENT OFFICE
CERTIFICATE OF CORRECTION

PATENT NO. 3,964,028

DATED June 15, 1976

INVENTOR(S) Laszlo A. Belady and Frank P. Palermo

It is certified that error appears in the above-identified patent and that said Letters Patent are hereby corrected as shown below:

```
Column 40, line 61 - before "program" insert --a--
Column 41, line 18 - delete "(11) insert --(ℓ-1)--
Column 41, line 20 - delete "1" first occurrence insert --ℓ--
Column 41, line 20 - delete "1" second occurrence insert --ℓ--
Column 41, line 36 - insert before "C" first occurrence --C(ℓ+b)<--
Column 41, line 37 - after "dress" insert --i--
Column 41, line 46 - before "capacity" insert --memory--
Column 41, line 67 - delete "weighing" insert --weighting--
Column 42, line 49 - after "," first occurrence insert --at--
Column 42, line 49 - after "address" insert --i--
Column 42, line 68 - after "," insert --including means for:--
Column 43, line 47 - delete "at" insert --a--
Column 44, line 28 - after "dress" insert --i--
Column 44, line 41 - delete "of" insert --at--
Column 44, line 55 - after "of" insert --said--
```

Signed and Sealed this

Second Day of November 1976

[SEAL]

Attest:

RUTH C. MASON
*Attesting Officer*

C. MARSHALL DANN
*Commissioner of Patents and Trademarks*